(12) United States Patent
Kalenian

(10) Patent No.: US 12,042,080 B2
(45) Date of Patent: Jul. 23, 2024

(54) SYSTEMS FOR PRODUCING LIQUID EXTRACTS

(71) Applicant: Kalenian Coffee Consulting LLC, Cumberland Foreside, ME (US)

(72) Inventor: Paul A. Kalenian, Cumberland Foreside, ME (US)

(73) Assignee: Kalenian Coffee Consulting LLC, Cumberland Foreside, ME (US)

( * ) Notice: Subject to any disclaimer, the term of this patent is extended or adjusted under 35 U.S.C. 154(b) by 0 days.

(21) Appl. No.: 18/076,381

(22) Filed: Dec. 6, 2022

(65) Prior Publication Data
US 2023/0165397 A1    Jun. 1, 2023

Related U.S. Application Data

(63) Continuation-in-part of application No. 17/355,868, filed on Jun. 23, 2021.
(Continued)

(51) Int. Cl.
*A47J 31/00* (2006.01)
*A23F 5/26* (2006.01)
(Continued)

(52) U.S. Cl.
CPC ............ *A47J 31/002* (2013.01); *A23F 5/262* (2013.01); *A47J 31/007* (2013.01);
(Continued)

(58) Field of Classification Search
CPC .... A47J 31/002; A47J 31/007; A47J 31/0663; B01F 23/551; B01F 31/85; B01F 2101/14; A23F 5/262
See application file for complete search history.

(56) References Cited

U.S. PATENT DOCUMENTS

| 1,989,077 A | 1/1935 | Bredt |
| 2,822,249 A | 2/1958 | Jones |

(Continued)

FOREIGN PATENT DOCUMENTS

| EP | 182939 | * | 6/1986 |
| JP | 6521966 A | | 5/2019 |
| WO | WO 2006/065236 A1 | | 6/2006 |

OTHER PUBLICATIONS

[No Author Listed], Air Cannons. VIBCO. 2001. 8 pages.
[No Author Listed], Four Kinds of Water. Vincent Corp. Jul. 9, 1996. 2 pages.

*Primary Examiner* — Anthony J Weier
(74) *Attorney, Agent, or Firm* — Wolf, Greenfield & Sacks, P.C.

(57) ABSTRACT

The present disclosure is generally related to systems and methods for producing liquid extracts from a solid raw material, as well as related equipment. Certain aspects are related to the production of multiple liquid extract products using a single system by adjusting one or more displaceable fluidic pathway segments within the system to switch between first and second (or more) extraction configurations. In certain embodiments, a first liquid extract can be produced when the displaceable fluidic pathway segment is in a first configuration, and a second liquid extract (different from the first liquid extract) can be produced when the displaceable fluidic pathway segment in in a second configuration (different from the first configuration).

19 Claims, 21 Drawing Sheets

Related U.S. Application Data

(60) Provisional application No. 63/043,242, filed on Jun. 24, 2020.

(51) Int. Cl.
*A47J 31/06* (2006.01)
*B01F 23/50* (2022.01)
*B01F 31/85* (2022.01)
*B01F 101/14* (2022.01)

(52) U.S. Cl.
CPC ......... *A47J 31/0663* (2013.01); *B01F 23/551* (2022.01); *B01F 31/85* (2022.01); *B01F 2101/14* (2022.01)

(56) References Cited

U.S. PATENT DOCUMENTS

| | | | |
|---|---|---|---|
| 3,243,155 A * | 3/1966 | Valente | A47J 31/461 251/313 |
| 3,965,269 A | 6/1976 | Lee et al. | |
| 5,092,983 A | 3/1992 | Eppig et al. | |
| 5,127,318 A | 7/1992 | Selby, III | |
| 5,204,136 A | 4/1993 | Hellemons | |
| 5,225,223 A | 7/1993 | Vitzthum et al. | |
| 5,242,700 A | 9/1993 | Schlect | |
| 5,753,297 A * | 5/1998 | Schmed | A47J 31/4496 426/433 |
| 5,896,805 A | 4/1999 | Katou et al. | |
| 6,203,837 B1 | 3/2001 | Kalenian | |
| 6,548,094 B2 | 4/2003 | Kalenian | |
| 6,887,506 B2 | 5/2005 | Kalenian | |
| 7,419,692 B1 | 9/2008 | Kalenian | |
| 7,875,304 B2 | 1/2011 | Kalenian | |
| 8,636,946 B1 * | 1/2014 | Olver | F27D 1/0006 266/256 |
| 9,820,603 B2 | 11/2017 | Singer et al. | |
| 11,445,849 B1 * | 9/2022 | Westplate | A47J 31/007 |
| 2008/0280023 A1 | 11/2008 | Kalenian | |
| 2014/0102306 A1 * | 4/2014 | White | A47J 31/061 99/284 |
| 2021/0179967 A1 * | 6/2021 | Craig | B01D 11/0219 |
| 2021/0235918 A1 * | 8/2021 | Chen | A23F 5/26 |
| 2021/0401218 A1 | 12/2021 | Kalenian | |

\* cited by examiner

View B - B

View B - B

SYSTEMS FOR PRODUCING LIQUID EXTRACTS

RELATED APPLICATIONS

This application is a continuation-in-part of U.S. patent application Ser. No. 17/355,868, filed Jun. 23, 2021 now U.S. Pat. No. 11,864,683, titled "Systems and Methods for Producing Liquid Extracts," which claims priority under 35 U.S.C. § 119(e) to U.S. Provisional Patent Application Ser. No. 63/043,242, filed Jun. 24, 2020, and titled "Systems and Methods for Producing Liquid Extracts," each of which is incorporated herein by reference in its entirety for all purposes.

TECHNICAL FIELD

Systems and methods for producing liquid extracts, and related equipment, are generally described.

BACKGROUND

A variety of consumable products can be made by using water and/or other consumable solvents to extract components of solid raw materials. Examples include coffee, tea, and cocoa. Typically, only one consumable product is made at a time at any one extracting location. For instance, home coffee makers simply make a single coffee beverage. As another example, industrial coffee extractors make a single feedstock for dehydration into instant coffee.

Improved systems and methods for making consumable extracts would be desirable.

SUMMARY

Systems and methods for producing liquid extracts, and related equipment, are generally described. The subject matter of the present invention involves, in some cases, interrelated products, alternative solutions to a particular problem, and/or a plurality of different uses of one or more systems and/or articles.

In certain aspects, methods of producing a plurality of liquid extracts from a solid raw material are provided.

In certain embodiments, a method of producing a plurality of liquid extracts from a solid raw material comprises establishing a flow of a solvent through a bed of the solid raw material within a primary extraction pathway to produce a first liquid extract; displacing at least a portion of the raw material from the primary extraction pathway to a secondary extraction pathway; and extending a solid body to make contact with the portion of displaced raw material such that the solid body compresses the portion of displaced raw material to produce a compressed raw material and a second liquid extract from the portion of displaced raw material.

In some embodiments, a method of producing a plurality of liquid extracts from a solid raw material comprises establishing a flow of a solvent through a bed of the solid raw material within an extraction pathway to produce a first liquid extract; displacing a segment of the extraction pathway containing at least a portion of the raw material such that the segment becomes fluidically isolated from an upstream segment of the extraction pathway and a downstream segment of the extraction pathway; and extending a solid body into the displaced segment such that the solid body compresses the portion of the raw material present within the displaced segment to produce a second liquid extract from the portion of raw material present within the displaced segment.

In some aspects, systems for producing liquid extract are provided.

In certain embodiments, a system for producing liquid extract comprises a primary extraction pathway comprising a first fluidic pathway segment, a second fluidic pathway segment adjacent the first fluidic pathway segment; and a secondary extraction pathway, wherein the secondary extraction pathway comprises a movable solid body, and wherein the movable solid body is configured such that the movable solid body can be moved into and out of at least a portion of the secondary extraction pathway.

In certain embodiments, a system for producing liquid extract comprises a first fluidic pathway segment; a second fluidic pathway segment; a movable solid body; and a displaceable fluidic pathway segment positioned between the first fluidic pathway segment and the second fluidic pathway segment, wherein the displaceable fluidic pathway segment is configured such that: when the displaceable fluidic pathway segment is in a first position, the displaceable fluidic pathway segment establishes fluidic communication between the first fluidic pathway segment and the second fluidic pathway segment, and when the displaceable fluidic pathway segment is in a second position, the movable solid body can be moved into and out of the displaceable fluidic pathway segment.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale unless otherwise indicated. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 1A shows the system during production of a first liquid extract. FIG. 1B shows the system during production of a second liquid extract. FIG. 1C shows the system after producing the second extract. FIG. 1D shows the system during removal of a compressed dry spent raw material selectively from the most spent fraction of the raw material in the column;

FIG. 8A shows the system during production of a first liquid extract. FIGS. 8B-8C show the system during production of a second liquid extract. FIG. 8D shows the system during removal of a compressed dry spent raw material selectively from the most spent fraction of the raw material in the column;

DETAILED DESCRIPTION

Figure 1A:
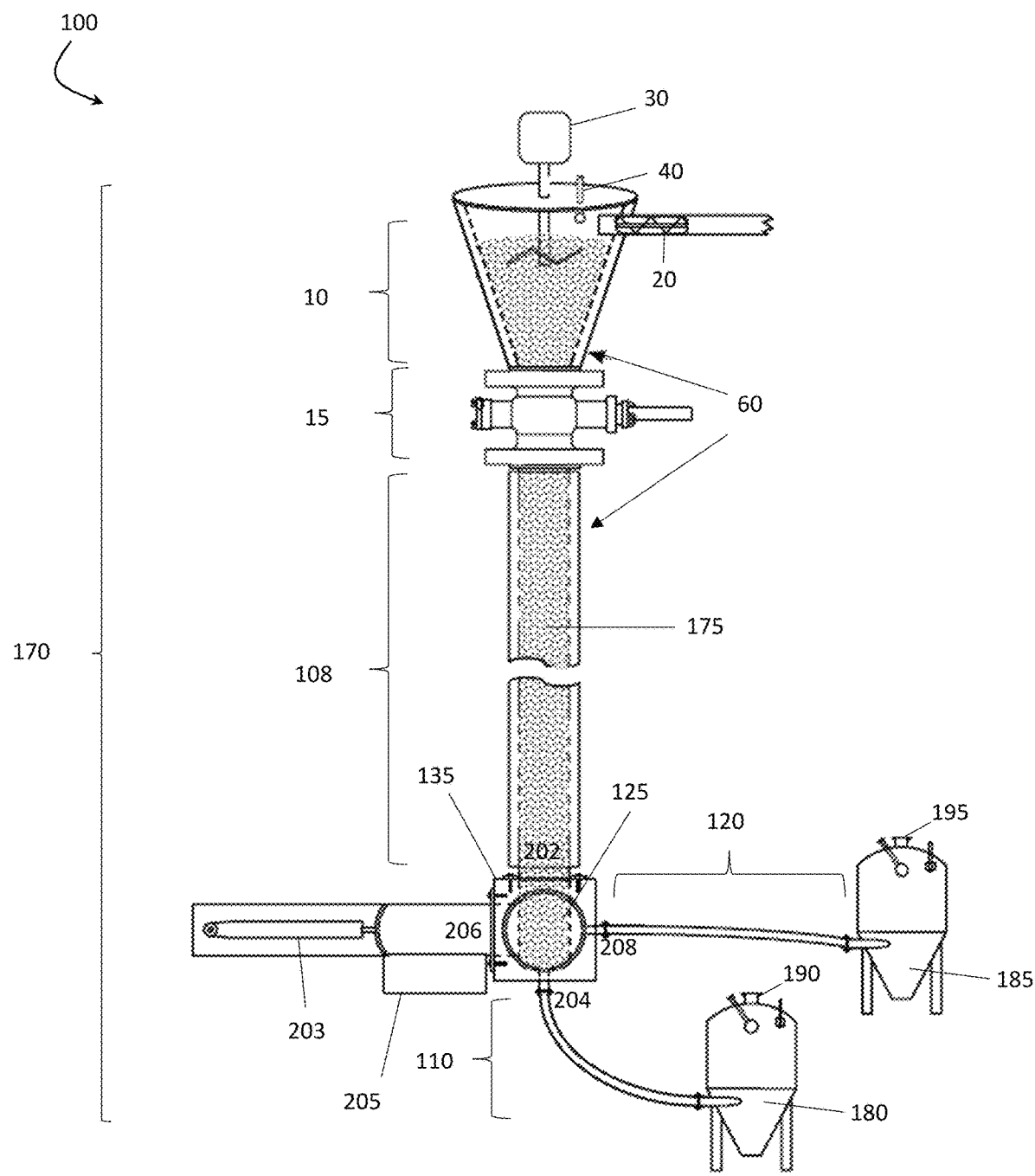
FIGS. 1A, 1B, 1C and 1D are cross-sectional schematic diagrams of a system for the production of liquid extract, in accordance with certain embodiments.

The present disclosure is generally related to systems and methods for producing liquid extracts from a solid raw material, as well as related equipment. Certain aspects are related to the production of multiple liquid extract products using a single system by adjusting one or more displaceable fluidic pathway segments within the system to switch between first and second (or more) extraction configurations. In certain embodiments, a first liquid extract can be produced when the displaceable fluidic pathway segment is in a first configuration, and a second liquid extract (different from the first liquid extract) can be produced when the displaceable fluidic pathway segment is in a second configuration (different from the first configuration). The first configuration can be arranged such that the first liquid extract is produced by flowing solvent through a first fluidic pathway segment that includes a solid raw material (e.g., coffee solids, cannabis, tea, other botanicals, etc.) from which it is possible to extract a useful product, e.g. a consumable food, beverage or flavor product, a fragrance product, a drug or nutraceutical product, a dye or pigment, etc. In a particularly preferred embodiment, the raw material is roasted coffee beans (whole and/or ground) and the extractable product is a beverage and/or ingredient grade coffee extract. In another preferred embodiment, the raw material is cannabis, and the extractable product is a cannabinoid extracting containing one or more of CBC (cannabichromene), CBD (cannabidiol), CBDA (cannabidiolic acid), CBG (cannabigerol), CBN (cannabinol), THC (tetrahydrocannabinol), THCA (tetrahydrocannabinolic acid), and THCV (tetrahydrocannabivarin). The second configuration can be arranged such that the second liquid extract is produced by compressing wetted solid raw material (e.g., a mixture of solvent and any one or more of the solid raw materials mentioned above) and transporting the second liquid extract along a secondary extraction pathway that is different from the first extraction pathway. Optionally, the system may also produce a solid product (e.g., compressed dry spent coffee solids, which may be produced from the most spent raw materials in the column) when the system is in the second configuration. In this way, in accordance with certain embodiments, one can produce multiple liquid extracts having different constituents (and, optionally, at least one additional dry solid product) using a single system by altering the fluidic configuration of the system.

Many solid raw materials can be refined, separated, or purified into multiple "grades," allowing that raw material to be processed into numerous products, thus creating new, focused markets. Most raw materials can be made into numerous high value primary products, often creating valuable byproducts resultant of that separation. Separation technology can allow manufacturers to make an expanded portfolio of products resulting from a single production source, leading to more competitive production economics. For example, raw milk and olive oil are foods that can be made into numerous products. Each product has specific grades, resulting in very different uses and values in the marketplace. Coffee, in particular, is a raw material that is ubiquitous worldwide, but, to date, has been underutilized as a source of multiple products. As noted above, typically, when processing coffee, only one product is made at a time at any processing location. There is a lack of process and separation technology for producing multiple grades of coffee extract from a single source. One aspect of the present disclosure is the recognition that the use of a single system to produce multiple products from coffee and/or other raw materials would be advantageous. Such a system would be especially advantageous if the multiple products could be produced using non-batch processing techniques, such as continuous or semi-batch techniques.

The systems described herein may allow, in certain embodiments, for continuous production of multiple grades of liquid extracts, as well as at least one solid dry product, e.g., from the most spent raw materials. For instance, in some embodiments, the system may physically separate the most spent fraction of raw materials from an extraction pathway, remove both interstitial and absorbed extracts from that most spent fraction of the raw materials by mechanical compression, and discharge dry spent raw material as a dry solid product. It may be advantageous both economically and operationally to dispose the dry spent raw materials as dry solid product as opposed to a slurry of spent raw material in typical extraction systems.

The term "solid raw material," as used herein, refers to a solid material comprising at least one component that is a consumable material and at least one other solid component that is insoluble in a consumable solvent. The insoluble component is generally insoluble at the operating conditions (e.g., operating temperature and pressure) of the system. As used herein, the term "consumable material" refers to an extractable component of a solid raw material that can be dissolved or suspended in, and is extracted by, the consumable solvent. For example, the extractable component may be suspended in the consumable solvent under normal gravity, in certain embodiments. The term "consumable solvent," as used herein refers to an ingestible, essentially non-toxic liquid that is capable of dissolving or suspending a non-zero amount of the consumable material. In certain embodiments, it can be advantageous to use aqueous solvents. An "aqueous solvent" is a solvent that comprises water. In some embodiments, at least 50 wt % (or at least 65 wt %, at least 80 wt %, at least 95 wt %, at least 99 wt %, or all) of the aqueous solvent is water. Aqueous solvents may additionally include other components that are soluble or miscible in the water, which components may be useful or desired for particular applications. When an aqueous solvent is employed in the invention, the consumable extracts produced will be aqueous extracts. Alternatively, depending on the type of solid raw material employed and the type of extraction, non-aqueous solvents may be instead employed as the extraction solvent. For example, in embodiments in which the solid raw material comprises cannabis, aqueous and/or non-aqueous solvents may be employed, such as, but not limited to, hydrocarbons such as hexane, butane and propane; alcohols such as isopropanol and ethanol; supercritical fluids such as supercritical carbon dioxide; fluorinated solvents such as tetrafluoroethane; aqueous solvents such as water (e.g. either or of cold and hot water extraction may be employed with or without pressurization) and combinations thereof.

The term "dry" solid material, as used herein, is a solid material from which at least a portion of the solvent has been removed. In some embodiments, at least 50 wt % (or at least 60 wt %, at least 70 wt %, at least 80 wt %, at least 90 wt %, at least 95 wt %, at least 99 wt %, or all) of the solvent has been removed to produce the "dry" material.

The term "spent" solid material, as used herein, is a solid material from which at least a portion of the extractable component has been extracted. In some embodiments, at least 50% (or at least 60 wt %, at least 70 wt %, at least 80 wt %, at least 90 wt %, at least 95 wt %, at least 99 wt %, or all) of the extractable components has been extracted to produce the "spent" material.

According to certain embodiments, the solid raw material comprises coffee beans, e.g., green or roasted coffee beans. The coffee beans can be ground or unground. In some embodiments, the solid raw material comprises roasted, ground coffee beans. While various embodiments herein are described as employing coffee beans, it should be understood that the disclosure is not limited to the use of coffee beans as the solid raw material, and in certain cases, solid raw materials that are not coffee beans could also be used. Non-limiting examples of other solid raw materials are provided elsewhere herein.

In accordance with certain embodiments, systems and methods described herein can be used to produce a plurality of liquid extracts from the solid raw material (e.g., a first liquid extract, a second liquid extract, and, optionally, a third, fourth, fifth, or additional liquid extract). As one illustrative example, in certain embodiments in which coffee beans are used as the solid raw material, various of the systems and methods described herein can be used to produce a beverage grade coffee extract as a first liquid extract, and an ingredient grade coffee extract as the second liquid extract. The beverage grade coffee extract may include consumable materials that are predominantly flavor and aroma components extracted from coffee beans in solution. On the other hand, the ingredient grade coffee extract may include predominantly colorant and caffeine components extracted from coffee beans in solution. In addition, in some embodiments, at least one dry solid product may be produced from the solid raw materials. In some cases, it may be advantageous (e.g., economically and/or environmentally) to process the dry solid product (e.g., in a cogeneration system or combined heat and power cycle) to produce energy and/or re-usable byproducts (e.g., fertilizers). As another illustrative example, in embodiments in which cannabis is used as the solid raw material, embodiments of the systems and methods described herein can be used to produce a first liquid extract containing a first species of interest, e.g., cannabinol (CBD), and a second liquid extract containing a second species of interest, e.g., tetrahydrocannabinol (THC).

Certain aspects are related to a system for producing liquid extract from a solid raw material, e.g., coffee beans. The system comprises, in accordance with certain embodiments, multiple fluidic pathways for producing a plurality of liquid extracts. For instance, the multiple fluidic pathways may be arranged into different configurations during different extraction steps to produce the plurality of liquid extracts. As one example, a primary extraction pathway associated with a primary extraction step may be used to produce a first liquid extract, and a secondary extraction pathway may be associated with a secondary extraction step to produce a second liquid extract. It should be noted that the system is not limited to having only a primary pathway and a secondary extraction pathway. In other examples, extraction pathways in addition to the primary and secondary extraction pathways (e.g., a tertiary extraction pathway, a quaternary extraction pathway, etc.) may be used to produce additional liquid extracts (e.g., a third liquid extract, a fourth liquid extract, etc.).

In accordance with certain embodiments, the primary extraction pathway comprises a first fluidic pathway segment, a second fluidic pathway segment, and an adjustable displaceable fluidic pathway segment positioned between the first fluidic pathway segment and the second fluidic pathway segment. A non-limiting example of a system for producing multiple liquid extracts is illustrated in FIG. 1A. As shown in FIG. 1A, system 100 comprises first fluidic pathway segment 108, second fluidic pathway segment 110, and displaceable fluidic pathway segment 125, where the displaceable fluidic pathway segment 125 is positioned between the first fluidic pathway segment 108 and the second fluidic pathway segment 110. In accordance with certain embodiments, to produce the first liquid extract from a primary extraction step, the displaceable fluidic pathway segment may be in a first position configured to establish fluidic communication with the first fluidic pathway segment and the second fluidic pathway segment (e.g., as shown in FIG. 1A).

Figure 1B:
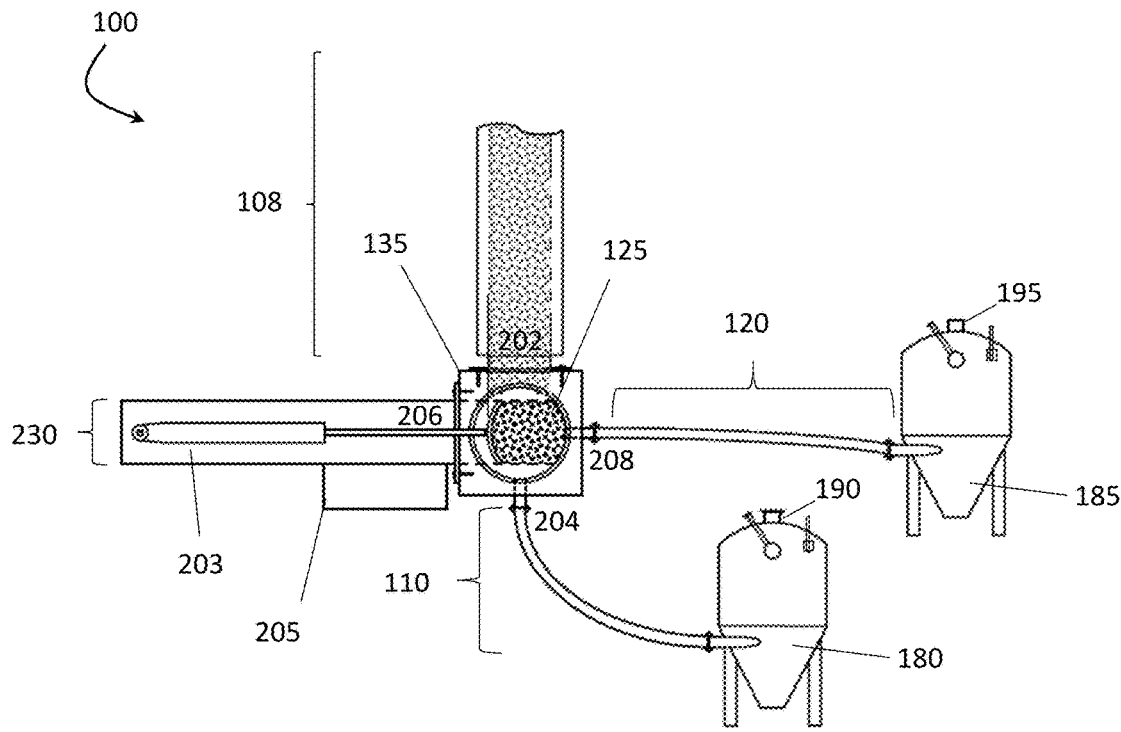

In some embodiments, the system further comprises a secondary extraction pathway comprising a movable solid body, a third fluidic pathway, and the same displaceable fluidic pathway segment from the primary extraction pathway. In accordance with certain embodiments, the displaceable fluidic pathway segment may be positioned between the first fluidic pathway segment and the second fluidic pathway segment and between the movable solid body and the third fluidic pathway. As shown in FIG. 1A, for example, system 100, in addition to comprising first fluidic pathway segment 108 and second fluidic pathway segment 110, also comprises movable solid body 203, third fluidic pathway 120, and displaceable fluidic pathway segment 125. Displaceable fluidic pathway segment 125 is positioned between first fluidic pathway segment 108 and second fluidic pathway segment 110, and it is also positioned between movable solid body 203 and third fluidic pathway 120. In some embodiments, the displaceable fluidic pathway segment can be configured to be displaced from a first position to a second position to allow for production of distinct liquid extract at each position, e.g., beverage grade coffee extract at a first position, and ingredient grade coffee extract at a second position. Accordingly, to produce a second liquid extract from the secondary extraction step, the displaceable fluidic pathway segment may be adjusted to a second position to establish fluidic communication with the third fluidic pathway and such that the movable solid body can be moved into the displaceable fluidic pathway segment (e.g., as shown in FIG. 1B).

Figure 6:
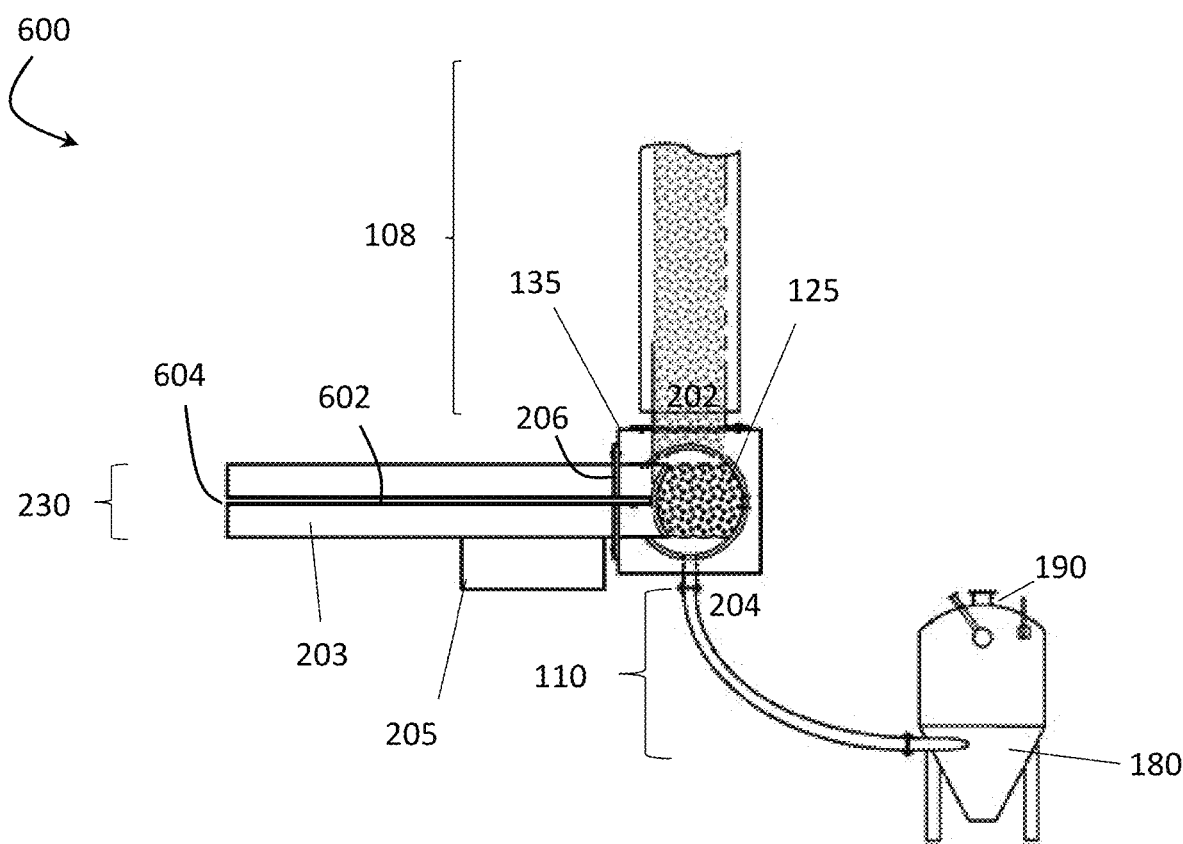
FIG. 6 is a cross-sectional schematic illustration showing a system in which liquid extract can be removed from the system via a fluid passageway within a moveable solid body, according to certain embodiments.

It should be noted that although FIGS. 1A-1D illustrate a system in which the displaceable fluidic pathway segment is positioned between a third fluidic pathway and a moveable solid body, the disclosure is not so limited, and in other embodiments, other positioning can be adopted. For instance, in some embodiments, the movable solid body may comprise an inner volume (e.g., an internal bore) through which an extract can be transported. In one embodiment, the moveable solid body comprises a screen (e.g., at or near the front of the moveable solid body). In some such embodiments, extract can be transported through the screen of the moveable solid body and out of the system via the inner volume of the movable solid body. FIG. 6 is a schematic illustration of one such system 600 that could be used in this manner. The arrangement shown in FIG. 6 is similar to the arrangement illustrated in FIG. 1B, except that port 208 is not present, and rather than transporting the secondary extract through third fluidic pathway 120, the secondary extract is transported through inner volume 602 of moveable solid body 203. In some such embodiments, when the displaceable fluidic pathway segment is in the second position (e.g., as illustrated in FIG. 6), as the movable solid body extends into the displaceable fluidic pathway segment and compresses a portion of the raw material present within the displaceable fluidic pathway segment, a liquid extract may be collected by the inner volume within the moveable solid body (e.g., 602 in FIG. 6) and subsequently transported to an external container (e.g., via outlet 604 shown in FIG. 6).

In some embodiments, the third fluidic pathway and the inner volume of the moveable solid body may both be present. For example, the moveable solid body shown in FIG. 6 could be used in conjunction with system 100 shown in FIGS. 1A-1D. In some such embodiments, the third fluidic pathway may be used as a part of the secondary extraction pathway to collect a liquid extract (e.g., a second liquid extract), and the inner volume of the moveable solid body may be used as a part of a tertiary extraction pathway to collect yet another liquid extract (e.g., a third liquid extract).

According to some embodiments, prior to extracting a plurality of liquid extracts from the system described herein, the solid raw material may be pre-wetted by a solvent in a chamber. As shown in FIG. 1A, a chamber 10 (e.g., a funnel) may be used to house the solid raw material and the solvent. The chamber may be, in some embodiments, enclosed, as shown in FIG. 1A. The solid raw material and solvent may be introduced into the chamber separately, at a desired ratio, through a solid feed device (e.g., an auger) and a liquid feed device (e.g., a spray ball). A device (e.g., a mixer), that is capable of uniformly pre-wetting and mixing the solid raw material in the solvent may be incorporated into the chamber. For example, as shown in FIG. 1A, the solid raw material may be introduced into chamber 10 via auger 20 and mixed with a solvent introduced into chamber 10 via spray ball 40 using mixer 30. In certain embodiments, the top mounted mixer 30 is designed to produce specific mixing patterns in chamber 10; for example, in certain embodiments, mixer 30 is configured to mix horizontally in layers as opposed to mixing vertically.

In some embodiments, a valve (e.g., regulator, ball valve, check valve, etc.) may be used to regulate flow of the pre-wetted solid material into an upstream segment of the primary extraction pathway (e.g., an extraction column). For example, FIG. 1A shows valve 15 positioned between chamber 10 and first fluidic pathway segment 108 that can be used to control the flow of the pre-wetted solid raw material into first fluidic pathway segment 108 of extraction pathway 170. For another example, in the system illustrated in FIG. 7A, a valve (not shown) may also be implemented to regulate flow of the pre-wetted solid material into first fluidic pathway segment 708.

Certain embodiments comprise establishing a flow of a solvent through a bed of the solid raw material within an extraction pathway (e.g., a primary extraction pathway) to produce a first liquid extract during a primary extraction step. In some embodiments, the extraction pathway comprises an extraction column located in a first fluidic pathway segment. In some embodiments, the solvent is a consumable solvent (e.g., a consumable aqueous solvent). In the extraction column, the solvent can be used to extract and/or solubilize certain consumable materials from a solid raw material. In some embodiments, the dimension (e.g., height and diameter) of the extraction column determines the length of flow path of the solvent and may be adjusted accordingly to control the Brix (e.g., concentration of an extractable component) of the resultant liquid extracts. As described elsewhere herein, a primary extraction pathway may be associated with a primary extraction step to produce a first liquid extract. In some instances, the primary extraction pathway comprises a first fluidic pathway segment, a second fluidic pathway segment, and a displaceable fluidic pathway segment (e.g., a segment that can be displaced between the first position and a second position). For example, in accordance with certain embodiments, FIG. 1A shows extraction pathway 170 containing first fluidic pathway segment 108, second fluidic pathway segment 110, and displaceable fluidic pathway segment 125 positioned between the first and second fluidic pathway segments, where a bed of the solid raw material may be contained in one or more portions of the extraction pathway (e.g., in both displaceable fluidic pathway segment 125 and first fluidic pathway segment 108). In some embodiments, the second fluidic pathway segment is free or substantially free of solid raw material.

In some embodiments, the flow of a solvent through a bed of the solid raw material to produce a first liquid extract can be achieved when the displaceable fluidic pathway segment is in a first position. For instance, according to certain embodiments, when the displaceable fluidic pathway segment is in a first position, the displaceable fluidic pathway segment establishes fluidic communication between the first fluidic pathway segment and the second fluidic pathway segment. For example, FIG. 1A shows a non-limiting representation of a system with displaceable fluidic pathway segment 125 in a first position, where the displaceable fluidic pathway segment 125 establishes fluidic communication between first fluidic pathway segment 108 and second fluidic pathway segment 110.

Figure 7A:
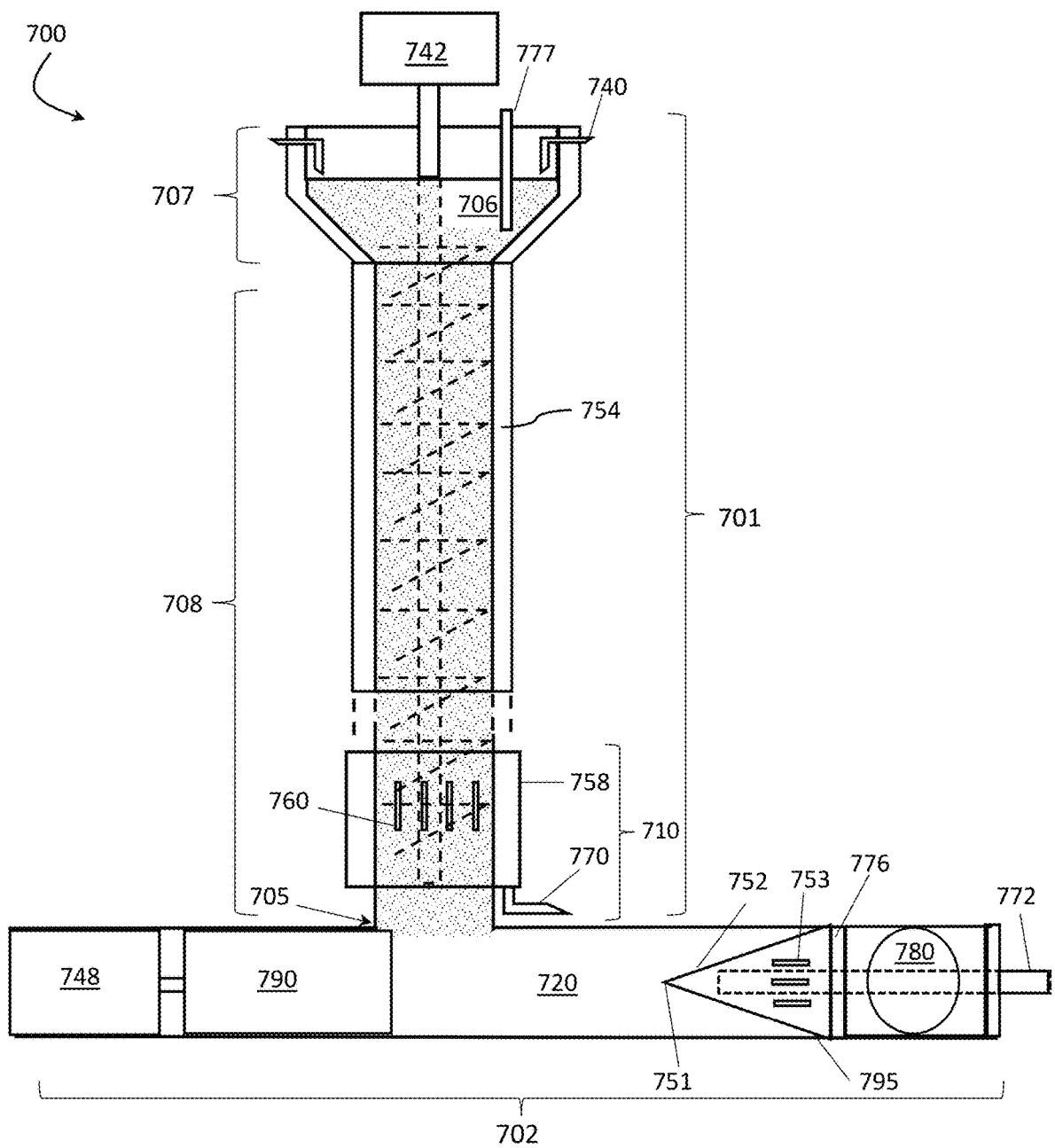
FIGS. 7A, 7B, and 7C are schematic illustrations of a system for the production of liquid extract, in accordance with certain embodiments.

In some embodiments, the extraction pathway is substantially vertical (e.g., deviating less than 10 degrees from the vertical direction along the entirety of the extraction pathway), e.g., as shown in FIGS. 1A and 7A. Given the vertical position of the extraction pathway, the flow of solvent through a bed of the solid raw material may be concurrent to gravity, such that gravity plays a role in extracting the first liquid extract.

According to certain embodiments, when the displaceable fluidic pathway segment is in a first position, the first liquid extract can flow through the primary extraction pathway into a first container. For example, as illustrated in FIG. 1A, when displaceable fluidic pathway segment 125 is in a first position (shown with its longitudinal axis in a vertical position in FIG. 1A), the first liquid extract can flow through extraction pathway 170 into first container 180. In some embodiments, the displaceable fluidic pathway segment further comprises a filter. A non-limiting example of the filter is a filter screen. The filter can be used, in accordance with certain embodiments, to inhibit or prevent the transfer of solid raw material into a portion of the extraction pathway that is downstream of the segment (e.g., into the second fluidic pathway segment), by preferentially allowing the first liquid extract to pass through the filter. Consequently, the first liquid extract may comprise a relatively small amount of the insoluble component of the solid raw material. In some embodiments, the first container may be a tank (e.g., swirl tank) that is used to temporarily store the first liquid extract before final packaging, or the first container itself may be a package (e.g., a bag or a pouch) that can be filled with the first liquid extract and sold directly.

Certain embodiments comprise applying vacuum to at least a portion of the primary extraction pathway during production of the first liquid extract. The application of a vacuum can facilitate the flow of a solvent through a bed of the solid raw material to produce a first liquid extract. In some embodiments, a vacuum may be applied to the displaceable fluidic pathway segment of the primary extraction pathway to aid in the extraction of the first liquid extract. For instance, as shown in FIG. 1A, a vacuum may be drawn from a vacuum pump 190 situated in a first container 180 and applied to a least a portion of the extraction pathway (e.g., the displaceable fluidic pathway segment 125) during production of the first liquid extract. Although the system shown in FIG. 1A-1D generally relies on gravity and vacuum as means of liquid extraction, it should be noted that in some embodiments, the extraction column may also be pressurized to facilitate the extraction process.

In some embodiments, the primary extraction pathway (e.g., such as 701 in FIG. 7A or 170 in FIG. 1A) has a maximum temperature of no more than 240° F. During the production of the first liquid extract (e.g., beverage grade coffee extract), the maximum operating temperature of the extraction pathway may dictate the degree of extraction of the raw solid material (e.g., coffee beans), and consequently affect the composition of the first liquid extract. For instance, in some embodiments (e.g., in certain instances in which a beverage grade coffee extract containing predominantly aroma and flavor components is being produced), a maximum operating temperature may be no more than 240° F., no more than 230° F., no more than 220° F., no more than 210° F., no more than 200° F., no more than 198° F., no more than 197° F., no more than 195° F., no more than 193° F., or no more than 190° F. In accordance with certain embodiments, operating below the above-mentioned temperatures can prevent the denaturation of the consumable components from the solid raw material during the extraction process. In some, although not necessarily all, embodiments, operation below 200° F. can be particularly advantageous. According to some embodiments, a temperature control device (e.g., a heat exchanger) may be used to modulate the temperature in the extraction pathway. A non-limiting representation of one such embodiment is shown in FIGS. 1A and 7A, where a temperature control device 60 or 754 (e.g., a water jacket) surrounds a portion of the primary extraction pathway 170 or 701 to maintain the temperature of the primary extraction pathway.

According to certain embodiments, the temperature in different sections of the system and/or extraction pathway can be independently controlled to allow for selective heating and cooling of different sections in the system and/or extraction pathway. For instance, the chamber (e.g., funnel) may be operated as a jacket heated vessel to increase wetting and/or blooming of the solid raw materials by controlling the temperature, optionally with the aid of a mixer. In some instances, the temperature profile of the chamber may be one at which a majority of the extractable components can be extracted from the solid raw material during the time the solid raw material resides within the chamber. In some embodiments, the maximum temperature may be no more than 200° F., no more than 195° F., no more than 193° F., or no more than 190° F. In certain embodiments, the mixer 30 or mixing impellers/augers thereof may also be heated, e.g. through incorporation of resistive heating elements. According to some embodiments, the extraction pathway(s) below the chamber (e.g., first fluidic pathway segment, displaceable fluidic pathway segment, second fluidic pathway segment, third fluidic pathway, etc.) may be operated at a lower temperature compared to the chamber to allow production of liquid extracts at a lower temperature. In some embodiments, the maximum operating temperature of the extraction pathway(s) below the chamber may be no more than 200° F., no more than 150° F., no more than 100° F., no more than 50° F., or no more than 40° F. For example, the liquid extracts may be produced as chilled or cold liquid extracts. In accordance with certain embodiments, different operating temperatures may be used to produce different liquid extracts. For instance, in some embodiments, the system may be operated at a lower temperature to produce chilled or cold liquid extracts, operated at an elevated temperature of no more than 212° F. (or no more than 200° F.) to reduce denaturation (e.g., hydrolysis, etc.) of extractable components and produce a first liquid extract (e.g., beverage grade coffee), and/or operated at greater than or equal to 212° F. to produce a different grade of liquid extract (e.g., instant coffee).

Certain embodiments comprise displacing at least a portion of the raw material from the primary extraction pathway. According to some embodiments, displacing at least a portion of the raw material comprises displacing a segment of the extraction pathway containing at least a portion of the raw material such that the segment becomes fluidically isolated from an upstream segment of the extraction pathway and a downstream segment of the extraction pathway. For example, the displaceable fluidic pathway segment may be displaced from a first position in which the displaceable fluidic pathway segment is fluidically connected to an upstream segment of the primary extraction pathway and a downstream segment of the primary extraction pathway, to a second position in which the displaceable fluidic pathway segment becomes fluidically isolated from an upstream segment of the primary extraction pathway and a downstream segment of the primary extraction pathway. A non-limiting representation of the displaceable fluidic pathway segment is shown in FIGS. 1A-1B. In one example, displaceable fluidic pathway segment 125 containing at least a portion of the raw material may be displaced from a first position in which segment 125 is fluidically connected to an upstream segment (e.g., first fluidic pathway segment 108) of the primary extraction pathway and a downstream segment (e.g., second fluidic pathway segment 110) of the primary extraction pathway as shown in FIG. 1A, to a second position, where segment 125 containing at least a portion of the raw material becomes fluidically isolated from an upstream segment (e.g., first fluidic pathway segment 108) of the primary extraction pathway and a downstream segment (e.g., second fluidic pathway segment 110) of the primary extraction pathway as shown in FIG. 1B. In some embodiments, fluidically isolating the displaceable fluidic pathway segment from the upstream segment and downstream segment of the extraction pathway stops the production of the first liquid extract. In accordance with certain embodiments, the displaceable fluidic pathway segment comprises the most spent solid raw materials. The "most spent raw materials," as used herein, describes raw materials containing the least amount of consumable materials (e.g., extractable components) along an extraction pathway.

In some embodiments, the displaceable fluidic pathway segment is part of a rotary valve (e.g., a rotary disc valve) and can be rotated from one position to another. FIG. 3B shows a non-limiting representation of rotary valve 135 comprising displaceable fluidic pathway segment 125. In accordance with certain embodiments, the rotary valve comprises 4 ports (e.g., 202, 204, 206, and 208 as shown in FIG. 3B) spaced 90 degrees apart from each other. The ports may be connected to different fluidic pathways in a system for producing liquid extracts. In some cases, the rotary valve comprise a displaceable fluidic pathway segment that may be rotated from one position to another to establish fluidic communication with different ports. For instance, as shown in FIG. 3B, rotary valve 135 may contain displaceable fluidic pathway segment 125 and may be rotated first counterclockwise and then clockwise at 90 degree increments to establish fluidic communication with different ports (e.g., 202, 204, 206, and 208). The same rotary valve 135 from FIG. 3B may be used in system 100 in FIGS. 1A-1D.

According to some embodiments, displacing a segment of the extraction pathway containing at least a portion of the raw material comprises rotating a rotary valve containing at least the portion of the raw material. As shown in FIG. 1A, in accordance with certain embodiments, rotary valve 135 comprises displaceable fluidic pathway segment 125 that contains a portion of the raw material. According to some embodiments, the portion of the raw material present in the displaceable fluidic pathway comprises the most spent raw materials. In some embodiments, the rotary valve containing at least a portion of the raw material may be rotated counterclockwise by a certain angle, e.g., 90 degrees, from a first position, where the displaceable fluidic pathway segment is in fluidic communication with an upstream segment and a downstream segment of the extraction pathway, to a second position, where the displaceable fluidic pathway segment becomes fluidically isolated from an upstream segment of the extraction pathway and a downstream segment of the extraction pathway. As shown in FIG. 1A-1B, the rotary valve 135 containing at least a portion of the raw material 165 may be rotated by a certain angle, e.g., 90 degrees, from a first position as shown in FIG. 1A, to a second position, as shown in FIG. 1B. It should be understood that displacing a segment is not necessarily limited to rotating the segment via the use of a rotary valve, and other methods of displacement involving other components may be used, as long as the segment or a portion of the segment can be displaced from one position to another to alter fluidic communication between different pathways.

Figure 1C:
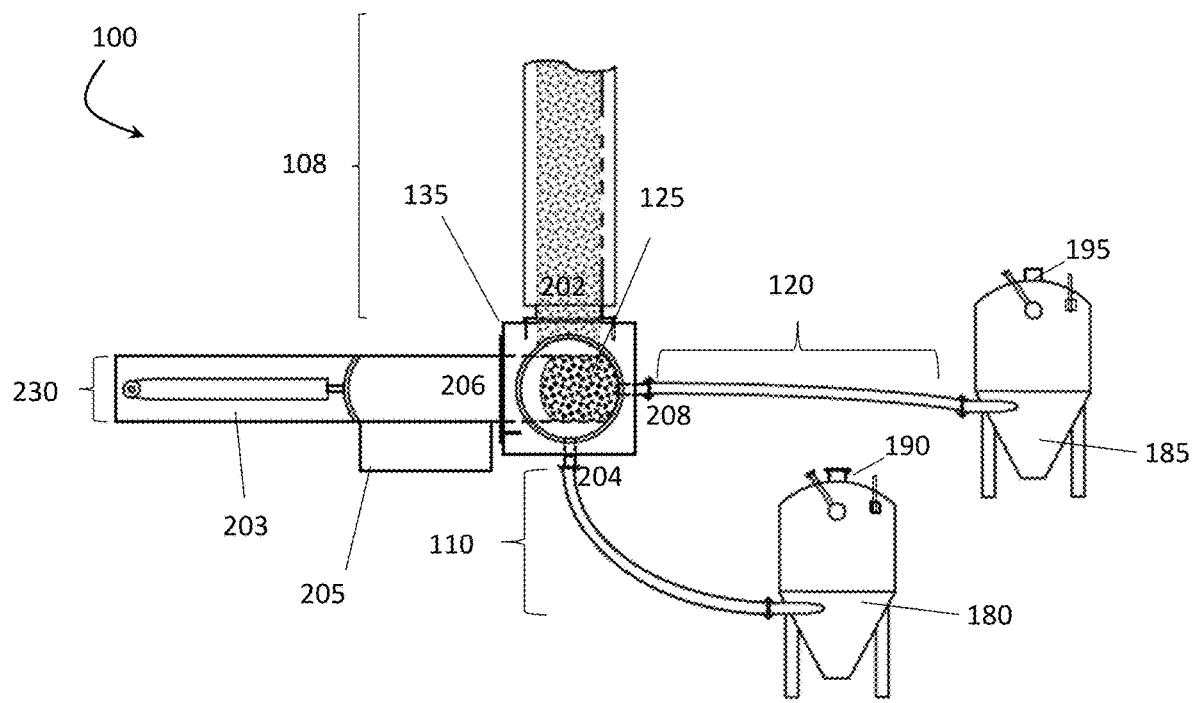

In accordance with certain embodiments, a secondary extraction pathway may be used to produce a second liquid extract. In some embodiments, when the displaceable fluidic pathway segment is in a second position, the displaceable fluidic pathway segment is in fluidic communication with the third fluidic pathway, and the movable solid body can be moved into and out of the displaceable fluidic pathway segment. FIG. 1B shows a non-limiting example of displaceable fluidic pathway segment 125 in a second position, where displaceable fluidic pathway segment 125 is in fluidic communication with third fluidic pathway 120 and movable solid body 203 can be moved into displaceable fluidic pathway segment 125. Similarly, while in the second position, the movable solid body may also be moved out of the displaceable fluidic pathway segment. For example, as shown in FIG. 1C, when displaceable fluidic pathway segment is in a second position, movable solid body 203 can be moved out of displaceable fluidic pathway segment 125. In accordance with certain embodiments, when the displaceable fluidic pathway segment is in a second position, the fluid communication between the displaceable fluidic pathway segment and the third fluidic pathway allows for the production of a second liquid extract (e.g., an ingredient grade coffee extract) from the solid raw material contained within the displaceable fluidic pathway segment.

Figure 5A:
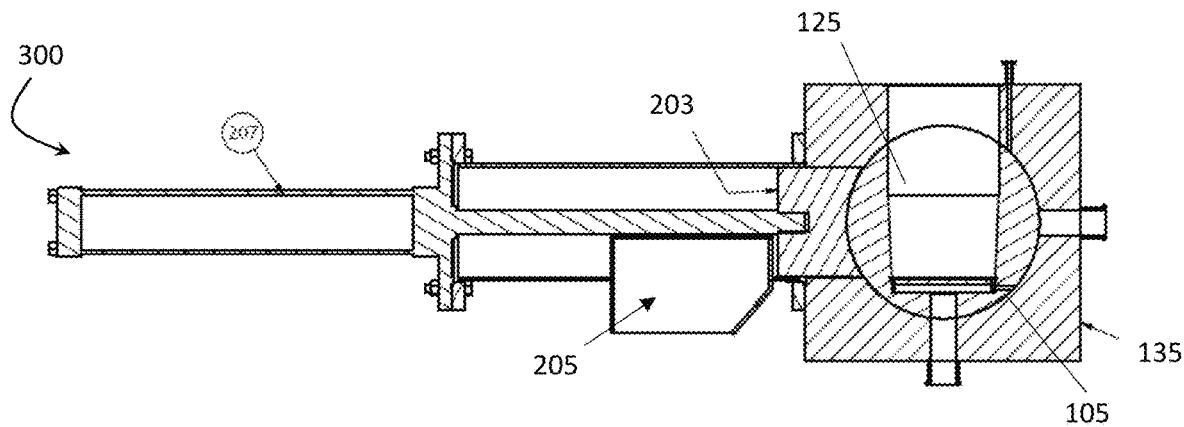
FIGS. 5A, 5B, and 5C are cross-sectional schematic illustrations showing the operation of an assembly comprising a hydraulic piston and a rotary disc valve in three stages, in accordance with some embodiments.
Figure 5B:
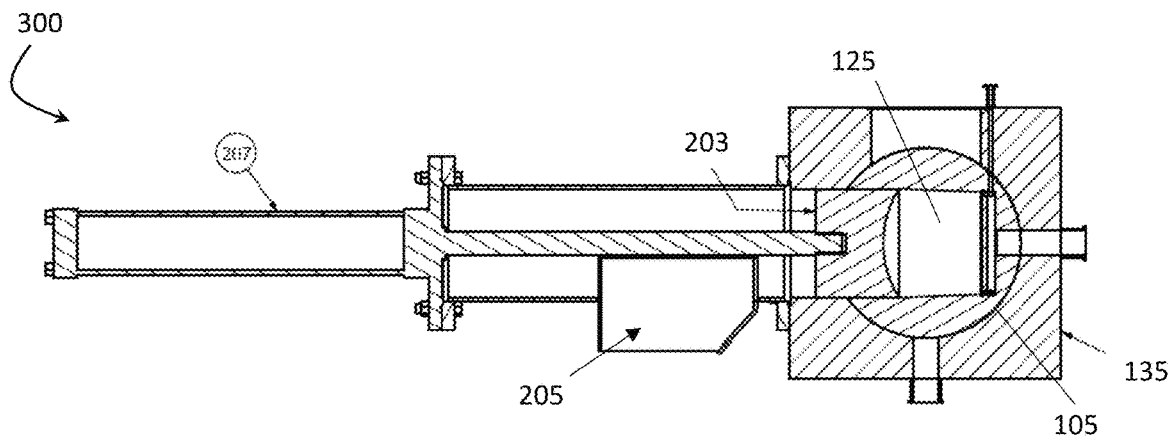
Figure 5C:
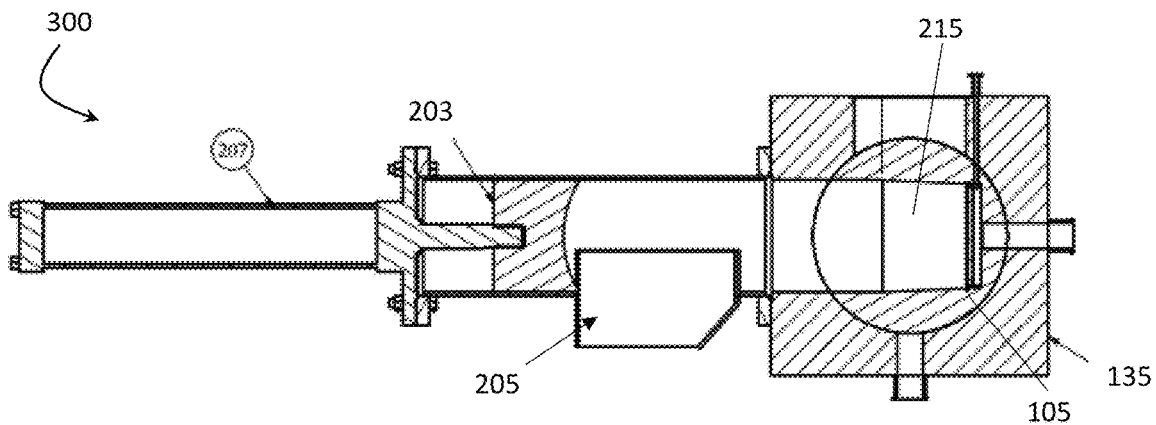

Certain embodiments comprise extending a solid body to make contact with the portion of displaced raw material contained within the secondary extraction pathway (e.g., the displaced segment). According to some embodiments, the solid body may be extended into the displaced segment such that the solid body compresses the portion (e.g., the most spent portion) of the raw material present within the displaced segment to produce a second liquid extract from the portion of raw material present within the displaced segment. In some embodiments, the movable solid body comprises a hydraulic or linear motion piston. Accordingly, in accordance with certain embodiments, extending the solid body into the displaced segment comprises extending a hydraulic piston into the displaced segment. A non-limiting example of a hydraulic piston is shown in FIGS. 5A-5C. FIG. 5A shows rotary valve 135 comprising displaceable fluidic pathway segment 125 and movable solid body 203, e.g., hydraulic piston, resting against the curved interface of valve disc 105 when rotary valve 135 is in a first position. As shown in FIG. 5B, as the rotary valve 135 rotates to a second position, the movable solid body 203 can be extended into the displaceable fluidic pathway segment 125. As shown in FIG. 5C, movable solid body 203 can also be retracted from displaceable fluidic pathway segment 125. The same hydraulic piston 203 and rotary valve 135 in FIGS. 5A-5C can be used in the extraction system illustrated in FIGS. 1A-1D.

In certain embodiments, as the solid body compresses the portion of the raw material present within the displaced segment, a second liquid extract may be produced from the portion of raw material present within the displaced segment. For instance, the solid body (e.g., hydraulic piston) may exert a sufficient force against the portion of the raw material present within the displaced segment to compress some or all of the remaining liquid components (which become the second liquid extract) out of the raw material. For instance, as shown in FIG. 1B, as solid body 203 compresses the portion of raw material present within displaced segment 125, a second liquid extract may be produced from the portion of raw material. According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the remaining extractable components are removed from the raw material present within the displaceable segment. According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the solvent is removed from the raw material present within the displaceable segment.

According to some embodiments, the second liquid extract flows from the raw material present within the displaced segment through a filter that prevents all or a majority of the insoluble solid components from leaving the displaced segment. As described elsewhere herein, in some embodiments, the displaceable fluidic pathway segment comprises a filter. In some embodiments, as the displaceable fluidic pathway segment is displaced to a second position, the filter is also displaced to a second position. A non-limiting example of the filter is a filter screen. Other non-limiting examples of filter include meshes and basket filters. Generally, any filter that can be used to separate liquid extract from the insoluble component of the solid raw material could be employed.

Certain embodiments comprise applying vacuum to at least a portion of the displaced segment during production of the second liquid extract. The application of a vacuum can facilitate the extraction of the liquid component from the raw material present within the displaced segment. In some embodiments, the vacuum may be applied to the portion of displaced segment that comprises the raw material via a third fluidic pathway. For instance, as shown in FIG. 1B, a vacuum may be drawn from vacuum pump 195 situated in a second container 185 (e.g., a swirl tank) and applied to at least a portion of displaced segment 125, via third fluidic pathway 120 during production of the second liquid extract. According to some embodiments, the vacuum may be applied at the same time as the movable solid body (e.g., hydraulic piston) extends into the displaced segment and compresses the portion of the raw material present within the displaced segment. The vacuum-assisted compression of the raw material present within the displaced segment may be used to increase the rate of production of the second liquid extract.

Certain embodiments comprise retracting the movable solid body from the displaced segment after the solid body compresses a portion of the raw material present within the displaced segment. A non-limiting representation of one such embodiment is shown in FIG. 1C. As shown in FIG. 1C, after solid body 203 compresses a portion of the raw material present within displaceable fluidic pathway segment 125, solid body 203 can be retracted. According to some embodiments, the solid body may be retracted after the compressed raw material present the displaced segment becomes dry or dewatered. As used herein, "dewatered" means that at least 50 wt % of the water initially present is removed. In some embodiments, at least 60 wt %, at least 70 wt %, at least 80 wt %, at least 90 wt %, at least 95 wt %, at least 99 wt %, or more of the water can be removed during the compression step. According to some embodiments, specific operating parameters associated with the movable solid body (e.g., hydraulic piston) can be selected based on the amount of the portion of raw material present within the secondary extraction pathway (e.g., displaced segment) and the extent of dewatering of the raw material required. For instance, typical operating parameters may include size (e.g., length) and pressure (e.g., hydraulic pressure).

Figure 1D:
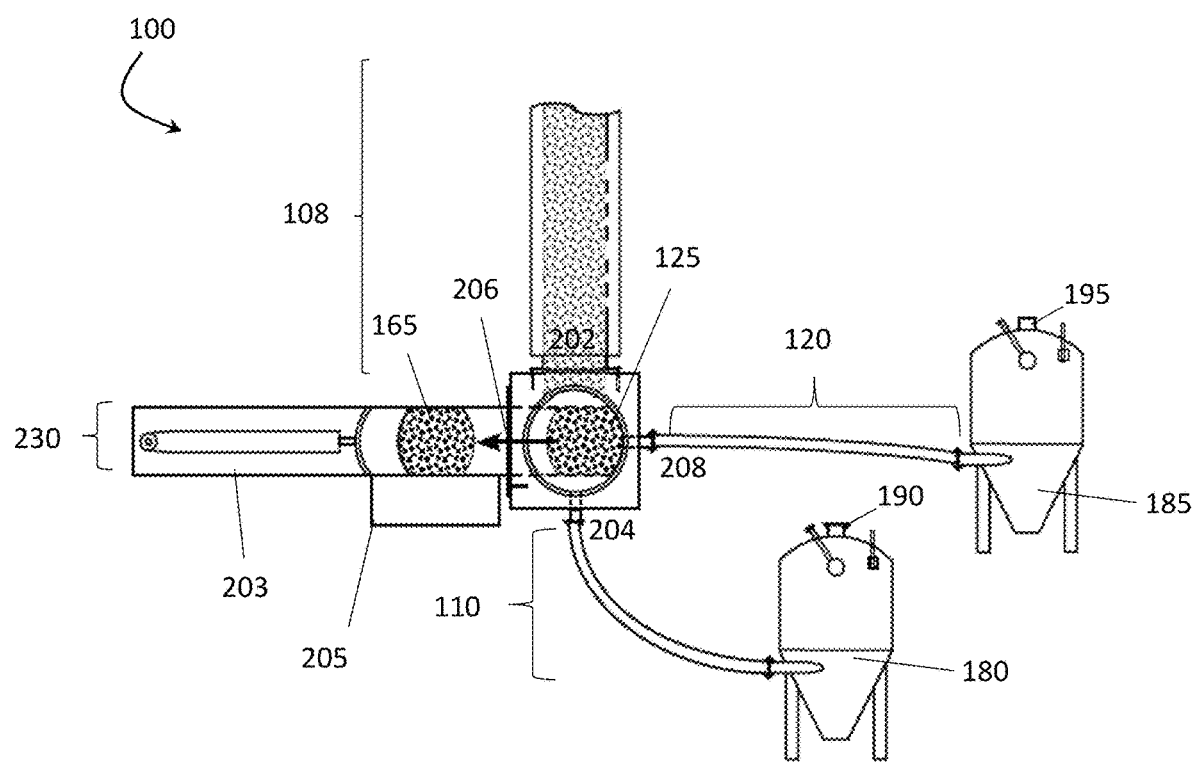
Figure 2:
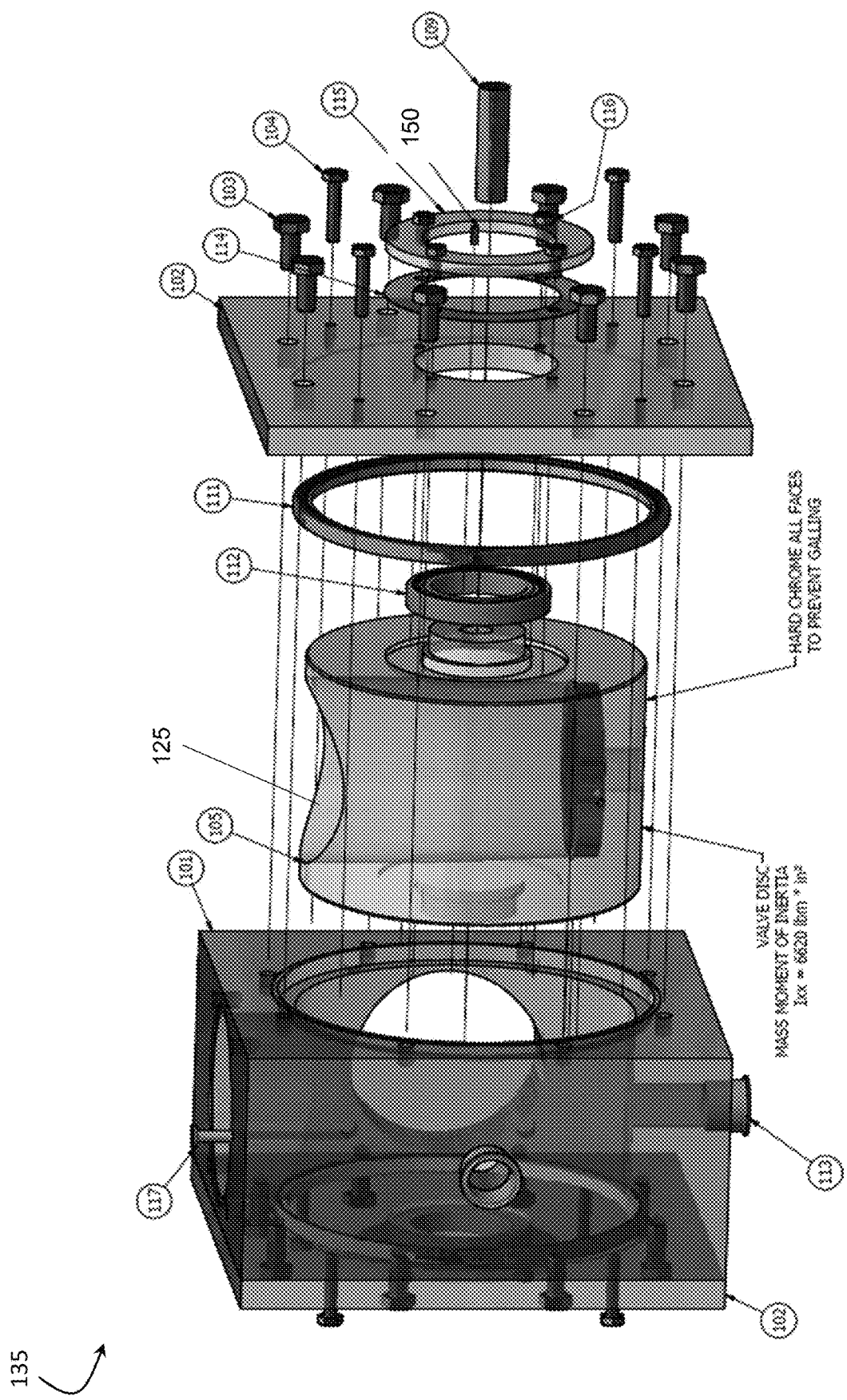
FIG. 2 is a perspective view schematic illustration of a rotary disc valve, in accordance with some embodiments.

Certain embodiments comprise removing at least a portion of the compressed raw material from the displaced segment. The compressed raw material generally comprises dry spent raw material from the extraction pathway. For instance, after retracting the solid body from the displaced segment, the compressed raw material can be removed from the displaced segment. For example, as shown in FIG. 1D, after retracting solid body 203 from the displaced segment, compressed raw material 165 may be removed from displaceable fluidic pathway segment 125. Specifically, the compressed raw material 165 may be moved in a direction away from the displaceable fluidic pathway segment 125 and disposed in a third container 205. In some embodiments, the compressed raw material can be removed from the displaced segment at the same time the solid body retracts from the displaced segment. For instance, a flow of lightly pressurized nitrogen flow may be used to remove the compressed raw material at the same time the piston retracts from the displaced segment.

According to certain embodiments, the compressed raw material is in the form of an agglomerate, e.g., an integrated mass as opposed to individual particulates. For instance, in embodiments in which the raw material comprises whole or ground coffee beans, the compressed raw material may be a cake of spent coffee grounds. In some instances, the compressed raw material may be removed as one collective mass from the displaced fluidic pathway segment by applying a force on the compressed raw material, e.g., in the form of a pressurized flow of gas. For instance, certain embodiments comprise the use of an air or nitrogen cannon configured to transport raw material out of the displaced segment via highly pressurized air or nitrogen flow. In some embodiments, a lightly pressurized flow of gas, e.g., nitrogen or steam, may be used for a period of time to transport the compressed raw material out of the displaced segment.

In some embodiments, after removing at least a portion of the compressed raw material from the displaceable fluidic pathway segment, the displaceable fluidic pathway segment may be displaced back to a first position for a second round of primary extraction. For instance, certain embodiments comprise displacing a segment of the extraction pathway such that the displaceable fluidic pathway segment becomes fluidically connected to the upstream segment of the primary extraction pathway and the downstream segment of the primary extraction pathway. For example, after removing at least a portion of compressed raw material 165 from the displaced segment (as shown in FIG. 1D), displaceable fluidic pathway segment 125 may be displaced back to a first position such that segment 125 becomes fluidically connected to the upstream segment (first fluidic pathway segment 108) of the extraction pathway and the downstream segment (second fluidic pathway segment 110) of the primary extraction pathway (as shown in FIG. 1A). Specifically, in some embodiments, the displaceable fluidic pathway segment may be part of a rotary disc valve that can be rotated by a certain angle in a reverse direction (e.g., 90 degrees clockwise) from a second position to a first position. At this point, the displaceable fluidic pathway segment can receive a portion of solid raw material from the upper segment of the extraction pathway to begin a second round of primary extraction. The solid raw material from the primary extraction pathway may be drawn into the displaceable fluidic pathway segment by a gravitational pull and/or a vacuum applied to the bottom of the displaceable fluidic pathway segment. As described elsewhere herein, the vacuum may be drawn from a vacuum pump 190 situated in a first container 180 and applied to a least a portion of the extraction pathway (e.g., the displaceable fluidic pathway segment 125), as shown in FIG. 1A.

Another non-limiting example of a system for producing multiple liquid extracts is illustrated in FIG. 7A. As shown in FIG. 7A, system 700 comprises primary extraction pathway 701 and secondary extraction pathway 702. While primary extraction pathway 701 may be configured to produce a first liquid extract, secondary extraction pathway 702 may be configured to produce a second liquid extract and a solid spent raw material. As described in more detail below, the primary extraction pathway may be substantially vertical and substantially perpendicular to the secondary extraction pathway, e.g., the primary extraction pathway deviating less than 10 degrees from the vertical direction along the entirety of the primary extraction pathway. In some embodiments, the primary extraction pathway intersects and connects to the secondary extraction pathway at a T-junction. For example, as shown in FIG. 7A, primary extraction pathway 701 intersects the secondary extraction pathway 702 at T-junction 705.

In accordance with certain embodiments, the primary extraction pathway comprises a first fluidic pathway segment and a second fluidic pathway segment. For example, as shown in FIG. 7A, system 700 comprises first fluidic pathway segment 708 and second fluidic pathway segment 710. The second fluidic pathway segment, in some embodiments, may be disposed around (e.g., concentrically about) at least a portion of the first fluidic pathway segment, such as at a bottom portion of the first fluidic pathway segment. For example, referring again to FIG. 7A, second fluidic pathway segment 710 may be disposed around (e.g., concentrically about) a bottom portion of first fluidic pathway segment 708. In some embodiments, the first fluidic pathway segment comprises a vertically oriented extraction column. As described in more detail below, the first fluidic pathway segment may be configured to contain a solid raw material described elsewhere herein and the second fluidic pathway segment may be configured to collect a first liquid extract from the solid raw material contained within the first fluidic pathway segment.

In some embodiments, the second fluidic pathway segment comprises a separator, e.g., a solid-liquid separator. The separator, in some embodiments, may be configured to selectively allow liquids contained within the first fluidic pathway segment to pass into the second fluidic pathway segment, while preventing solids from passing into the second fluidic pathway segment. For example, the separator may be configured to allow a first liquid extract formed from at least a portion of the raw material within the first fluidic pathway segment to flow into the second fluidic pathway segment. Referring to FIG. 7A as an example, second fluidic pathway segment 710 comprises separator 758 disposed around first fluidic pathway segment 708. Separator 758 may be configured to selectively allow liquids (e.g., a first liquid extract) contained within first fluidic pathway segment 708 to pass into second fluidic pathway segment 710, while preventing solids contained within first fluidic pathway segment 708 from passing into second fluidic pathway segment 710. The separator, in some embodiments, may be in the form of a jacket or annular collar configured to enable fluid collection surrounding the first fluidic pathway segment.

In some embodiments, the separator and/or a bottom portion of the extraction column of which it surrounds and to which it may be sealingly connected comprises one or more apertures (e.g., slits). In some embodiments, the first fluidic pathway segment may be fluidically connected to the second fluidic pathway segment via the one or more apertures on the separator. For example, as shown in FIG. 7A, separator 758 may comprise one or more apertures 760. First fluidic pathway segment 708 may be fluidically connected to second fluidic pathway segment 710 via apertures 760 on separator 758.

Figure 7B:
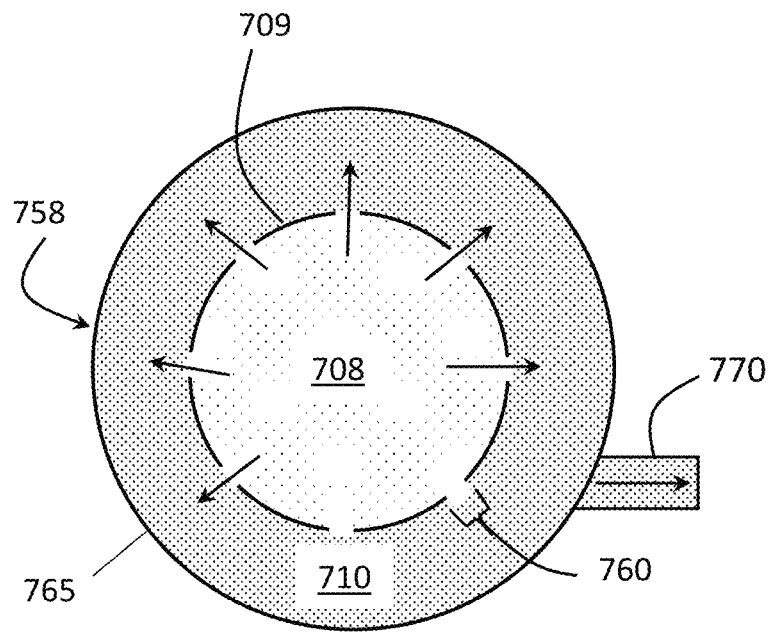
Figure 7C:
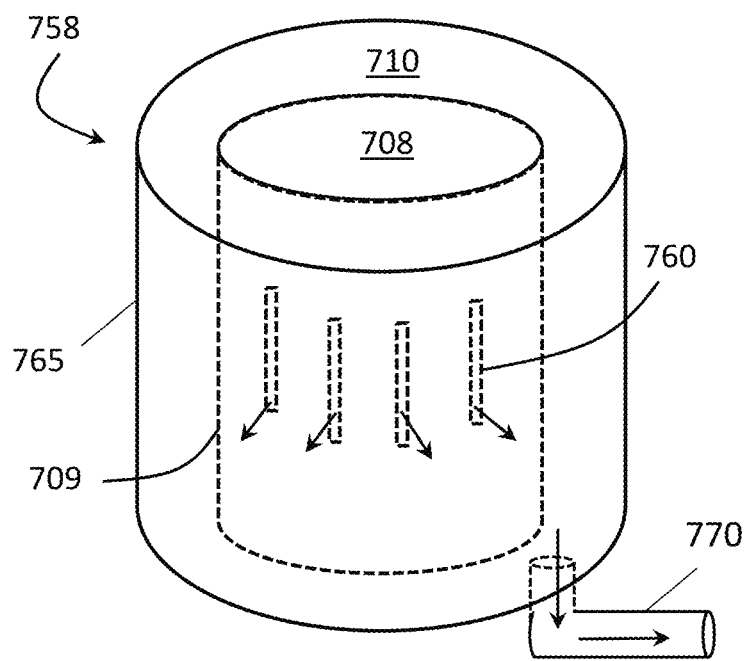

The separator may have any of a variety of appropriate configurations. For example, in one embodiment, the separator and the first fluidic pathway segment share a common wall. The one or more apertures, in some embodiments, may be formed on the common wall. FIGS. 7B-7C illustrate a cross-sectional view (FIG. 7B) and a perspective view (FIG. 7C) of an embodiment of the separator region in the primary extraction pathway. As shown, separator 758 may comprise external wall 765 and common, inner wall 709 shared and forming an interface between first fluidic pathway segment 708 and second fluidic pathway segment 710. A fluidic communication may be established between first fluidic pathway segment 708 and secondary fluid pathway segment 710 via apertures 760.

The one or more apertures, in some embodiments, may be sized so as to prevent solids contained within the first fluidic pathway segment from passing into the second fluidic pathway segment. The one or more apertures may have any of a variety of appropriate sizes. In some embodiments, the one or more apertures may have a maximum cross-sectional dimension of at least 0.1 mm, at least 0.5 mm, at least 1 mm, at least 5 mm, or more, and/or less than or equal to 10 mm, less than or equal to 5 mm, less than or equal to 1 cm, less than or equal to 0.5 mm, or less. Combinations of the above-referenced ranges are possible (e.g., at least 0.1 mm and less than or equal to 10 mm). Other ranges are also possible.

The one or more apertures may have any of a variety of appropriate shapes, including, but not limited to, circular, ellipsoidal, rectangular, square, etc. In some embodiments, the one or more apertures may be in the form of slits. The one or more apertures may have a relatively high aspect ratio. For example, the one or more apertures may have an aspect ratio (e.g., a ratio of a maximum cross-sectional dimension to a minimum cross-section dimension) of at least 5, at least 10, at least 25, at least 50, or more, and/or up to 75, up to 100, up to 500, up to 1000, or more. Combinations of the above-ranges are possible (e.g., at least 5 and up to 1000). Other ranges are also possible. The one or more apertures may be arranged in any appropriate locations on the wall of the separator.

The one or more apertures may be present in any of a variety of appropriate numbers. In some embodiments, at least 1, at least 5, at least 10, at least 50, at least 100 cm, or more, and/or up to 500, up to 1000, up to 5000, or more, aperture(s) may be present on the separator. Combinations of the above-referenced ranges are possible (e.g., at least 1 and less than or equal to 5000). Other ranges are also possible.

In some embodiments, the separator may optionally include a filter. The filter may serve to restrict the amount of solid passing through the one or more apertures. Any of a variety of solid-liquid filters described elsewhere herein may be employed. The filter may be positioned in the annular space (forming an inner volume) of the separator formed between external wall 765 and inner wall 709.

In some embodiments, the second fluidic pathway segment comprises an outlet fluidically connected to the inner volume of the separator. The outlet, according to some embodiments, is configured to output a first liquid extract from the separator. For example, as shown in FIGS. 7A-7C, second fluidic pathway segment 710 includes outlet 770 fluidically connected to separator 758 and configured to output a first liquid extract from second fluidic pathway segment 710. As described in more detail below, in some embodiments, the open end of the outlet may be connected to a vacuum source to facilitate flow of the first liquid extract through the second fluidic pathway segment.

In some embodiments, the system further comprises a secondary extraction pathway configured to produce a second liquid extract. The secondary extraction pathway, in some embodiments, comprises a movable solid body (e.g., a hydraulic piston) and a third fluidic pathway. In accordance with some embodiments, the movable solid body is configured to extend into and be retractable out of at least a portion of the secondary extraction pathway (e.g., the third fluidic pathway). For example, as shown in FIG. 7A, system 700 further comprises secondary extraction pathway 702 comprising movable solid body 790 and third fluidic pathway 720. As shown, movable solid body 790 may be connected to and actuated by hydraulic ram 748. Movable solid body 790 may be configured to extend into and be retracted out of third fluidic pathway 720. In some embodiments, the movable solid body can be configured to be displaced from a first position to a second position to allow for production of distinct liquid extract at each position, e.g., beverage grade coffee extract at a first position, and ingredient grade coffee extract at a second position. For example, as described in more detail below, during the production of the first liquid extract in the primary extraction pathway, the movable solid body may be partially extended to seal an open end of the primary extraction pathway. To produce a second liquid extract from the secondary extraction step, the movable solid body may be fully (or close to fully) extended into the third fluidic pathway. Specifics regarding operation of the movable solid body are described in more detail below.

In some embodiments, the first fluidic pathway segment is fluidically connected to the third fluidic pathway at a T-junction. For example, as shown in FIG. 7A, first fluidic pathway segment 708 is fluidically connected to third fluidic pathway 720 at T-junction 705. As described in more detail below, the third fluidic pathway, in some embodiments, is configured to accept at least a portion of the raw material contained within the first fluidic pathway during production of a second liquid extract.

In some embodiments, the secondary extraction pathway further comprises a separator displaceably (or removably) coupled to an outlet opening of the third fluidic pathway. For example, as shown in FIG. 7A, secondary extraction pathway 702 further comprises separator 752 displaceably coupled to outlet opening 795 of third fluidic pathway 720. In some embodiments, the separator is a solid-liquid separator, e.g., a separator capable of separating liquids from solids. In some embodiments, the separator may be sized such that a cross section of the separator is able to seal the outlet opening of the third fluidic pathway (e.g., as shown in FIG. 7A).

In some embodiments, the separator associated with the third fluidic pathway may have an end (e.g., a tip) that extends into at least a portion of the third fluidic pathway. For example, as shown in FIG. 7A, separator 752 comprises end 751 (e.g., a tip) that extends into at least a portion of third fluidic pathway 720. In some embodiments, the separator may have a constant tapering, e.g., such that at least a portion of the separator is cone-shaped. Any suitable angle of tapering may be present. For example, the angle may be less than 90 degrees, less than 80 degrees, less than 60 degrees, less than 40 degrees, less than 20 degrees, less than 10 degrees, or less, and/or down to 5 degrees, down to 4 degrees, down to 3 degrees, down to 2 degrees, or down to 1 degree (where 0 degrees indicates no taper, i.e., the separator is cylindrical). Combinations of these ranges are also possible, e.g., the tapering may be between 1 degree and 90 degrees.

While FIG. 7A illustrates an embodiment in which the separator associated the third fluidic pathway has a conical shape, it should be understood that not all embodiments described herein are so limiting, and in other embodiments, the separator may have any appropriate shapes (preferably, with some degrees of tapering), including, not limited to, a truncated cone, a trapezoid, a triangular prism, a hemisphere, etc.

The separator associated with the third fluidic pathway, in some embodiments, is configured to separate and remove liquid (e.g., a second liquid extract) from at least a portion of the solid raw material contained within the third fluidic pathway. According to some embodiments, the separator may comprise one or more apertures (e.g., slits) configured to allow a liquid (e.g., a second liquid extract) to pass through and into an inner volume of the separator. For example, as shown in FIG. 7A, separator 752 associated with third fluidic pathway 720 may comprises one or more apertures 753 (e.g., slits). Via apertures 753, a fluidic connection may be established between third fluidic pathway 720 and the inner volume of separator 752. The one or more apertures may be sized such that while liquids (e.g., a second liquid extract) contained within third fluidic pathway can flow therethrough, solids are prevented from flowing therethrough.

The one or more apertures on the separator (e.g., separator 752 in FIG. 7A) associated with the third fluidic pathway may have any of a variety of suitable properties (e.g., sizes, shapes, numbers, etc.) described elsewhere herein, e.g., with respect to the separator (e.g., separator 758) associated with the second fluidic pathway segment.

Figure 8A:
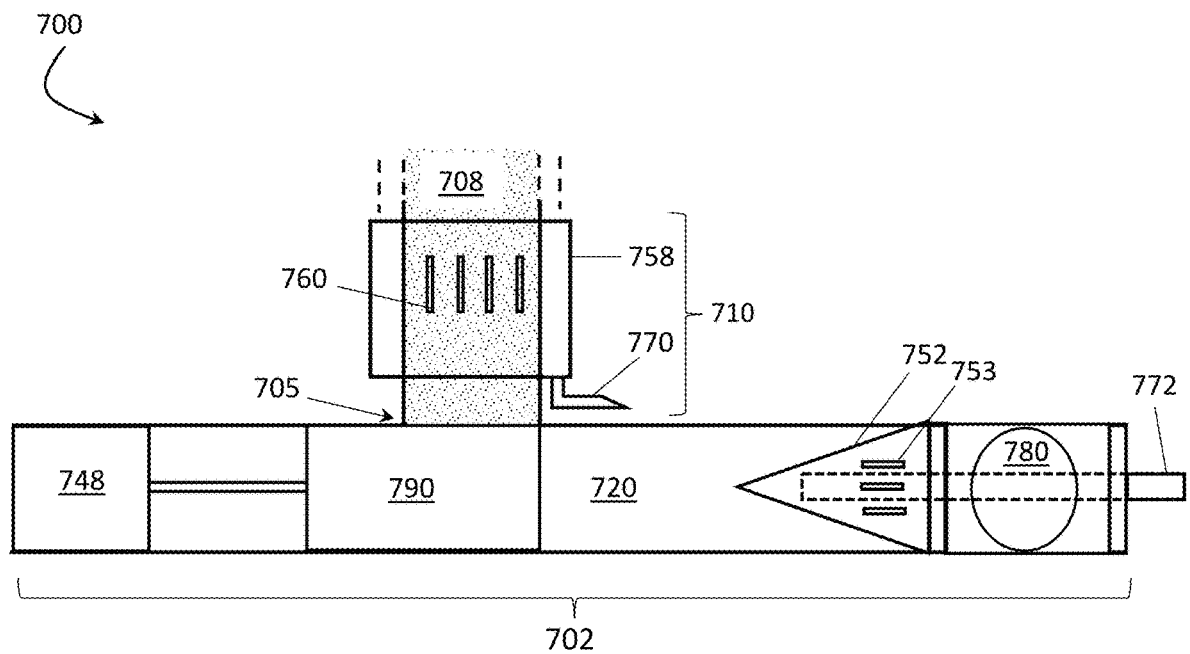
FIGS. 8A, 8B, 8C, and 8D are schematic illustration of a portion of the system of FIGS. 7A-7C during production of liquid extract and solid product, according to certain embodiments.
Figure 8B:
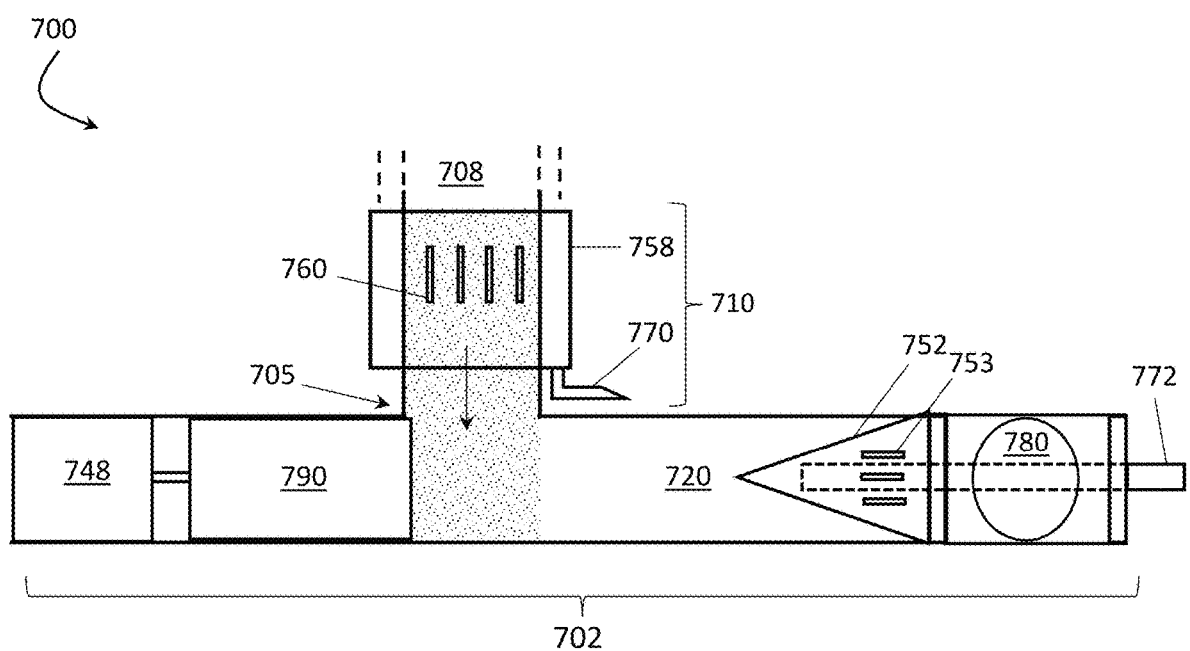
Figure 8C:
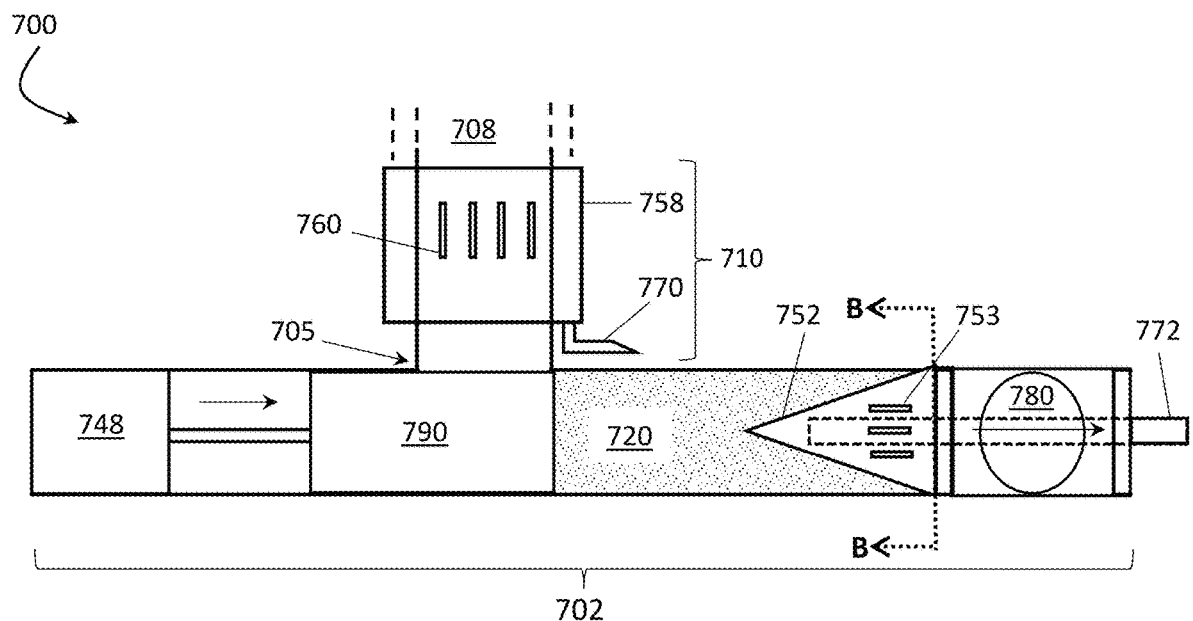
Figure 8D:
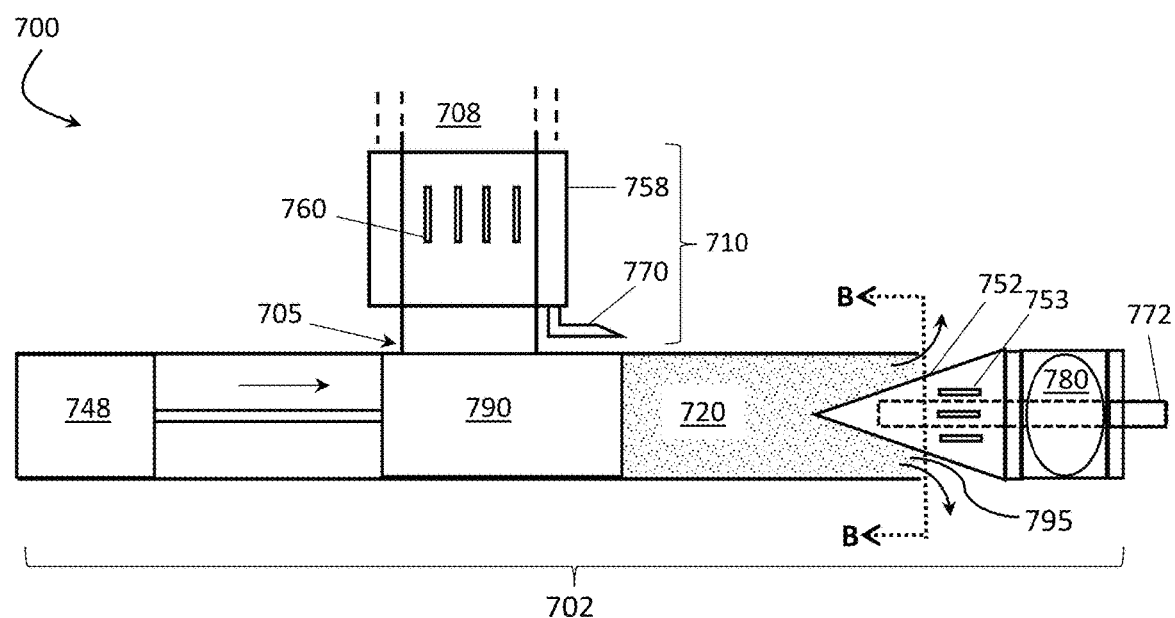
Figure 9A:
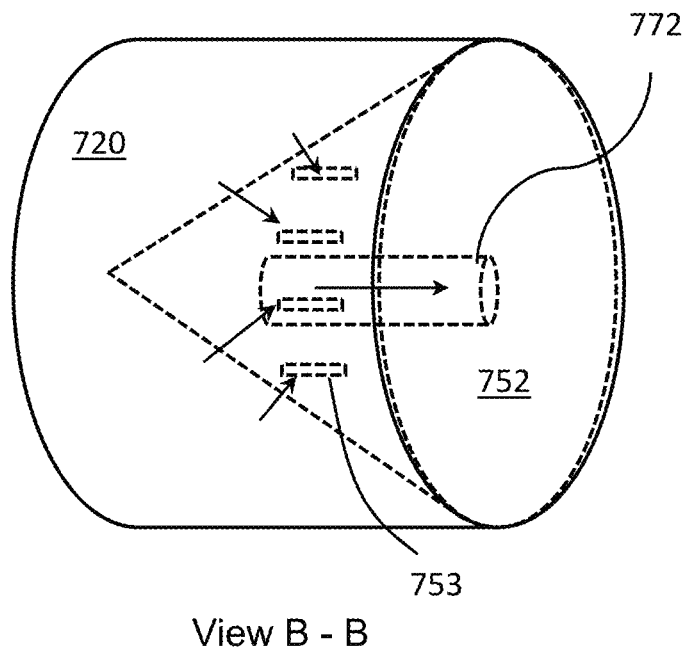
FIGS. 9A, 9B, and 9C are schematic illustrations of a portion of the system illustrated in FIGS. 8A-8D during production of the second liquid extract (FIGS. 9A-9B) and during collection of a compressed dry spent raw material (FIG. 9C), according to certain embodiments.
Figure 9B:
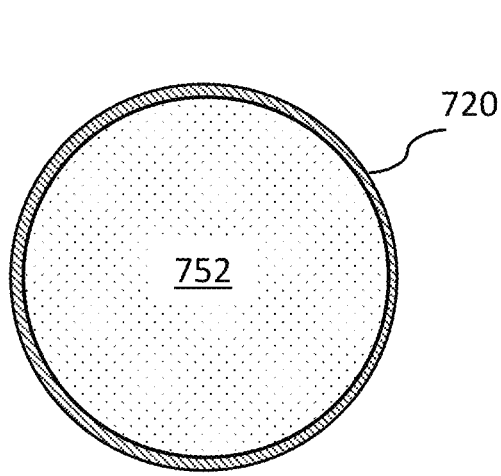
Figure 9C:
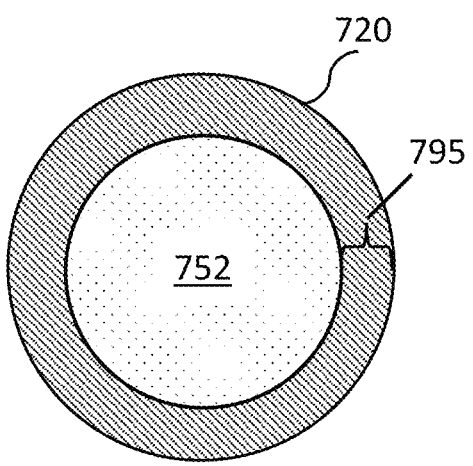

In some embodiments, the separator within the third fluidic pathway can be configured to be displaceable from a first position to a second position to allow for production both liquid extracts and removal of solid product, e.g., a second liquid extract at a first position, and spent solid raw materials at a second position. For example, when the separator is in a first position, the separator is configured to seal the outlet opening of the third fluidic pathway (e.g., as shown in FIG. 7A). A cross-sectional schematic of the separator at the first, sealing position is illustrated in FIGS. 8C and 9B. As shown, when in a first position, separator 752 is configured to seal the outlet opening of third fluidic pathway 720. When the separator is in a second position (FIGS. 8D and 9C), according to some embodiments, the separator becomes removably displaced from the opening of the third fluidic pathway such that the outlet opening 795 is open to the external environment. A cross-sectional schematic of the separator in a second position is illustrated in FIG. 9C. As shown, when in a second position, separator 752 becomes removably displaced from opening 795 of the third fluidic pathway such that outlet opening 795 is open to the external environment. The outlet opening 795 may have any appropriate size and/or shape that allows for removal of a solid product from the third fluidic pathway. Specifics regarding production of various liquid extract and/or solid product at each position are discussed in more detail below.

In some embodiments, the secondary extraction pathway further comprises a spring coupled to the separator to bias the separator in a closed position (i.e. in sealing contact with the outlet opening 795). According to some embodiments, the separator within the third fluidic pathway may be further coupled to a spring positioned externally of the third fluidic pathway. For example, as shown in FIG. 7A, secondary extraction pathway 702 may further comprise spring 780 coupled to separator 752 via one or more plates 776. In some embodiments, the spring may be configured exert a spring force (e.g., a displacement-to-open-resisting force) on the separator such that the separator is held against the outlet opening of the third fluidic pathway. As described in more detail below (and illustrated in FIGS. 9B-9C), a pressure becomes exerted on the spring by the solid raw material forced against the separator by displacement of solid movable body 790 during operation and sufficient to displace the separator from a first position, e.g., where the separator is held against the outlet opening of the third fluidic pathway, to a second position, e.g., where the separator is displaced from the outlet opening of the third fluidic pathway.

According to some embodiments, the spring-coupled separator described above may function as a spring-loaded relief valve in the third fluidic pathway, where the separator is capable of being displaceably removed from the outlet of the third fluidic pathway upon exertion of a sufficient force on the spring. The spring associated with the separator in the third fluidic pathway may have any of a variety of appropriate spring force values. For example, the spring force may be greater than or equal to 10 N, greater than or equal to 100 N, greater than or equal to 1000 N, or more, and/or less than or equal to 1000 N, less than or equal to 100, or less than or equal to 10 N. Combination of the above-referenced ranges are possible (e.g., greater than or equal to 10 N and less than or equal to 1000 N). Other ranges are also possible. The spring may have any of a variety of appropriate shapes, including, but not limited to, conical shaped, oval shaped, cylindrical shaped, barrel shaped, spherical or ball shaped, etc. As a non-limiting example, spherical or ball shaped spring 780 is illustrated in FIG. 7A. Ball shaped spring 780 is advantageously compressible and resilient to provide a restoring spring force in response to compression. Ball shaped spring 780 in certain embodiments can be solid and formed of an elastomer that is preferably food-grade, such as but not limited to silicone rubbers, nitrile rubbers, polychloroprene rubbers, ethylene propylene diene monomer rubbers, cis-polybutadiene and/or polyisobutylene rubbers, latex rubbers. In other embodiments, ball shaped spring 780 is hollow and inflatable with a fluid; for example, a compressible fluid such as air. Ball shaped spring 780, when in solid form, can be foamed. In certain embodiments, a foamed ball shaped spring may exhibit a closed-cell foam morphology or an open-cell foam morphology. The spring may be retained in place by any suitable means, such as by a plurality of tie rod nuts.

While FIG. 7A illustrates one specific embodiment in which the secondary extraction pathway comprises a spring-coupled separator, it should be understood that not all embodiments described herein are so limited, and in other embodiments, the secondary extraction pathway may comprise a component different from the spring-coupled separator but that serves similar functions, such as separating a liquid extract from the compressed solid raw material and producing spent solid grinds. For example, in one set of embodiments, the spring-coupled separator assembly (e.g., separator 752 coupled to spring 780) illustrated FIG. 7A may instead be replaced by a choke machined into the outlet of the third fluidic pathway. The choke may be sized such that it can be fitted concentrically into the interior of the outlet of the third fluidic pathway, according to some embodiment. In certain embodiments, the choke may comprise jacketed slits configured to allow a liquid (e.g., a second liquid extract) to pass through and out of the third fluidic pathway. The remaining spent solid grinds may be subsequently discharged from the choke, according to some embodiments. The choke may either be a fixed choke or an adjustable choke (i.e., a variable choke).

In some embodiments, the secondary extraction pathway may comprise a liquid extract outlet configured to output a second liquid extract from the separator. The liquid extract outlet, in some embodiments, is configured to extend into at least a portion of the separator such that the outlet is fluidically connected to the inner volume of the separator. For example, as shown in FIGS. 7A and 9A, secondary extraction pathway 702 comprises liquid extract outlet 772 configured to output a liquid extract (e.g., a second liquid extract) from separator 752. Liquid extract outlet 772 may extend into at least a portion of separator 752 such that liquid extract outlet 772 is fluidically connected to the inner volume of separator 752.

Certain embodiments of the present disclosure are directed to a method of producing a plurality of liquid extracts from a solid raw material using one or more systems described herein, e.g., system 700 in FIG. 7A or system 100 in FIG. 1A described above.

According to some embodiments, prior to extracting a plurality of liquid extracts from the systems described herein, the solid raw material may be pre-wetted by a solvent in a chamber. As shown in FIGS. 7A, a chamber 707 (e.g., a funnel) may be used to contain solid raw material 706 and the solvent (not shown). The chamber may be, in some embodiments, enclosed, as shown in FIG. 7A. The solid raw material and solvent may be introduced into the chamber together or separately, at a desired ratio, through a solid feed device (e.g., an auger) and a liquid feed device (e.g., a spray ball, a brew jet). A device (e.g., a mixer) that is capable of uniformly pre-wetting and mixing the solid raw material and the solvent may be incorporated into the chamber. For example, as shown in FIG. 7A, the solid raw material may be introduced into chamber 707 via an auger (not shown) and mixed with a solvent introduced into chamber 707 via liquid feed device 740 using mixer 742 (e.g., an auger mixer). Any of a variety of mixers may be employed, such as a paddle mixer, a screw mixer, a vibrator or vibratory feeder (e.g., a VFD (Variable Frequency Drive) controlled vibrator/vibratory feeder), a sonicator (e.g., ultrasonic mixer), etc. In certain embodiments, the top mounted mixer is configured to allow both mixing in a horizontal direction as well as in a vertical direction. For example, as mixer 742 rotates, mixer 742 may induce mixing between solid raw material 706 and the solvent (both in the horizontal and vertical direction), and at the same time, facilitate and propagate migration of the mixture of raw material 706 vertically (e.g., in the direction of gravity) along the length of first fluidic pathway segment 708.

In some embodiments, more than one type of mixer may be employed in the system to enhance uniform wetting and mixing between the solid raw material and the solvent in first extraction pathway. The system, in some embodiments, may comprise a first mixer (e.g., an ultrasonic mixer) at least partially disposed within the chamber above the first fluidic pathway segment and a second mixer (e.g., an auger mixer) disposed along the length of the first fluidic pathway segment. For example, as shown in FIG. 7A, system 700 comprises first mixer 777 (e.g., an ultrasonic mixer) at least partially disposed within chamber 707 above first fluidic pathway segment 708 and second mixer 742 (e.g., an auger mixer) disposed along the length of first fluidic pathway segment 708. In accordance with some embodiments, first mixer 777 may allow for uniform pre-wetting and pre-mixing of the solid raw material and the solvent in chamber 707 for a short period of time at the onset of operation (when the solid raw material and the solvent are first introduced into the chamber) and before the mixture moves into first fluidic pathway segment 708. Next, second mixer 742 may induce migration and further mixing of the mixture of raw material along the length of first fluidic pathway segment 708. Without wishing to be bound by any particular theory, it is believed that the presence of an additional mixer in the chamber may advantageously increase the concentration (or Brix level) of the resulting first liquid extract produced from the first extraction pathway. Alternatively or additionally, in some embodiments, the first mixer may be continuously operated during the extraction process to assist mixing of the mixture within the first fluidic pathway segment. The first mixer may be operated simultaneously along with the second mixer and/or may in some cases extend at least partially into the first fluidic pathway segment, according to some embodiments.

Any of a variety of mixers described elsewhere herein may be employed in the chamber, such as a vibrator or a sonicator (e.g., an ultrasonic mixer). An ultrasonic mixer, in some embodiments, may facilitate efficient and uniform pre-wetting of the solid raw material by providing both additional heat and mixing action to the system. The ultrasonic mixer may have any of a variety of power output values, such as a value of at least 200 W, at least 300 W, at least 400 W, at least 500 W, or more, and/or up to 800 W, up to 1000 W, or more. Any of the above-referenced ranges are possible (e.g., greater than or equal to 200 W and less than or equal to 1000 W).

Figure 14A:
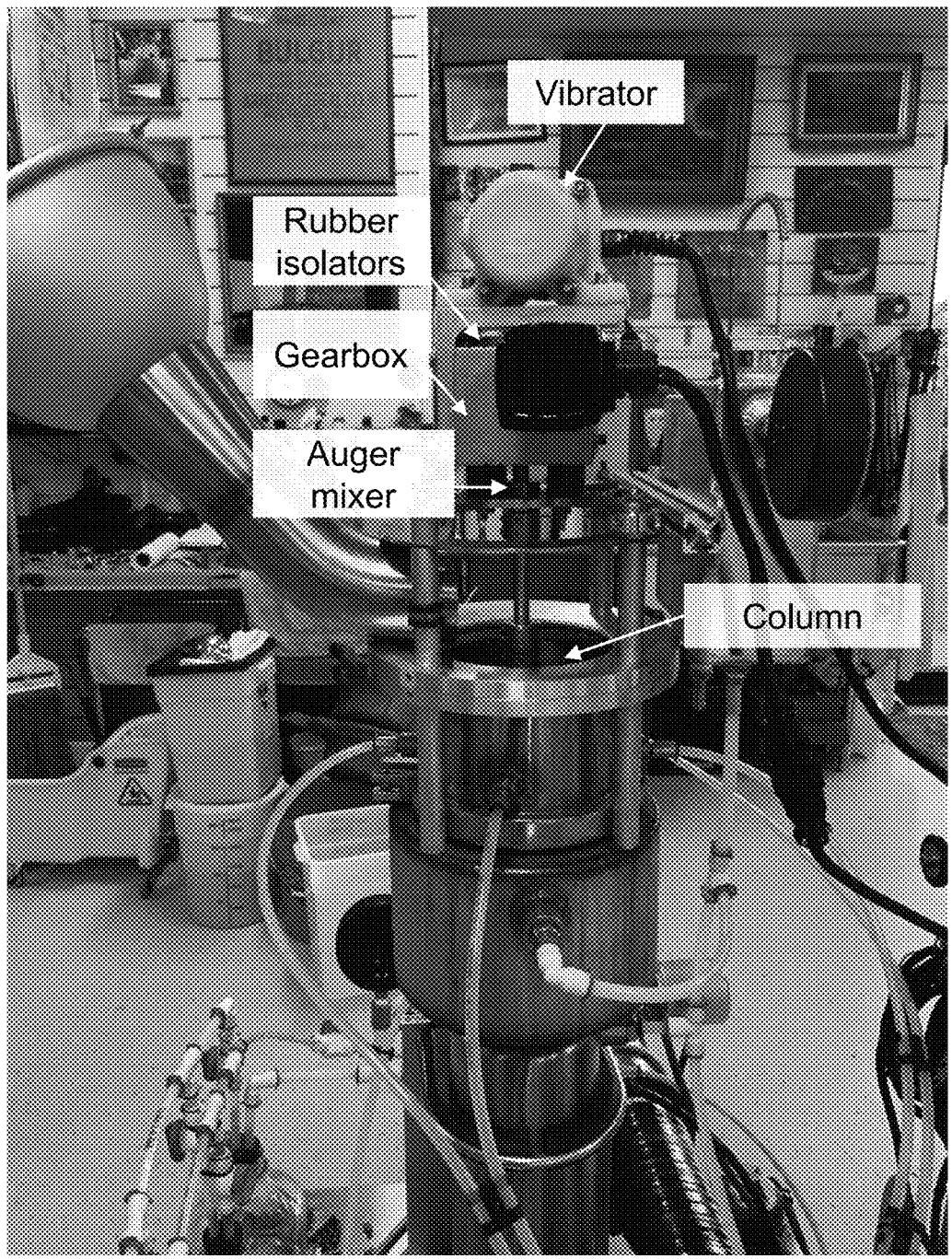
FIGS. 14A-14B are photographs of a system comprising a VFD (Variable Frequency Drive) controlled vibrator, in accordance with some embodiments.
Figure 14B:
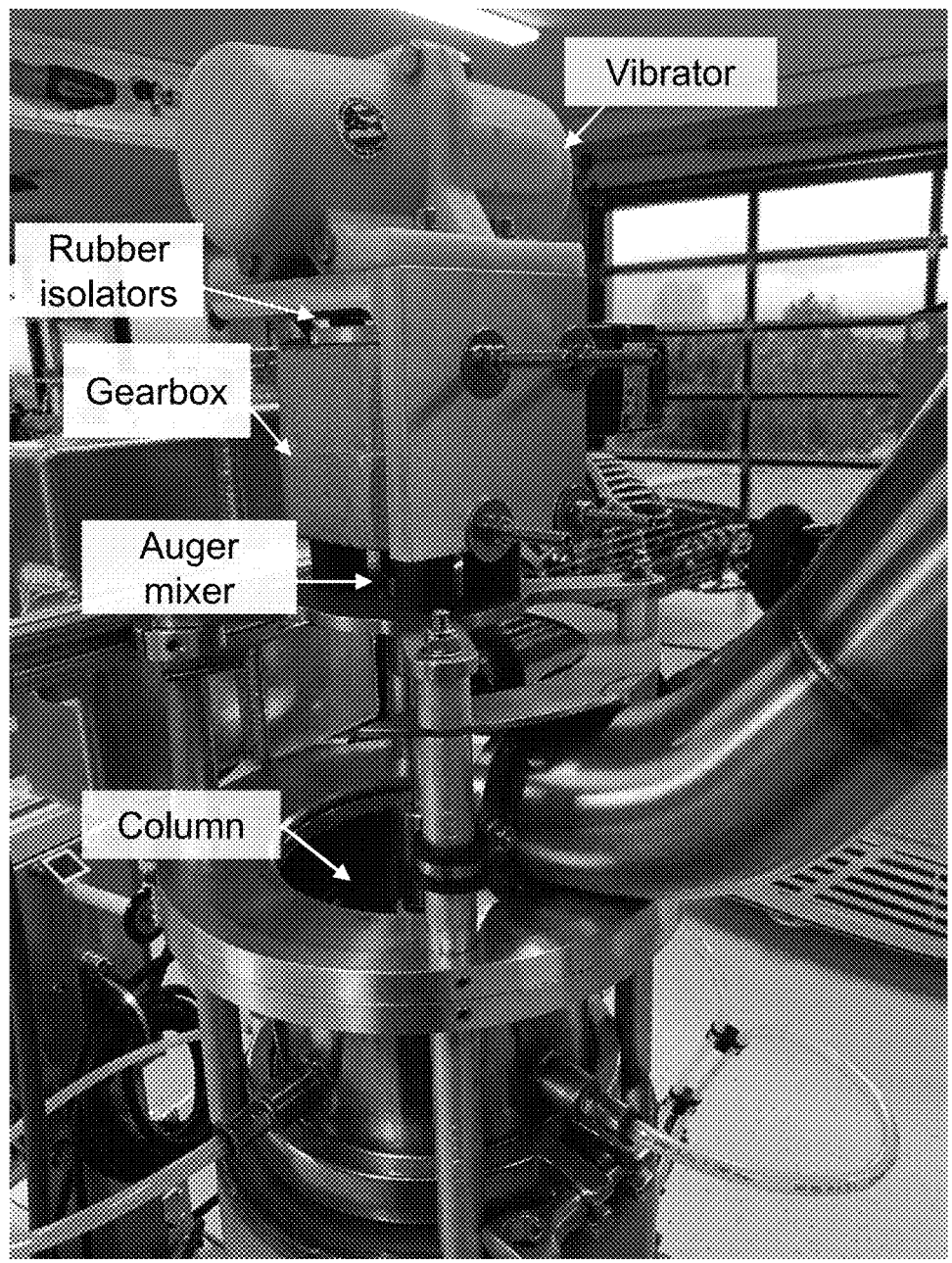

In some embodiments, they system comprises a vibrator positioned above the first fluidic pathway segment. For example, the system may comprise a vibrator coupled to a top-mounted mixer (e.g., an auger mixer) that extends along the length of first fluidic pathway segment. For example, as shown in FIG. 7A, system 700 may further comprise a vibrator or vibrator feeder (not shown) positioned above first fluidic pathway segment 708 and coupled to top-mounted mixer 742 that extends along the length of first fluidic pathway segment 708 and/or coupled to chamber 707. A non-limiting example of such a vibrator is shown in FIGS. 14A-14B. As shown in FIGS. 14A-14B, the illustrated extraction system comprises a VFD controlled vibratory feeder assembly comprises a vibrator coupled to the top of the entire gearbox and the auger mixer assembly. In some cases, isolators (e.g., rubber isolators) may be employed to assist with the mounting of the vibrator to the gearbox and auger mixer assembly and to provide damping. During operation, while the auger mixer rotates and mixes the slurry within the column of the first fluidic pathway segment, the VFD controlled vibrator is configured to apply to a constant vibrational (i.e., sub-sonication) force on the rotating auger mixer assembly. The VFD controlled vibrator, in certain embodiments, may be configured to vibrate the entire rotating mixer auger assembly at a power of between 0 and 4,000 voltage at maximum power (VMP), and/or at a frequency of between 0 and 26,000 cycles per second (CPS) or between 0 to 66 cycles per second (CPS). The vibration of the rotating auger mixer assembly may allow for continuous mixing and sub-sonication of the solid raw material and solvent within the column of the first fluidic pathway segment and improve contact of the slurry mixture with the heated extraction column, without emulsifying the slurry mixture within the column. This may subsequently give rise to an increase in the Brix level of the first liquid extract obtained from the column.

It should be understood that the vibrator setup illustrated in FIGS. 14A-14B may be employed in any of the one or more extraction systems described elsewhere herein, such as in the systems illustrated in FIG. 1A and FIG. 7A.

Certain embodiments comprise establishing a flow of a solvent through a bed of the solid raw material within an extraction pathway (e.g., a primary extraction pathway) to produce a first liquid extract during a primary extraction step. For example, as shown in FIG. 7A, a flow of a solvent may be established through a bed of the solid raw material 706 within a primary extraction pathway 701 to produce a first liquid extract during a primary extraction step. In some embodiments, the solvent is a consumable solvent (e.g., a consumable aqueous solvent). In the extraction column, the solvent can be used to extract and/or solubilize certain consumable materials from a solid raw material. In some embodiments, the dimension (e.g., height and diameter) of the extraction column determines the length of flow path of the solvent and may be adjusted accordingly to control the Brix (e.g., concentration of an extractable component) of the resultant liquid extracts.

In some embodiments, to produce a first liquid extract, the method comprises separating the first liquid extract from the bed of solid raw material (slurry) contained within the first fluidic pathway segment. According to some embodiments, the first liquid extract may be separated from the solid raw material via a separator associated with the second fluidic pathway segment. For example, the first liquid extract from the bed of solid raw material may be flowed into the second fluidic pathway segment via the one or more apertures (e.g., slits) on the separator. For example, referring to FIGS. 7A-7C, primary extraction pathway 701 comprises second fluidic pathway segment 710 comprising separator 758. In some cases, the first liquid extract may be separated from the bed of solid raw material (slurry) 706 contained within first fluidic pathway segment 708 via separator 758. Specifically, the first liquid extract may be passed into second fluidic pathway segment 710 via apertures 760 (e.g., slits) on separator 758.

Certain embodiments comprise applying vacuum to at least a portion of the primary extraction pathway during production of the first liquid extract. The application of a vacuum can facilitate the flow of a solvent through a bed of the solid raw material to produce a first liquid extract. For example, as shown in FIGS. 7A-7C, a vacuum may be drawn from a vacuum pump (not shown) and applied to a least a portion of the extraction pathway (e.g., second fluidic pathway segment 710) during production of the first liquid extract. For example, a vacuum may be applied to outlet 770 of second fluidic pathway segment 710 to facilitate flow of a solvent through a bed of the solid raw material and into second fluidic pathway segment 710.

During production of the first liquid extract, the movable solid body may be at least partially (or fully) extended in the third fluidic pathway to facilitate production of the first liquid extract, according to some embodiments. FIG. 8A shows a schematic of the system (e.g., system 700 in FIG. 7A) during production of the first liquid extraction. For example, as shown in FIG. 8A, movable solid body 790 may extend from a first position (e.g., a retracted state as shown in FIG. 7A) to a second position (e.g., a partially extended state as shown in FIG. 8A). As shown in FIG. 7A, when movable solid body 790 is in a first position, first fluidic pathway segment 708 is fluidically connected to third fluidic pathway 720. As shown in FIG. 8A, when movable solid body 790 is in a second position, first fluidic pathway segment 708 is fluidically isolated from third fluidic pathway 720. When movable solid body 790 is in the second position, movable solid body 790 may seal the outlet of first fluidic pathway segment 710 (at the T-junction) such that the bed of solid raw material and the first liquid extract are prevented from entering into the secondary extraction pathway (e.g., third fluidic pathway 720) during production of the first liquid extract. In some embodiments, the movable solid body may be programmed to remain in an extended state for a desirable period of time to aid production of the first liquid extract. For example, according to some embodiments, by programming the movable solid body to remain in an extended state for a prolonged period of time, the bed of solid raw material in the first fluidic pathway segment is prevented from moving down into the secondary extraction pathway during this period of time. This may allow the first liquid extract to be continuously extracted from the bed of solid raw material contained within the first fluidic pathway segment, which may in turn lead to an increase in the amount and/or concentration (e.g., Brix) of the first liquid extract.

In some embodiments, during production of the first liquid extract, the movable solid body may be repeatedly extended into the T-junction, e.g., as shown in FIG. 8A, and out of the T-junction, e.g., as shown in FIG. 7A. For example, as movable solid body 790 extends out of T-junction 705, a portion of the raw material may be dropped out of first fluidic pathway segment 708 into T-junction 705. As movable solid body 790 extends into T-junction 705, at least a portion (e.g., at least 10%, at least 20%, at least 30%, or more, and/or up to 40%, up to 50%, or more) of the displaced raw material may be displaced upwards back into first fluidic pathway segment 708. By repeatedly extending the movable solid body in and out of the T-junction, efficient mixing between raw material and solvent (in the vertical direction) may be accomplished within the primary extraction pathway.

In some embodiments, after producing the first liquid extract, at least a portion of the raw material (e.g., spent raw material) may be displaced from the primary extraction pathway to the secondary extraction pathway. To accomplish this, the movable solid body may be displaced back from the second position to the first position such that a fluidic connection may be re-established between the primary extraction pathway (e.g., first fluidic pathway segment) and the secondary extraction pathway (e.g., third fluidic pathway). FIG. 8B shows a schematic of the system during displacement of the raw material. As shown, after producing the first liquid extract, movable solid body 790 may be displaced from a second position (e.g., a partially extended state) to a first position (e.g., a retracted state). Accordingly, a fluidic connection may be re-established between the primary extraction pathway (e.g., first fluidic pathway segment 708) and the secondary extraction pathway (e.g., third fluidic pathway 720). Upon re-establishing the fluidic connection, at least a portion of the raw material may be displaced from the primary extraction pathway (e.g., first fluidic pathway segment 708) to the secondary extraction pathway (e.g., third fluidic pathway 720).

Certain embodiments comprise extending a movable solid body to make contact with the portion of displaced raw material such that the solid body compresses the portion (e.g., the most spent portion) of the raw material to produce a compressed raw material and a second liquid extract from the compressed solid raw material. As the movable solid body extends to make contact with the displaced raw material, according to some embodiments, the displaced raw material is further displaced along the third fluidic pathway until being compressed against a surface of a separator associated with an end of the third fluidic pathway. As the solid body compresses the portion of the raw material against the separator, a second liquid extract is produced from the portion of raw material present within the displaced raw material. FIG. 8C shows a schematic of the system during production of the second liquid extract. For example, as shown, movable solid body 790 may be extended into the portion of displaced raw material such that movable solid body 790 compresses the portion of the raw material to produce a second liquid extract from the portion of raw material. As movable solid body 790 extends into the displaced raw material, the displaced raw material is further displaced along third fluidic pathway 752 until being compressed against a surface of separator 752 at the end of third fluidic pathway 720. In some instances, the solid body may exert a sufficient force against the portion of the displaced raw material to compress some or all of the remaining liquid components (which become the second liquid extract) out of the raw material. According to certain embodiments, the compressed raw material is in the form of an agglomerate, e.g., an integrated mass as opposed to individual particulates.

In some embodiments, the method further comprising separating (and removing) the second liquid extract from at least a portion of the compressed raw material via the separator associated with the secondary extraction pathway (e.g., third fluidic pathway). According to some embodiments, as the movable solid body extends and compresses the portion of displaced raw material within the third fluidic pathway, a second liquid extract produced from the compressed raw material is flowed into the separator associated with the third fluidic pathway via the one or more apertures on the separator. As described elsewhere herein, the one or more apertures may prevent all or a majority of the insoluble solid components from leaving the third fluidic pathway. Subsequently, the second liquid extract may flow out of the separator via an outlet of the third fluidic pathway.

For example, as shown in FIG. 8C, as movable solid body 790 extends and compresses the portion of displaced raw material within third fluidic pathway 720, a second liquid extract produced from the compressed raw material flows into the interior space of separator 752 at the end of third fluidic pathway 720 via one or more apertures 753. While the second liquid extract flows into the interior space of separator 752, all or a majority of the insoluble solid components of the compressed raw material is prevented from entering into the interior space of separator 752 and is thus left behind in third fluidic pathway 720. The second liquid extract may subsequently exit separator 752 via liquid outlet 772. The flow path of the second liquid extract is illustrated in more detail in FIG. 9A, which shows a perspective view of a cross section (e.g., cross section B-B) of separator 752 in FIG. 8C.

According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the remaining extractable components are removed from the raw material (e.g., spent raw material) present within the third fluidic pathway. According to certain embodiments, the solid body may compress the portion of the raw material such that at least 50 wt % (or at least 60 wt %, at least 70 wt %, at least 80 wt %, at least 90 wt %, at least 95 wt %, at least 99 wt %, or all) of the solvent is removed from the raw material (e.g., spent raw material) present within the third fluidic pathway. As described elsewhere herein, in some embodiments, a vacuum may be optionally applied to the third fluidic pathway (e.g., via liquid outlet 772 shown in FIG. 8C) to facilitate removal of the second liquid extract from the third fluidic pathway.

Certain embodiments comprise removing at least a portion of the compressed raw material from the secondary extraction pathway to produce a solid spent raw material. According to some embodiments, during the compression step, the compressed raw material becomes dry or dewatered. The dry or dewatered material, in some embodiments, may be removed from the secondary extraction pathway as a solid spent raw material. In some embodiments, removing at least a portion of the compressed raw material from the secondary extraction pathway (e.g., third fluidic pathway) comprises displacing the separator from the outlet opening of the secondary extraction pathway (e.g., third fluidic pathway) such that the secondary extraction pathway (e.g., third fluidic pathway) becomes opened and fluidically connected to an external environment. For example, as shown in FIG. 8D, as separator 752 is displaced from opening 795 of third fluidic pathway 720, third fluidic pathway 720 becomes fluidically connected to an external environment via the unsealing of opening 795. Accordingly, solid spent raw material (e.g., dry or dewatered raw material) can be removed from third fluidic pathway 720 via opening 795.

In some cases, to displace the separator from the opening of the secondary extraction pathway (e.g., third fluidic pathway), the movable solid body may be configured to exert on the separator a force sufficient to overcome the spring force of the spring associated with the separator. For example, as shown in FIG. 8D, to displace separator 752 from opening 795 of third fluidic pathway 720, movable solid body 720 may be employed to exert a force sufficient to overcome the spring force associated with spring 780 that is coupled to separator 752. The spring may have any appropriate force described elsewhere herein. The movable solid body may be in a fully extended state during removal of the solid spent raw material, according to some embodiments. The displacement of the separator from the opening of the third fluidic pathway may be reversible. For example, according to some embodiments, after removal of the spent solid raw material, the movable solid body may be retracted, and the separator may again seal the opening of the third fluidic pathway.

It should also be noted that during the compression step associated with production the second liquid extract (e.g., as shown FIG. 8C), the force exerted by the movable solid body on the separator should not exceed the spring force of the spring associated with the separator. According to some embodiments, while the outlet opening of the third fluidic pathway is sealed by the separator during the production of the second liquid extract, the opening is unsealed during the production of the solid spent raw material. This is illustrated in more detail in FIGS. 9B-9C, which are schematics of a cross-section (e.g., cross-section B—B) of the separator during production of the second liquid extraction (e.g., FIGS. 8C and 9B) and during production of the solid spent raw material (e.g., FIGS. 8D and 9C).

While FIG. 7A illustrates one specific embodiment of an extraction system comprising two extraction pathways, it should be understood that not all embodiments described herein are so limited, and in other embodiments, the extraction system may comprise any suitable number of extraction pathways. For example, according to some embodiments, the system illustrated in FIG. 7A may additionally comprise a third extraction pathway (not shown). The third extraction pathway, in some embodiments, may be configured to produce a third liquid extract, e.g., an oil, from the spent solid raw material produced in the secondary extraction pathway. The third extraction pathway may have a similar (or identical) configuration as the secondary extraction pathway, such as comprising a movable solid body, a fluidic pathway, a separator coupled to a spring, an outlet, etc. The third extraction pathway, in some embodiments, may further comprise a heater (e.g., heated jacket). During operation, the third extraction pathway may be configured to accept the spent solid raw material produced from the secondary extraction pathway, and subsequently heat the spent solid raw material to a temperature sufficient for oils to be fluidized and extracted from the spent solid raw material. To produce the third liquid extract (e.g., an oil), the movable solid body may be extended into the fluidic pathway containing the spent solid raw material such the spent solid raw material is compressed. The third liquid extract can be passed into a separator and subsequently collected.

While FIG. 7A illustrates one specific embodiment of an extraction system, it should be understood that not all embodiments described herein are so limiting, and in other embodiments, the extraction system may have any appropriate configuration. For example, FIG. 1A illustrates a second embodiment of an extraction system comprising an adjustable displaceable fluidic segment, as was described in more detail above. In some embodiments, the second round of primary and secondary liquid extraction may proceed as described above with respect to the first rounds of primary and secondary liquid extraction. In such cases, the extracts produced during the second rounds of primary and secondary liquid extraction can have the same or similar properties as the extracts produced during the first round of primary and secondary liquid extraction. In some embodiments, the various fluidic pathways, movable solid body, and the vacuum may be operated in the same or similar fashion as described elsewhere herein to produce the first primary liquid extract, second primary liquid extract, and compressed raw material, as shown in FIGS. 7A and 1A. In some embodiments in which a displaceable fluidic pathway segment is present, the displaceable fluidic pathway segment, the movable solid body, and the vacuum may be operated in the same or similar fashion as described elsewhere herein to produce the first primary liquid extract, second primary liquid extract, and compressed raw material, as shown in FIG. 1A-1C. The multi-step extraction process may be repeated in a continuous fashion until a desired quantity of each or either extract has been produced.

In some embodiments, the second round of primary liquid extraction may be different from the first round of primary liquid extraction such that additional liquid extracts may be generated. For instance, certain embodiments comprise establishing a second flow of solvent through a bed of solid raw material within the extraction pathway to produce a third liquid extract. In some instances, a second solvent different from the solvent used in the first round of extraction can be used to establish a second flow of solvent through a bed of solid raw material within the extraction pathway to produce a third liquid extract. For example, the second solvent may be different from the first solvent and can be used to solubilize and/or extract different components from the raw solid material (e.g., coffee beans). Consequently, a vacuum-assisted extraction similar to the vacuum-assisted extraction used in producing the first liquid extract as shown in FIG. 1A or 7A may take place to produce the third liquid extract.

In some embodiments in which the system comprises a displaceable fluidic pathway segment, the displaceable fluidic pathway segment may have additional positions allowing for the production of additional liquid extracts (e.g., three, four, or more liquid extracts). For instance, the displaceable fluidic pathway segment may be displaced to multiple extraction pathways (e.g., primary, secondary, tertiary, quaternary, or more pathways) for the production of more than two types of liquid extracts. In some embodiments in which more than two extracts are produced, each of the three (or more) different types of liquid extract may be transported out of the system via a separate fluidic pathway (and, optionally, to separate containers) or reintroduced into the mixer funnel as enhanced solvent.

The multi-step extraction process described herein may be operated in a variety of different orders. For instance, in some embodiments, the multi-step extraction process may occur in the following order: a first primary extraction step producing a first liquid extract, a first secondary extraction step producing a second liquid extract from a first portion of compressed raw material, removal of the first portion of compressed raw material, a second primary extraction step producing a third liquid extract, a second secondary extraction step producing a fourth liquid extract from a second portion of compressed raw material, and removal of the second portion of compressed raw material. In such embodiments, the multi-step extraction process may be operated continuously repeating the same multi-step extraction process. For example, the multi-step process illustrated in FIGS. 8A-8D described below in the context of the embodiments shown in FIG. 7A may be repeated any number of times and in any appropriate fashion.

In some embodiments, the multi-step extraction process may involve a single round of primary extraction to produce a first liquid extract, followed by multiple rounds of secondary extraction to produce a secondary liquid extract, and removal of compressed raw materials. For instance, in some embodiments, the multi-step extraction process may occur in the following order: a single round of primary extraction of the entire length of the extraction column may be first carried out to selectively and exhaustively extract a first liquid extract from the majority of the solid raw material within the primary extraction pathway, followed by multiple rounds that alternate between a secondary extraction step and a solids removal step until a majority or all of the solid raw materials within the primary extraction pathway have been removed, followed by replenishing the primary extraction pathway with another batch of solid raw material through which an additional step of primary extraction is performed.

In some embodiments, the system may be operated to produce a single liquid extract. For instance, the system may be operated such that either a first liquid extract or a second liquid extract is produced. For example, the system may be configured accordingly to produce either a first liquid extract via a primary extraction pathway (while disabling the secondary extraction pathway), or a second liquid extract and a dry solid product via the secondary extraction pathway (while disabling the primary extraction pathway).

The operation of the multi-step extraction process is not limited to these examples described herein, any other methods of performing the multi-step extraction may be deemed appropriate, depending on the application.

In some embodiments, the first liquid extract (from the primary extraction process) and second liquid extract (from the secondary extraction process) may be processed and packaged separately as different products. In some embodiments, the first liquid extract and the second liquid extract may be combined into one liquid extract and packaged as a single product. In some embodiments, one or more of the plurality of liquid extracts from one round of extraction may be used as the solvent for subsequent rounds of primary and secondary extraction to increase the Brix of the resultant liquid extracts from the subsequent round of extraction. For instance, a first liquid extract from a first round of primary extraction may be used as the solvent for a second round of primary extraction to produce a first liquid extract with a higher Brix value in the second round of primary extraction. For example, an ingredient grade extract from a first round of extraction may be reintroduced as an enhanced solvent into a second round of extraction to result in an enriched extract with higher concentration of extractable components.

According to some embodiments, the multi-step extraction process may be automated. Automation can allow, in accordance with certain embodiments, for continuous operation and, optionally, without the need for frequent emptying, cleaning, sterilizing, and refiling procedures. The continuous operation of the multi-step process may reduce cost (resulting in a decrease in cost per unit output of liquid extract) and/or may require less floor space (thus lowering capital costs).

In some embodiments, the multi-step extraction process may be programmed to automate one or more of the extraction steps described elsewhere herein (e.g., primary extraction, secondary extraction, removal of compressed raw materials (e.g., a dry solid product comprising dry spent raw materials), filling and/or refilling of the solid raw material, etc.). According to certain embodiments, displacement of the displaceable fluidic pathway segment from a first position to a second position (and/or from the second position back to the first position) may be automated. For instance, in some embodiments, when the displaceable fluidic pathway segment is in a first position (to produce a primary liquid extract), a sensor (e.g., an in-line Brix or volume meter) may be used to detect one or more components in the primary liquid extract exiting the displaceable fluidic pathway segment. Data provided by the sensor can be used by one or more controllers to provide programmable and/or self-automation control of the device or system, to facilitate various control schemes and algorithms, and/or to facilitate programmed actuation of the displaceable fluidic pathway segment. For instance, in some embodiments, once the sensor detects a concentration that is below a threshold concentration of the component(s) in a primary liquid extract, the displaceable fluidic pathway segment can be actuated to be displaced to a second position to remove fluidic communication between the displaceable fluidic pathway segment and the upstream and downstream portions of the primary extraction pathway, ceasing production of the first liquid extract.

In some embodiments, once the displaceable fluidic pathway segment is displaced to a second position configured to produce a second liquid extract, the controller may initiate actuation of the movable solid body (e.g., hydraulic piston)

to extend into and retract out of the displaceable fluidic pathway segment, for example, based on a pressure set point of the movable solid body. In some embodiments, after retracting the movable solid from the displaceable fluidic pathway segment, the controller may initiate removal of the compressed dry spent raw material. In some embodiments, after the removal of the compressed dry spent raw material, the controller may initiate actuation of the displaceable fluidic pathway segment such that it is displaced from the second position back to the first position.

In some embodiments, the controller used to control actuation of the various components (e.g., displaceable fluidic pathway segment, movable solid body, etc.) during the extraction process may comprise a computer processor. For instance, the processor can be used to control actuation of the displaceable fluidic pathway segment based on data received from the sensor (e.g., in-line Brix sensor). The processor can also be used to control actuation of the movable solid body based on a hydraulic pressure set point. In some instances, the actuation of various components may be controlled by setting a time duration or volume duration in the controller. This can allow a user or an external operator, with communications access to the controller, to adjust a setting (e.g., Brix value, pressure set point, time duration) and/or to change an operating mode in response to the measured values provided by the sensors. For instance, an operator may manually input (e.g., via a graphical user interface (GUI)) a desired Brix set point and/or pressure set point of the controller to allow actuation of the displaceable fluidic pathway segment and/or the movable solid body. In certain embodiments the controller and system design may result in the ability to achieve surprising and unexpected levels of consistency and reproducibility in extract composition and quality.

In some embodiments, the extraction system may be configured such that the solid raw material and the extract are sealed from the external environment. Sealing the extraction system can help reduce or eliminate denaturation (e.g., volatile aroma loss) and/or loss of the consumable extracts (e.g., via oxidation and/or evaporation) and/or contamination of the extraction system.

As noted above, any of a variety of solid raw materials may be employed. Non-limiting examples include a variety of organic solids from which consumable materials can be extracted such as, for example, roasted coffee, green coffee, ground or whole coffee, cannabis plants, cocoa, fruit, vanilla beans, and tea leaves.

As noted above, in certain embodiments, the use of systems and methods described herein can be particularly advantageous for coffee extraction and/or cannabis extraction. In some embodiments, the primary extraction configuration can be used to produce a beverage grade coffee extract or a cannabis extract. The beverage grade extract may contain, in some embodiments, about 1-4 wt % dissolved coffee solids. Generally, the beverage grade extract (e.g., a beverage grade coffee extract) may have a higher Brix value than the ingredient grade extract. In some embodiments, the beverage grade extract has a Brix value that is at least 0.1 Brix higher, at least 0.5 Brix higher, at least 1 Brix higher, at least 2 Brix higher, or at least 5 Brix higher, than the ingredient grade extract. In some embodiments, the beverage grade extract has a Brix value that is greater than or equal to 20 Brix, greater than or equal to 23 Brix, or greater than or equal to 25 Brix.

According to certain embodiments, the first liquid extract comprises at least 2 wt % more of the primary consumable material (e.g., an extractable component of a solid raw material) than the second liquid extract. The primary consumable material refers to the consumable material that is most soluble in the solvent used to perform the extraction and will generally differ depending upon the type of solid raw material being extracted. Those of ordinary skill in the art would be capable of determining the primary consumable material for a given solid raw material. In some embodiments, the first liquid extract comprises at least 2 wt %, at least 5 wt %, at least 10 wt %, at least 20 wt %, or at least 30 wt % more of the primary consumable material than does the second liquid extract.

In some embodiments, the beverage grade extract (e.g., the beverage grade coffee extract) comprises at least 2 wt % (or at least 5 wt %, at least 10 wt %, at least 20 wt %, or at least 30 wt %) more aroma compounds than does the ingredient grade extract (e.g., ingredient grade coffee extract).

In certain embodiments, the beverage grade extract (e.g., the beverage grade coffee extract) comprises at least 2 wt % (or at least 5 wt %, at least 10 wt %, at least 20 wt %, or at least 30 wt %) more sugar than does the ingredient grade extract (e.g., ingredient grade coffee extract).

In certain embodiments, the secondary extraction configuration can be used to produce an ingredient grade coffee extract. The ingredient grade coffee extract may be a coffee extract having a lower Brix number and a higher viscosity, relative to the primary extract. The ingredient grade coffee extract may also have with a lower water content, greater colorant content, a stronger coffee flavor, a larger amount of caffeine, and reduced aroma. In some embodiments, the ingredient grade extract (e.g., ingredient grade coffee extract) has a brix value that is less than or equal to 25 Brix, less than or equal to 23 Brix, or less than or equal to 20 Brix.

In some embodiments, the ingredient grade extract (e.g., the ingredient grade coffee extract) comprises at least 2 wt % (or at least 5 wt %, at least 10 wt %, at least 20 wt %, or at least 30 wt %) more caffeine than does the beverage grade extract (e.g., beverage grade coffee extract).

In some embodiments, the pH of the ingredient grade extract (e.g., the ingredient grade coffee extract) is at least 0.2 (or at least 0.4, at least 0.6, at least 0.8, at least 1.0, at least 1.5, or at least 2.0) lower than the beverage grade extract (e.g., the beverage grade coffee extract).

The following examples are intended to illustrate certain embodiments of the present invention, but do not exemplify the full scope of the invention.

Example 1

This example illustrates a coffee extractor that has three or more separate, selectively variable, and measurably distinct output streams: two liquid streams and one dewatered solid spent grounds stream. The ratio between these three streams can be intentionally controlled by numerous operational choices into: 1) beverage grade coffee extract (e.g., a ultra-high "beverage" grade coffee extracts maintaining full flavor and full aroma beyond typical coffee beverage parameters, with immeasurable solids in suspension); 2) "ingredient" grade coffee extracts (e.g., an extract with a higher brix and viscosity, lower water content, greater colorant content, stronger coffee flavor, greater caffeine, and reduced aroma); and 3) a dried coffee grind "cake" or granules mechanically dewatered of "free water" compressed into briquettes (e.g., suitable for biomass fuel, or agricultural soil enhancement due to its high nitrogen and carbon content). The continuous extraction of multiple grades of liquid coffee extracts can provide not only new value added economies, but also makes the production of a previously unaffordable ultra-grade "beverage" grade coffee extracts more economical by the production and sale of the ingredient grade extract, and dry spent coffee grind waste.

The continuous nature of this 2-channel extraction process can allow for immediate and continuous production of beverage grade and ingredient grade coffee extracts, thus eliminating the need for large holding tanks for post extraction homogenization or concentration steps. This extractor can be fully automated and operated 24/7 for "lights out production" without the frequent emptying, cleaning, sterilizing, testing, and refilling procedures common to and typical of the single and multi-column systems for coffee extraction. The continuous operation of this extractor therefore can cost less per unit output and require vastly less floor space, have less stringent floor to ceiling height requirements, and lower capital cost than prior designs. As a sealed system, oxidation, aroma loss, and sterilization issues can be reduced.

One example of the coffee extractor with a 4-step function diagrams is illustrated in FIGS. 1A-1D. The size, shape, volume and methods of use detailed here are but one example of numerous forms that the extraction system may take, as would be achievable by one skilled in the art given the insight provided by the present disclosure.

Production of Beverage Grade Extract

FIG. 1A shows a single sealed, stainless steel, double wall jacketed, and heatable and/or coolable extraction column 108 that in this case has an aspect ratio of 15 to 1. In the example shown in FIG. 1A, the column has an 8-inch diameter and a 120-inch height, but other dimensions and/or ratios could also be used. The extraction column of this example has an enclosed, gas-tight interior for housing liquid, polished to NSF food grade specifications, with a fully jacketed counter current heatable jacketed exterior shell 60. The extraction column has 8-inch ANSI flanges at the top and bottom. The top 8-inch diameter ANSI flange supports an 8-inch full port ball valve 15, and atop that, a conical "slurry mixing" hopper 10. This hopper allows dry coffee grounds (which may have a particular sieve size) and heated water (which may have a particular temperature and chemical makeup) to be mixed thoroughly via a slowly rotating mixing paddle system 30, contained within a gas-tight lid. Penetrating through the top portion of the sealed hopper is a controlled input feed auger 20 and controlled temperature (hot or cold) water spray ball 40 providing the desired ratio of grounds to water. The slurry hopper has both temperature and level controls with proportioning controls for solvent and raw product to be extracted.

Initially the dry coffee grounds and hot water are pre-mixed in the hopper with the ball valve outlet closed. When the ball valve is opened (typically just once at start up, unless different grades, roasts, or blends need to be processed) gravity fed and vacuum assisted flow transports the pre-wetted grounds into the extraction column below it. This arrangement has numerous advantages including thorough wetting, increased contact time between the solvent and grounds for "blooming," and uninterrupted flow. The mixing hopper and extraction column could have approximately the same holding capacity, thus doubling the residence time of the mixture prior to extraction.

For example, the mixture hopper could be heated to an appropriate extraction temperature for an appropriate amount of time with the desired blend of solvent and solid raw materials. Once mixed, the column could be chilled such that the slurry is extracted cold to produce chilled coffee extracts. In some cases, the temperature of mixing and the duration of mixing at that temperature in the hopper can affect the extraction process more than the temperature of the mixture at the moment of separation, e.g., to form liquid extracts.

The flow of solvent within the extraction column is substantially parallel to the direction of gravity. The system can be operated to be vacuum driven, without application of a positive pressure except gravity head, which may be controlled. In such a configuration, the vessel need not be ASME stamped or regulated. As shown in FIG. 1A, the downward flow of solvent, in the direction of gravity, is assisted by vacuum (e.g., via one or more remote vacuum pump systems 190 or 195, or one central vacuum pump) pulling extracts through chillers past Brix meter(s) and/or flow meter(s) (not shown) into food grade sealed swirl tanks 180 and 185. Diaphragm pumps could be used in place of the vacuum pumps 190 and 195 to produce a lower density, non-degassed extract if desired. As shown in FIG. 1A, the vacuum pumps 190 and/or 195 may pull on each swirl tank's top orifice (e.g., beverage grade swirl tank 180 and/or ingredient grade swirl tank 185). While the premium beverage swirl tank can be used to house the beverage grade coffee extract, the ingredient grade swirl tank can be used to house ingredient grade coffee extract. The swirl tanks have in line chillers (not shown) positioned between the extraction column's outlets and the swirl tanks input. Each tank allows nearby storage downstream of the extraction column, with limited capacities for short term holding and degassing of the two grades of extracts produced, e.g., a beverage grade extract and an ingredient grade extract.

As shown in FIG. 1A, attached to the flanged base of the vertical or near vertical extraction column 108 is a 25-inch motorized rotary disc valve 135 custom machined with at least 4 ports (which for this example) are described as port 202, port 204, port 208 and port 206. The 25-inch motorized rotary disc valve can be made of, for example, stainless steel. There are two short (2-inch) sanitary style orifices on port 208 and port 204 sides to allow discharge of premium beverage grade extract (through port 204) and ingredient grade extract (through port 208). The port 202 and the port 206 are shown as 8-inch flanged orifices in this example. The 25-inch motorized rotary disc valve is described in more detail below. FIG. 2 and FIGS. 3A-3C show the perspective views of the motorized rotary disc valve, (FIG. 2—side view, FIG. 3A—top view, FIGS. 3B-3C—cross-sectional views). The rotary disc valve 135 includes the following components: a rotatable valve disc 105, a displaceable fluidic pathway segment 125 (e.g., internal bore), and various components associated with rotary disc valve (e.g., a rinse ferrule 117, a weld ferrule 113, a rotary valve seal 111, a roller bearing 112, a front cover 102, valve shaft key 150, valve axial shaft 109, side cover bolt 103, jacking bolt 104, axial position bolt 116, axial position flange 115, axial position shim 114, screen retainer 106, screen 107, screen spring clip 118, etc.) While rinse ferrule 117 is illustrated as pointing upward in FIG. 2, in other embodiments, rinse ferrule 117 may be pointed downward (e.g., to assist with draining).

Figure 3A:
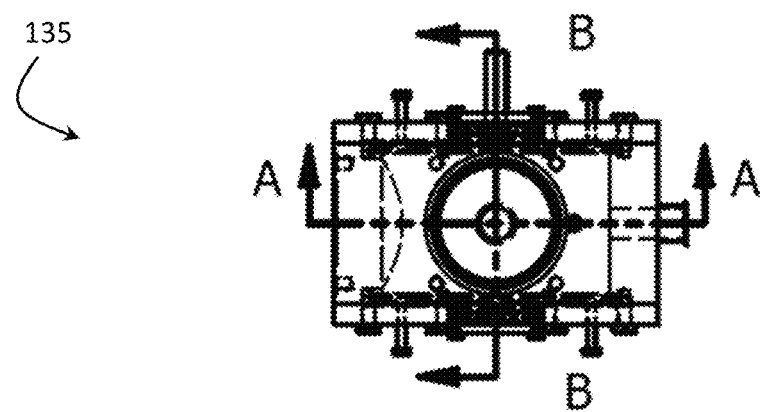
FIGS. 3A, 3B, and 3C are schematic illustrations of a rotary disc valve in top view (FIG. 3A) and two cross-sectional views (FIGS. 3B-3C), in accordance with some embodiments.
Figure 3B:
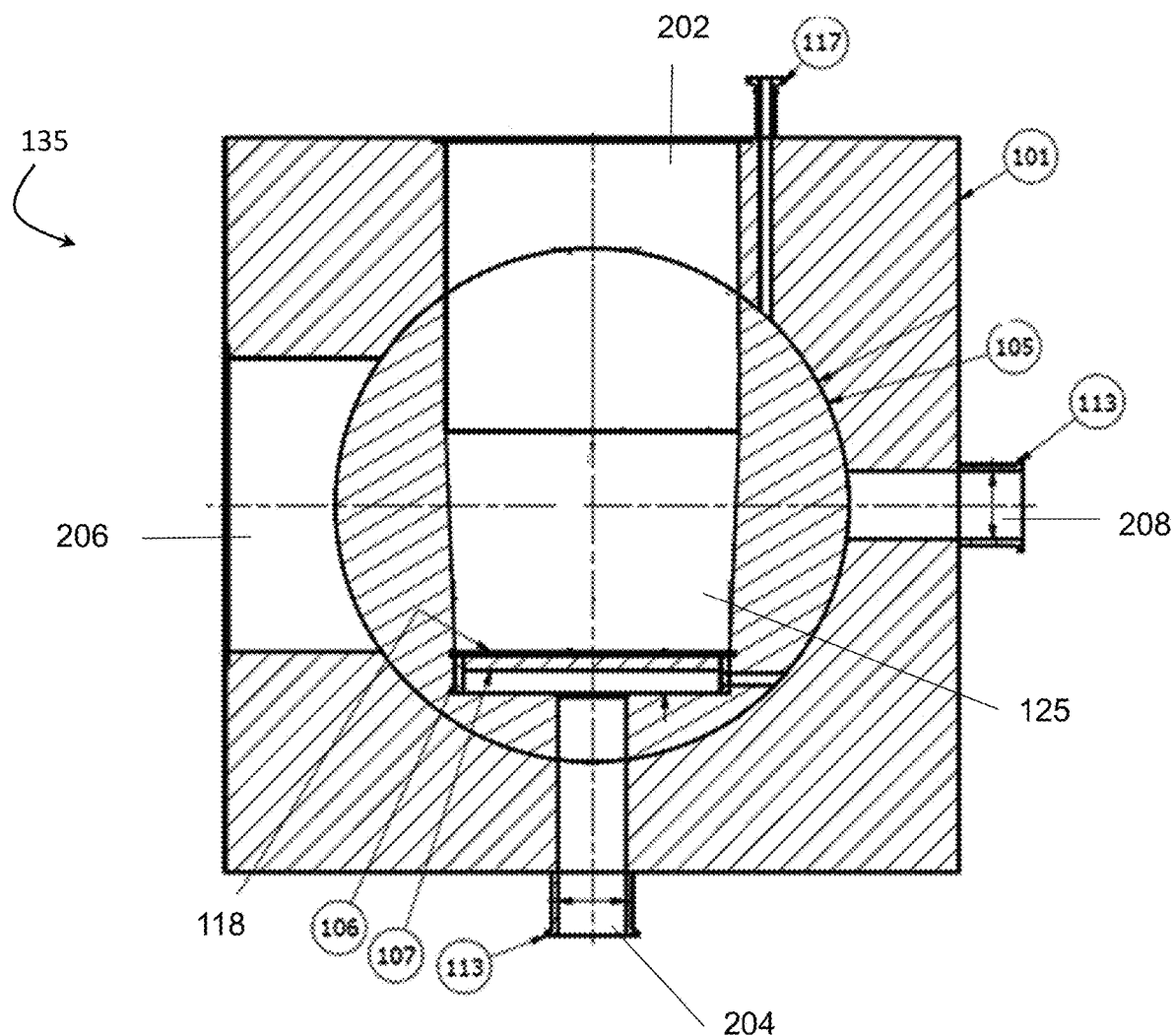
Figure 3C:
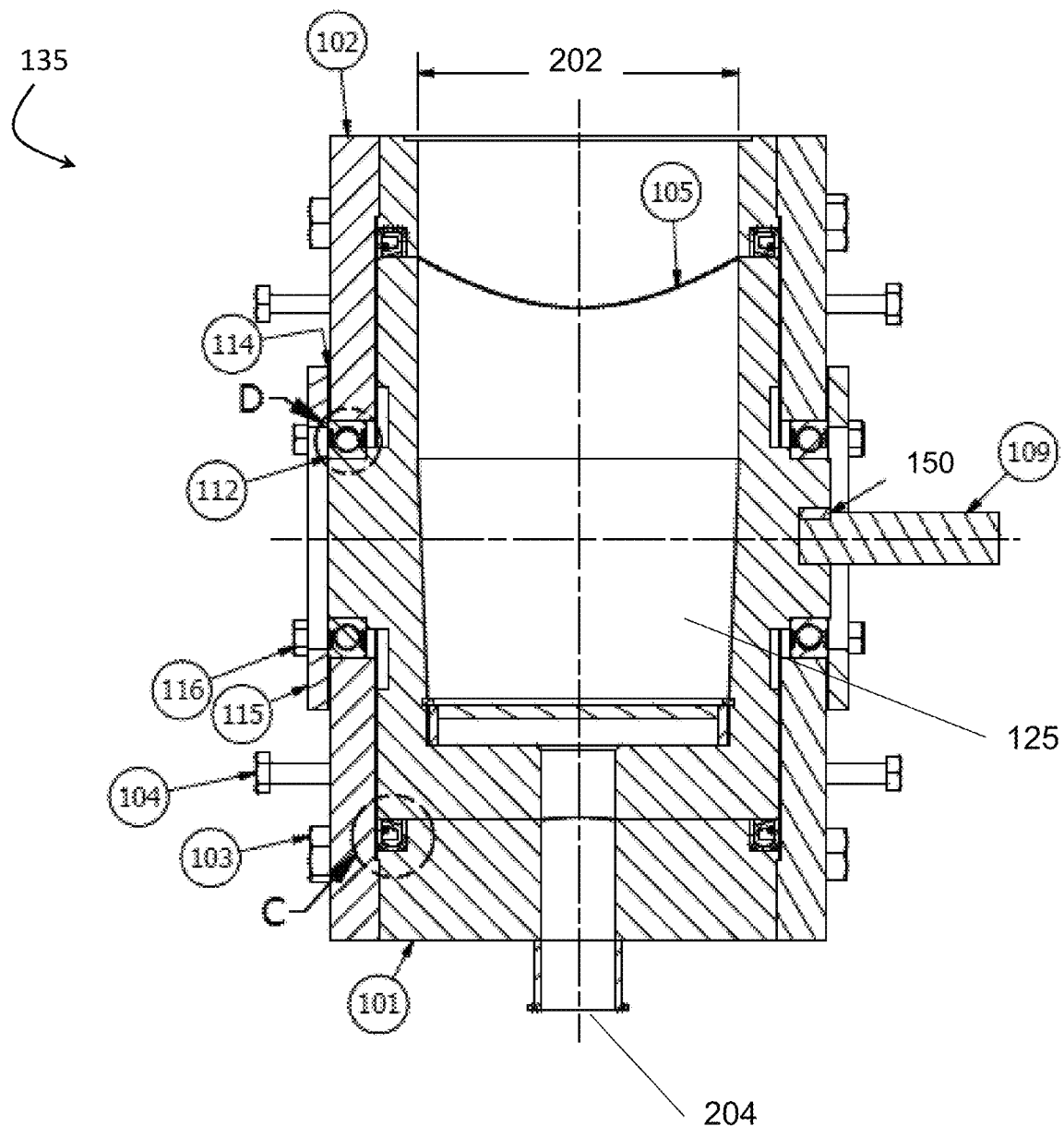

FIG. 3A provides a top view illustration of the motorized rotary disc valve 135. A cross-sectional view of section A-A of rotary disc valve 135 in FIG. 3A is presented in FIG. 3B. As shown in FIG. 3B, rotary disc valve 135 has 1 displaceable fluidic pathway segment 125 (i.e., internal bore). The bore in the rotary disc valve is not full depth, but is about 85% of the diameter of rotatable valve disc 105. In this example, rotary disc valve 135 has a 22-inch rotatable valve disc 105 having a cylindrical bore with a 8-inch diameter.

This bore has a "base" with a retaining ring 106 machined into the end facing port 204, for a removable, replaceable filter 107 (e.g., a Johnson screen). This filter is removable but cannot come loose in use. The bore in the rotary disc valve has a shoulder at the base to support the filter, and a smaller discharge orifice below the screen to allow gathering and flow of all grades of extract.

As shown in FIG. 3B, the removable filter is held "on top" by an oversize shouldered bore which is machined to fit snugly on its outer diameter (OD) into the inner diameter (ID) of the internal bore 125. This filter will have an OD with the same ID as the internal shoulder bore in the rotary disc valve. The interchangeable filter is held by a spring clip 118 or equivalent under the screens support puck. This removable filter assembly is retained at its bottom by a substantial spring clip in the valve bore's base, and a groove machined into its ID, that supports the filter from downward movement by the matching an annular ring machined and spring clip groove into the 8-inch bore of the rotary disc valve. The removable, interchangeable filter is inserted into the rotary disc valve's 8-inch bore, at or near its bottom, with any needed screen support bars facing down, below the screen. The rotary disc valve body has a 8-inch drilled and tapped ANSI pattern flange facing port 202 that seals the 120-inch vertical extractor column's bottom, forming its base.

In normal use, the 25-inch motorized rotary disc valve body (which contains a 22-inch diameter valve disc comprising a straight 19.5-inch bore having an inner diameter of 8 inches and a bore length of 22 inches) accepts a slurry of spent coffee grounds from the bottom of the 120-inch extraction column (FIG. 1A). These coffee grounds enter via the port 202 of the rotary disc valve into its internal bore.

To produce a beverage grade extract, the 8-inch internal bore is aligned to port 202 and port 204 (FIG. 1A). The beverage grade extract vacuum flow is on, allowing flow out of the beverage grade extract from the 2-inch sanitary style orifice of port 204 into beverage grade swirl tank 180. A vacuum pump 190 can be used to supply vacuum motivation at the top of the beverage grade swirl tank 180 to facilitate flow of the extract. The beverage grade extract exiting out port 204 into swirl tank 180 is monitored by an in-line Brix meter and/or flow meter that controls the rotary disc valve actuator. When the in-line Brix meter and/or volume measurement reaches desired set point level, the rotary disc valve 135 rotates 90 degrees counterclockwise to a second position (FIG. 1B), cutting off flow to port 204, and moving the rotary disc valve's internal bore such that it aligns with port 208, as shown in FIG. 1B-1D. At this point, the production of beverage grade extract has ceased.

Production of Ingredient Grade Extract

The rotary disc valve is now facing port 208 and port 206 (FIG. 1B), allowing for the extraction of an ingredient grade extract. The new bottom drain ½-inch port 208 has at least one closely coupled 2-way motorized sanitary ball valve (not shown) to allow discharge of ingredient grade extract aided by vacuum suction from the ingredient grade swirl tank 185 and piston pressure applied by a hydraulic piston 203. The operation of a hydraulic can be explained using a detailed schematic of hydraulic piston assembly 200 in FIG. 4A-4C.

Figure 4A:
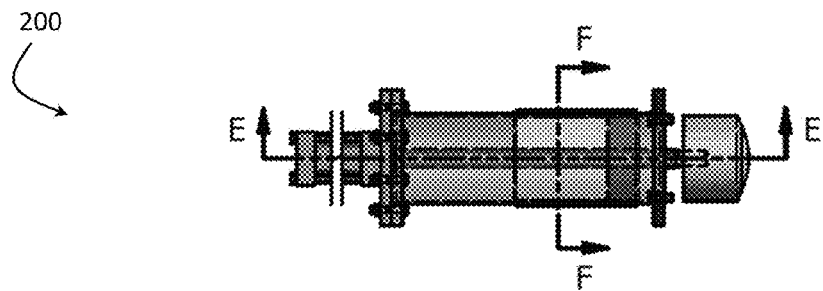
FIGS. 4A, 4B, and 4C are schematic illustrations of a hydraulic piston assembly in top view (FIG. 4A) and two cross-sectional views (FIGS. 4B-4C), in accordance with some embodiments.
Figure 4B:
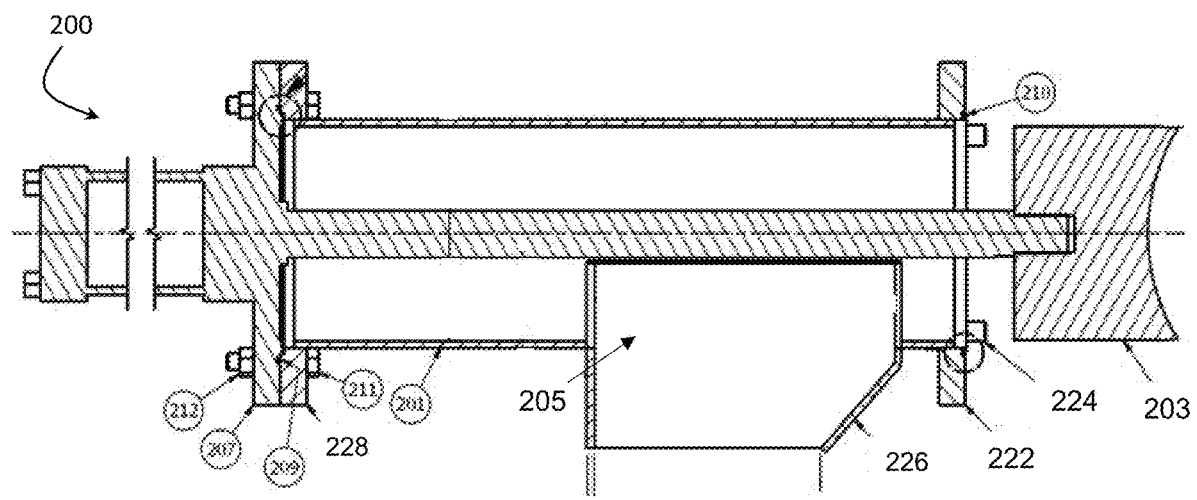
Figure 4C:
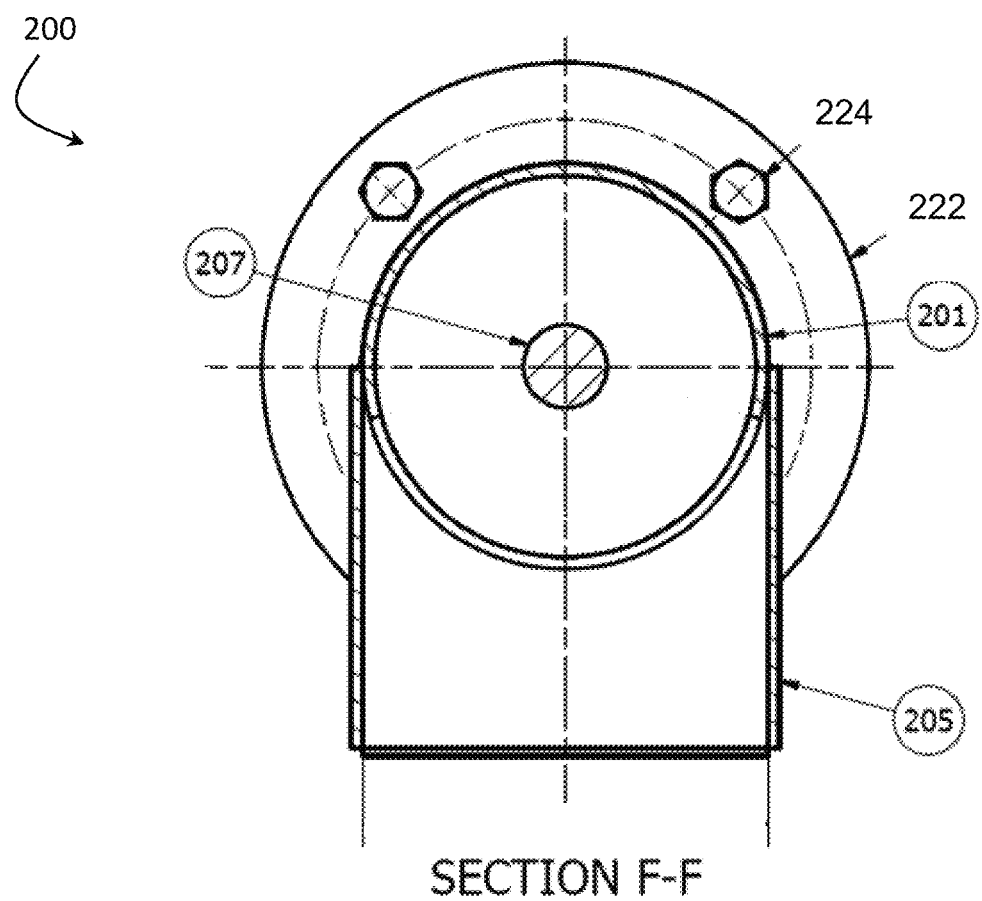

FIG. 4A-4C shows an example of a hydraulic piston assembly 200 (top view) that can be used in FIG. 1A-1D. FIG. 4B shows the cross-sectional view of section E-E of the assembly in FIG. 4A. As shown, hydraulic piston assembly 200 comprises a piston 203, a container 205, a piston housing 201, hydraulic cylinder 207, and various other components associated with the assembly (e.g., flange 222, flange bolt 224, flange gasket 210, cylinder gasket 209, cylinder flange 228, cylinder bolt 211, cylinder nut 212). FIG. 4C shows the cross-sectional view of section F-F of the assembly in FIG. 4A. As shown, the hydraulic piston assembly comprises hydraulic cylinder 207 and container 205 for disposing compressed raw materials, e.g., dewatered and spent coffee grounds.

The hydraulic piston can be used together with the motorized rotary disc valve in the extraction of ingredient grade extract. The operating procedure of assembly 300 is shown in FIG. 5A-5C in detail. As shown, assembly 300 comprises piston 203, hydraulic cylinder 207, as well as a rotary disc valve 135 with a rotatable valve disc 105 having a displaceable fluidic pathway segment 125 (e.g., a bore). The piston can be operated in three different positions—a rest position (FIG. 5A), a compressed position (FIG. 5B), and a retracted position (FIG. 5C). As shown in FIG. 5A, the piston has a curved interface with same degree of curvature as the rotary disc valve such that the curved piston interface is adjacent the rotary disc valve at a rest position.

FIG. 5B shows the hydraulic piston extending into the displaceable fluidic pathway segment (e.g., bore). When the rotary disc valve rotates 90 degrees counterclockwise, hydraulic piston 203 can be extended into the opening of bore 125 of rotary disc valve 135, resulting in a compressed position. In a compressed position, the piston can be used to compress liquid extract out of the wetted raw material (e.g., wet coffee grounds) housed in the rotary disc valve. It should be understood that, in accordance with certain embodiments, only when the piston aligns concentrically with the bore of the rotary disc valve such that a proper seal of the bore can be achieved as the piston enters into the rotary disc valve. FIG. 5C shows the hydraulic piston in a retracted position where the piston 203 retracts behind the container 205. As described elsewhere herein, after the extraction of the second liquid extract, the piston valve can fully retract to a third position, wherein the piston retracts behind the container 205. Accordingly, as described elsewhere herein, raw materials, e.g., dried spent coffee grounds, can be removed from the rotary disc valve and discharged into the container 205 when the piston is in a retracted position.

To produce an ingredient grade extract as shown in FIG. 1B using extractor 100, piston 203 can now advance to mechanically compress the ingredient grade extract out of the rotary disc valve body, with the help of the vacuum pump, and leaving behind dewatered grounds in the rotary disc valve's bore. In this example, the piston is an 8-inch diameter ultra-high molecular weight polyethylene (UHMW) disc whose face is relieved with the same 22-inch curve of the 22-inch outer diameter (OD) valve disc, as shown in FIG. 4B. The size of the piston can be selected based on the amount of material to be dewatered and the extent of dewatering. In this example, a 15-ton hydraulic piston capable of applying well over 500 psi of pressure is used. The ingredient grade extract flows out port 208 with simultaneous vacuum assist to the sealed ingredient grade swirl tank 185 via an in line chiller.

Additional ingredient grade extract has now been vacuumed out into the ingredient grade swirl tank aided by the mechanical pressure, which pushes the extract out the ½-inch port 208 through the chiller into the ingredient grade swirl tank 185. It should be noted that there is a ½-inch 2-way motorized sanitary ball valve at the ½-inch port 208 that has a vacuum supply on one side and a pressurized nitrogen supply on the other. In this case, the ½-inch 2-way motorized sanitary ball valve is configured such that the vacuum can be applied to aid extraction of the ingredient grade extract to the ingredient grade swirl tank.

As the hydraulic piston reaches stall conditions, a vent valve (not shown) opens in at the top of the piston to supply a short burst of nitrogen gas to augment the vacuum, and remove otherwise captured beverage grade extract from the compressed chamber. The 2-way motorized ½-inch sanitary ball valve is actuated to cease the vacuum suction of ingredient grade extract. Instead, a separate 2-way 2-inch motorized sanitary ball valve is now configured to allow a pressurized flow of nitrogen to below the slug of the dewatered coffee grounds into the rotary disc valve's 8-inch bore.

As shown in FIG. 1C, the second full 8-inch drilled and tapped ANSI style flanged port 206 can be used to facilitate discharge of dewatered and spent coffee grounds. It has flange mounts for a hydraulic piston assembly. The horizontal structural tubular 8-inch piston mount 230 with discharge container 205 for spent, dewatered coffee grounds should generally have enough strength to support and align the piston being used. The piston generally has enough hydraulic pressure to remove the desired amount of water, via compression, from the spent coffee grounds in the extraction column base before the spent, dewatered coffee grounds are discharged as a dewatered cake and/or loose grinds. The compression-based dewatering action of the piston is augmented by the suction provided by the ingredient grade pump and tank 185.

Once ingredient grade flow ceases, the piston retracts out of the displaceable fluidic pathway segment (e.g., bore). As shown in FIG. 1C, after retraction, piston 203 travels to fully retracted as far away from the left end of the rotary disc valve 135. At this moment, the 2-way motorized sanitary ball valve at the 2-inch port 208 allows a lightly pressurized flow of inert gas, e.g., nitrogen, to dislodge and expel the spent and dewatered coffee grounds 165 from the rotary disc valve's bore 125, horizontally to the direction of port 206, and into spent coffee grounds container 205 (FIG. 1D). This completes one cycle of extraction, making both beverage grade and ingredient grade extracts and a discharge of dewatered, dry and spent coffee grounds.

After the ingredient grade extract has been produced, the rotary disc valve is then rotated clockwise 90 degrees, back to the position illustrated in FIG. 1A, to accept another batch of wet grounds from the extraction column. The wet grounds may be transported into the bore of the rotary disc valve via gravity and a vacuum pulled from the beverage swirl tank 180. An 8-inch diameter×19.5-inch-deep slug of fresh wetted grounds from the extraction column 108 is now pulled into the displaceable fluidic pathway segment (e.g., bore) for a second round of beverage grade extraction, as shown in FIG. 1A.

The cycle time per complete 90-degree rotatable valve disc rotation, including filling, beverage grade coffee extraction, rotation, ingredient grade coffee extraction, and cake and/or grinds discharge is less than 1 minute, yielding more than 60 cycles per hour and more than 1440 cycles per day. Each cycle allows the processing of at least 15.2 pounds of roasted and ground (R&G) coffee grounds every minute (the amount processed is dependent on roast level, gravity compression, vacuum compression, and grind size), which is equivalent to about at least 917 pounds per hour, and about at least 22,008 pounds per day. This results in about 121 oz of beverage grade extract (at 23 brix) per minute and 162 oz of ingredient grade extract (at 30 to 40 brix) per minute. This yields about at least 175,103 oz of beverage grade extract per day.

Example 2

This example illustrates the method of fabricating a rotary disc valve used in an extraction column, in accordance with some embodiments. An example of the fabricated rotary disc valve is shown in FIG. 2 and FIGS. 3A-3C.

Step 1. To make the body of the rotary disc valve (e.g., rotary disc valve body 101 in FIG. 2), a block of 304 or 316 stainless steel 25-inch×25-inch×11-inch thick can be used. Water jet can be used to cut a 21.5-inch diameter×11-inch deep on center (OC) through hole in valve body 101. The center 21.5-inch water jet through hole is further processed into a 22.0-inch inner diameter (ID) hole.

Step 2. To make the rotatable valve disc (e.g., valve disc 105 in FIG. 2), first take a 24-inch stainless steel bar stock×15-inch long and cut it to make a valve disc with a precise 22.0-inch outer diameter (OD). To bore a displaceable fluidic pathway segment in the valve body (e.g., internal bore 125), first turn the valve disc on edge and bore a 22-inch deep and smooth bore hole through it. The bore hole has a 8-inch inner diameter (ID) starting at the top of bore all the way through and the remaining 2.5 inches bore below the screen is counter bored to 9.5 inches in ID. The base of the bore is now shouldered to 9.5 inches to accept the 9.5-inch wedge wire screen, and support disc with perforations, retained by a spring clip. Now two suitable 6-inch diameter bearing shoulders are machined externally on center faces of the valve disc for tapered roller bearing pivots. All surfaces are precision machined, then hard chromed. The machined bearing shoulders can be used to fit bearings (e.g., roller bearing 112 in FIG. 2) to eventually allow the rotatable valve disc to rotate inside the rotary disc valve body.

Step 3. The rotary disc valve body from Step 1 will have 4 ports (e.g., port 202, 204, 206, 208 in FIG. 3B) machined, each to a center of its four 14-inch thick edges, as follows:

First, an 8-inch ID port is made (port 206 in FIG. 3B). The port has an ANSI 8 bolt flange pattern drilled and tapped for mount bolts. The port can be connected to a flange for mounting the piston (e.g., piston 203 in FIG. 4B). Second, an 8-inch ID port (port 202 in FIG. 3B) can be made. Port 202 has an ANSI 8 bolt pattern drilled and tapped into a flange pattern, similar to port 206. Port 202 can be connected to a flange for the 8-inch×120-inch extraction column (e.g., extraction column 108 in FIG. 1A). The third port (e.g., port 208 in FIG. 3B) is a 2-inch port with a 2-inch×1-inch proud sanitary connector. The fourth port (e.g., port 204 in FIG. 3B) is a 2-inch port with a 2-inch×1-inch proud sanitary connector. A third ½-inch port is bored pointing down to release the ingredient extract flow to chiller and swirl tank with vacuum.

Step 4. The rotary disc valve body from Step 1 has a precision 22-inch ID×12-inch depth bored through the center of the block. Two removable 1-inch thick 25-inch×25-inch stainless steel plates with two bearing shoulders are machined in its flanks to support the OD of the 6-inch tapered roller bearing on each side of the valve disc. The 22-inch OD valve disc from Step 2 can be fit into the 22-inch ID rotary disc valve body. A 22-inch OD×½-inch O-ring groove is machine cut as a v-groove and the O-ring is fitted into the annular space between the rotating disc and the rotary disc valve.

Step 5. To seal the valve disc within the rotary disc valve body, two 25-inch×25-inch×1.5-inch thick bolt on side plates with 25-inch×25-inch×¼-inch UHMW gaskets are used to encapsulate the valve disc acting as "seals." The UHMW gaskets are location pinned and bolted to seal the sides of the valve body. Two plates have holes bored on center (OC) to allow for a valve actuator drive.

Example 3

This example illustrates an apparatus similar to that described and illustrated in the context of FIGS. 7A-9C above that can be used for the extraction of desirable and marketable components from many possible raw materials, for instance coffee beans or marijuana plants, among many others.

The apparatus described herein allows for continuous processing and combined operation of two distinct methods of extraction. Advantageously, the apparatus may be operated such that two or more grades of extract can be produced from a raw material in the same process. For example, in one embodiment, the apparatus may be employed to produce two grades of extract of coffee from coffee beans. The first and more valuable one is called beverage grade extract while the second one is called ingredient grade extract. The methods described herein may allow for differential extraction of the more delicate fractions (i.e., beverage grade extract) of coffee bean, for sale to a discriminating market, as well as production of lower grade extract (i.e., ingredient grade extract) that can be forced out of coffee grounds, for use as a flavoring agent in various products (e.g., coffee ice cream).

Figure 10:
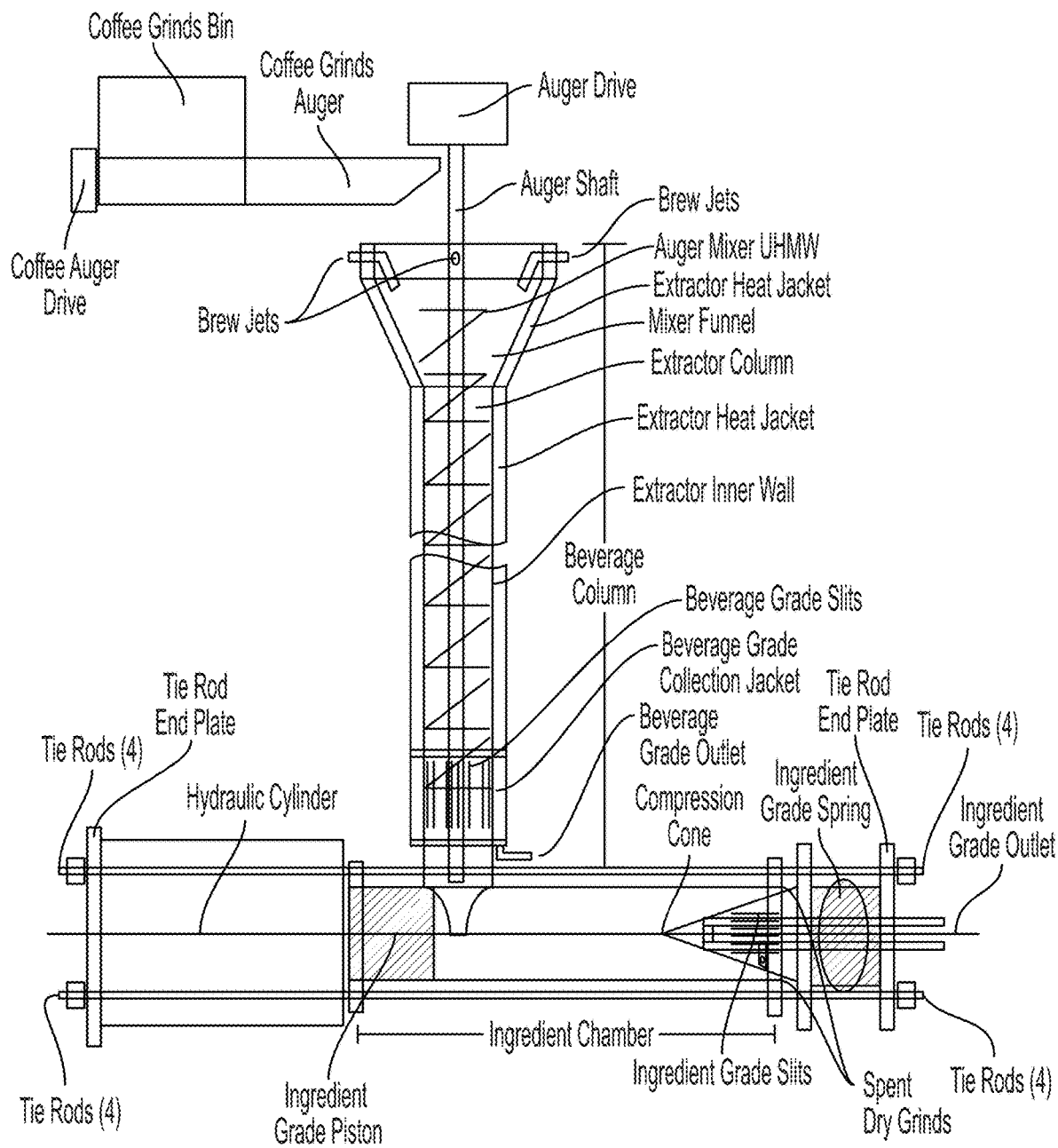
FIG. 10 is a schematic illustration of an exemplary system for the production of liquid extract, in accordance with certain embodiments.
Figure 12A:
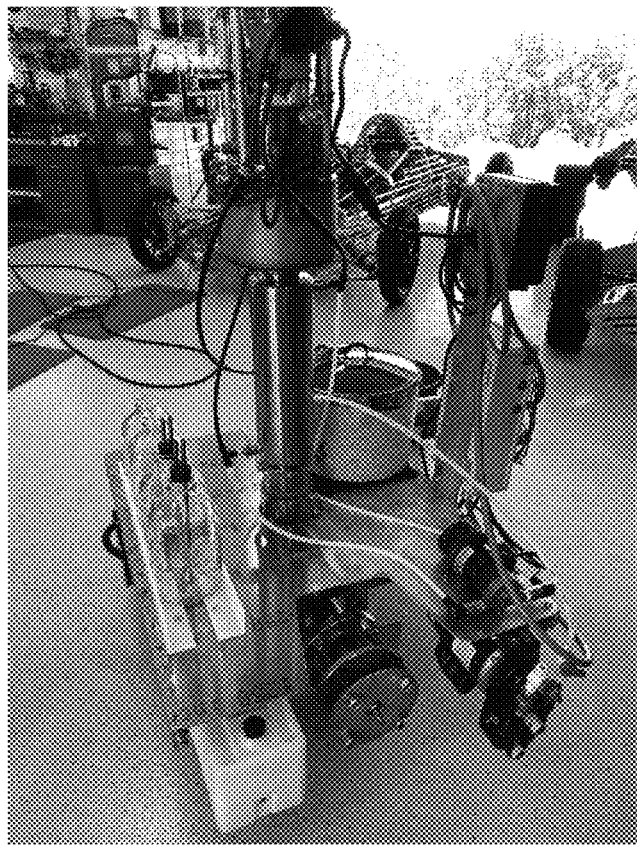
FIGS. 12A-12B are photographs of an exemplary portable system for the production of liquid extract, in accordance with certain embodiments.
Figure 12B:
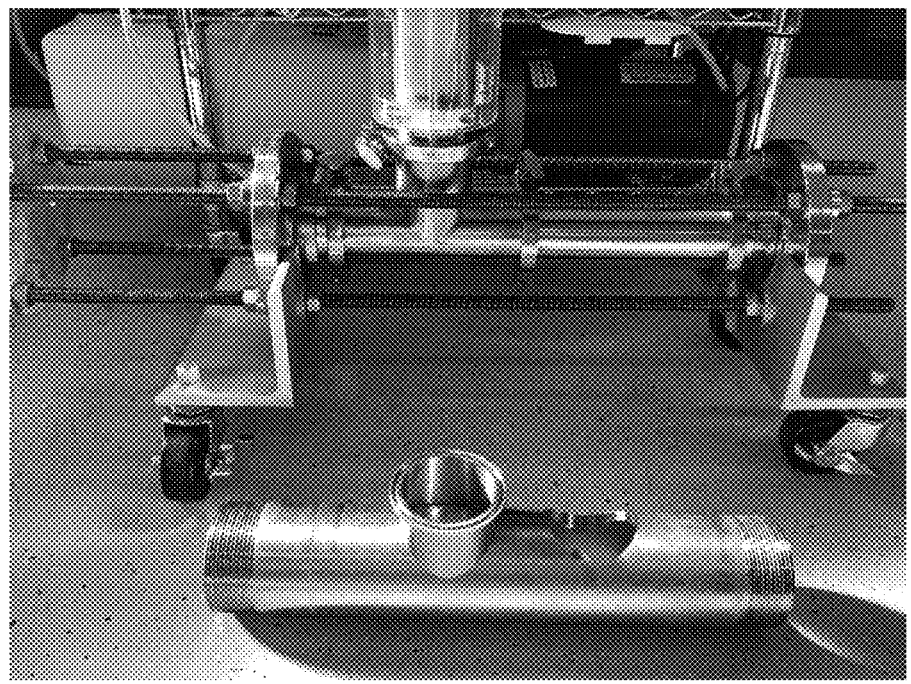

A schematic drawing of the exemplary apparatus is illustrated in FIG. 10. FIGS. 12A-12B are photographs of the system shown in FIG. 10. As shown, the apparatus includes a vertical inner column (e.g., an extractor column) that is concentrically surrounded by a heat jacket (e.g., an extractor heat jacket). Water may be continuously fed into the heat jacket at a temperature of about 197 degrees F. Roasted and ground coffee from a container (e.g., a coffee grinds bin) and pure water heated to about 197 degrees F. may be fed into the inner extractor column from above via an auger (e.g., a coffee grinds auger controlled by a coffee auger drive) and jets (e.g., brew jets), respectively. The components may be fed into a funnel (e.g., a mixer funnel) prior to being transported downwards along the vertical column. The inner column may contain some means to gently agitate and comix the dry coffee grounds and the incoming water, thereby ensuring thorough wetting of all grains of coffee.

Figure 11B:
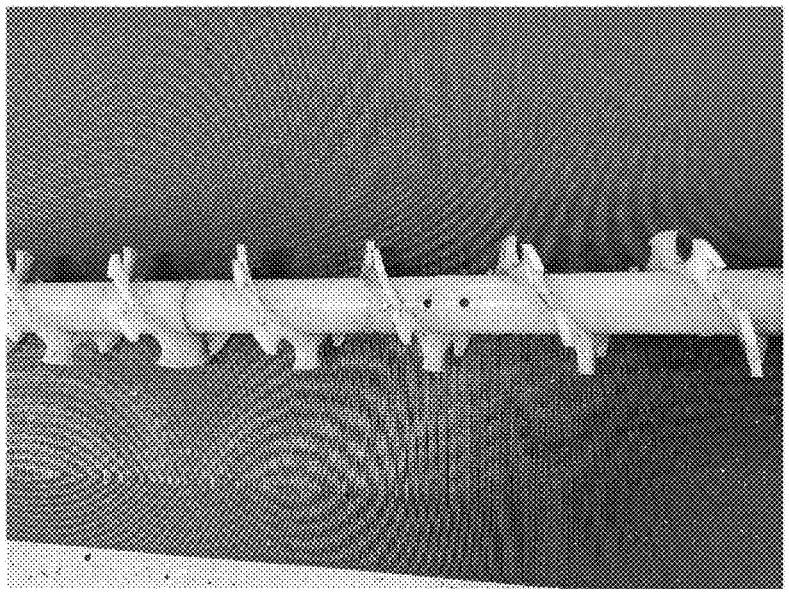
FIGS. 11A-11B are photographs of embodiments of an auger mixer used in a system for the production of liquid extract, in accordance with certain embodiments.
Figure 11A:
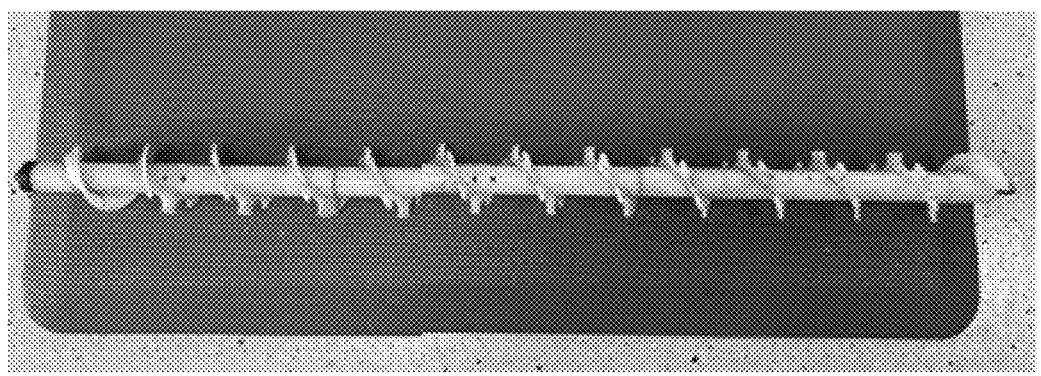

For example, a paddle auger (e.g., an auger mixer (UHMW)) may be contained within the vertical inner column (e.g., the extractor column) to facilitate mixing of the coffee grounds slurry within the vertical inner column. The paddle auger may be a continuous auger but has some sections of the blade cut away. As the paddle auger is rotated about its axis, it can both push the slurry down the column and continuously mix the coffee grounds with water as the short paddles rotate through the slurry. FIGS. 11A-11B are photographs of a paddle auger that can be used in the vertical column shown in FIG. 10. Furthermore, an ultrasonic mixer can be employed in the chamber (e.g., the mixer funnel) to thoroughly prewet the grinds before the grinds move down the vertical column. The use ultrasonic mixer in the chamber was observed to increase the Brix level of the resulting beverage grade extract from the system.

Furthermore, as shown in FIG. 10, at the lower end of the vertical column (e.g., the extractor column), below where the heat jacket ends, perforations or slits (e.g., beverage grade slits) have been cut into the wall of the inner tube (e.g., the wall of the extractor column). As shown, at where the heating jacket terminates, a different outer jacket (e.g., a beverage grade collection jacket) begins and surrounds the vertical column along the perforated length. The outer jacket around the perforated length of the vertical column can be employed to collect the highest grade and most delicate extract (e.g., a beverage grade extract) flowing through the slits (e.g., the beverage grade slits). Vacuum can be used to assist this phase of the extraction process. The beverage grade extract can be collected via an outlet (e.g., a beverage grade outlet) and can be next packaged for sale.

At this point, a second phase of extraction can take place. As shown in FIG. 10, at the lower end of the vertical column, a "tee" connection is employed to connect the vertical column (e.g., the extractor column) to a horizontal tube (e.g., an ingredient chamber) having a similar diameter as the vertical column. Within this horizontal tube, a piston (e.g., an ingredient grade piston) may be stroked back and forth under the open end of the vertical column by, in this case a hydraulic ram (e.g., a hydraulic cylinder). On the backstroke, slurry within the vertical column may fall into the open volume that is revealed. On the forward stroke, this increment of slurry may be pushed partially upwards back into the vertical mixing tube from which it had just dropped, which accomplishes yet further mixing.

To produce a second liquid extract (e.g., an ingredient grade extract), the piston can then advance past the open lower end of the vertical column and toward the length of horizontal tube where compression and "wringing" of slurry within the horizontal tube can occur. This may allow for thorough extraction of liquid extract (e.g., ingredient grade extract) from the slurry. Various methods of venting the walls of this compression chamber are possible. The high compression stress can ensure the extraction of virtually all remaining available liquid from the slurry and can result in a much greater quantity of salable extract compared to conventional gravitational methods.

Furthermore, as shown in FIG. 10, the far end of the horizontal tube (e.g., the ingredient chamber) is sealed by a conical and hollow plug (e.g., a compression cone) comprising perforations or slits (e.g., ingredient grade slits). Upon compression by the hydraulic ram, the extract (e.g., the ingredient grade extract) can flow through the perforated regions of the conical and hollow plug and can be subsequently collected. As shown, the conical and hollow plug may be held against the open end of the horizontal tube by a relatively high and adjustable spring pressure (e.g., via ingredient grade spring), much like one used in a conventional safety valve. The piston, under the high hydraulic ram pressure, can exert high compression on the volume of slurry and ensure the thorough extraction of liquid (e.g., ingredient grade extract) through the perforations of the conical plug.

Figure 13A:
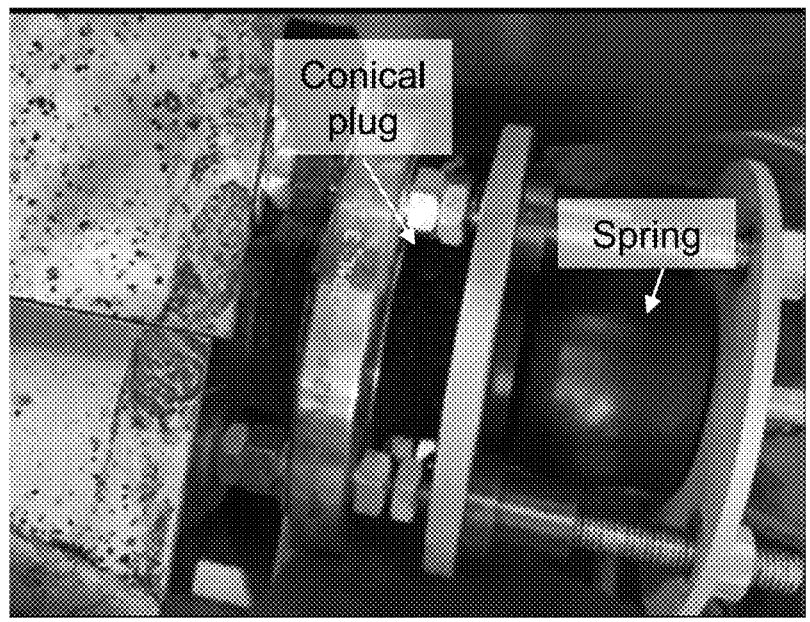
FIGS. 13A-13B are photographs of an outlet region of a secondary extraction pathway including a spring-biased outlet plug of an exemplary system for the production of liquid extract: (i) prior to compression in a closed position (FIG. 13A), and (ii) after compression in an open position (FIG. 13B), in accordance with certain embodiments.
Figure 13B:
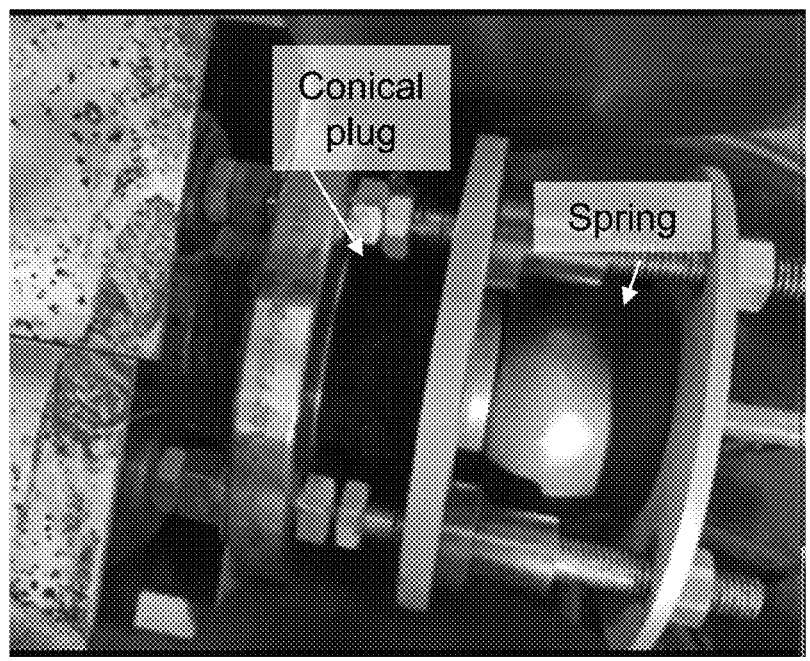

As shown in FIG. 10, as the compression builds, the conical plug (e.g., the compression cone) can be finally pushed slightly away from the open end of the horizontal tube, thereby allowing for the ejection of an increment of substantially spent dry grounds from the horizontal tube. The removed dry grounds can be collected either for disposal or sale. Using the apparatus described herein, the grounds can be separated from the ingredient grade of extract. FIGS. 13A-13B are photographs illustrating a side view of a region containing the conical plug prior the compression (FIG. 13A), and after the compression (FIG. 13B).

The process described above may be substantially continuous. This is different from processes currently in use in the industry, which are batch processes that are often interrupted by tedious and expensive cleaning and reloading steps.

Additionally, due to the arrangement of the two columns, air, with its harmful oxygen, is excluded from the components during operation. For example, air can be excluded from the process from the first step (e.g., the wetting and mixing of raw material) and continues to be excluded until after the final collection of the ingredient grade extract.

With this process, various means of adjusting the "residence time" of the slurry within the extraction pathway are possible, to achieve a desirable concentration (or Brix level) of the two grades of extract. For example, a pause of the motion of the piston (e.g., the ingredient grade piston) can be arranged, during which the wet grounds can be allowed to sit at the lower end of the vertical column to yield the desirable quantity and quality of the high grade extract (e.g., beverage grade extract). A balance in the quantities of the two grades of extract can be tuned by adjusting the residence time of the slurry within the vertical column.

An important feature of the physical arrangement of the current apparatus is the fact that, even though the extraction process is carried out deep within the apparatus, the process can be readily controlled by adjusting components on the periphery of (or external) the apparatus. For example, as shown in FIG. 10, an external drive motor (e.g., an auger drive) at the top of the vertical column may be used to control the auger mixer that extends all the way down the column to the region where the beverage grade is extracted. The auger drive may be connected to the auger mixer via the auger shaft.

For another example, as noted above, the transition from the first phase of extraction to the second phase of the extraction takes place at the intersection of the vertical column (e.g., the extraction column) and the horizontal tube (e.g., the ingredient chamber). The operation of the piston in this area, such as piston stroke position and length, can be readily controlled by adjusting the limit switches on the hydraulic ram (e.g., the hydraulic cylinder) located at the accessible end of the horizontal tube.

For another example, as noted above, the hydraulic ram actuated piston may exert a pressure on the conical plug (e.g., the compression cone), which may in turn exert a pressure on the spring (e.g., the ingredient grade spring). Upon reaching a predetermined threshold pressure (e.g., a "relief pressure"), the conical plug may be pushed away from the open end of the horizontal tube (against the spring) such that dry grounds may be ejected via the opening between the conical plug and the end of the horizontal tube. The "relief pressure" at the hollow plug can be tuned, for example, by adjusting the seat of the spring that controls the value of this pressure.

For another example, the volume of the water that is added to the dry grounds can be regulated by a needle valve located remotely from the vertical column where the mixing takes place. Furthermore, the temperature of the water in the heating jacket surrounding the vertical column can be easily tuned by using a thermostatically controlled electric heating element.

In addition, several of the components, as noted, may be powered electrically and thus can be run from a centrally located control panel by an operator. These factors make the operation of the machine, in a factory setting, relatively easy and efficient. Various design considerations are outlined below in more detail.

(i) Extractor Column and Associated Components

It has been discovered that a temperature of about 197 degrees F. throughout the vertical column (to the core) can help increase the extraction rate and the Brix of a coffee extract. The resultant extract may have the taste of a properly brewed cup of coffee. Proper column heating may be achieved by varying a combination of parameters, such as the residence time of the slurry within the column, proper jacket temperature (to heat to the core of the extraction column), and proper mixing and conveying of the slurry along the vertical column.

The size of the vertical column may also affect column heating. For example, a small diameter column (3" to 12") can conducts heat from the jacket to the core faster and better than larger diameter columns (12" to 96" or higher). The size of the vertical column may affect the flowability of the slurry from the vertical column to the horizontal tube. For example, in smaller columns, slurries may not be able to freely flow (by gravity and vacuum) from the vertical column to the T-junction and into the horizontal tube. A UHMW auger and VFD drive described above was therefore installed in the vertical column to facilitate movement of the slurry down the vertical column and to help control its residence time within the vertical column. Additionally, the auger flights (e.g., as shown in FIGS. 11A-11B) were machined to be both a conveyor and a mixer auger (with paddles) to controllably wet, mix, and convey the slurry to the extraction region (with circumferential slits) in the vertical column.

(ii) Piston, Hydraulic Ram, and Spring

The piston (e.g., ingredient grade piston 790 in FIG. 7) may have several functions. First of all, the piston may serve as a two-stroke motor to create a favorable long wave action to the vertical column, thereby aiding the mixing action of the auger within the vertical column. For example, while the vibrator mounter on the gearbox drive of the auger can be used to create short wave turbulence to the standing column of coffee grind slurry within the vertical column, the reciprocation of the piston (e.g., via backward and forward strokes) can be used to create long wave action to induce mixing of the slurry.

Secondly, the piston can be timed to dwell for a certain duration of time (e.g., a few seconds) at full extension to allow for the extraction of beverage grade extract within the vertical column. For example, as shown in FIG. 10, the ingredient grade piston may be extended fully for a certain time (i.e., dwell time) to block the open end of the vertical column. This may give the beverage grade vacuum system additional time to extract the beverage grade extract through the slits (e.g., beverage grade slits) before the next cycle or wave begins. Furthermore, the auger can be timed by auger VFD speed to supply slight compression to the grind slurry at the beverage slits during the piston dwell.

Next, once the partially extracted slurry has been vacuum extracted for a desirable amount of time (depending on the auger speed and piston dwell time), the piston may retract via a backward stroke to allow the slug of partially spent grinds to drop out of the vertical column via the T-junction into the horizontal tube. Next, the piston can be used squeeze the slug of partially spent grinds within the horizontal tube against the cone-shaped de-watering plug via a forward stroke. An ingredient grade liquid extract may be produced from the squeezing action.

Finally, after producing the ingredient grade liquid extract, the piston may exert a pressure greater than or equal to the relief pressure of the spring (e.g., ingredient grade spring) in the horizontal tube. At this point, the conical plug (e.g., compression cone) can be released from the open end of the horizontal tube to eject spent coffee grinds. The preload on the spring can be controlled by setting the four tie rod nuts for length and back pressure. As shown in FIG. 10, tie rods and various tie rod end plates may be used to secure the spring (e.g., the ingredient grade spring). The pressure applied by the hydraulic cylinder on the piston may be near its pressure exhaustion limit before the spring can allow the cone to release the squeezed and spent coffee grinds. The spent squeezed grinds are at 50% moisture content web basis (MCWB) or less and the grinds have little or no coffee taste and zero fragrance when re-brewed.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some aspects may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Devices, systems, and methods can utilize at least one controller (when referred to herein as "the controller," or "computer-implemented control system" it should be understood that such description also applies, unless otherwise indicated to at least one or each of a number of separate controllers/computer-implemented control systems for embodiments utilizing separate controllers/computer-implemented control system or distributed control) configured to control one or more components of the device or system. The devices or systems can comprise one or more sections or zones, and one or more controllers can be configured to independently control each of the one or more sections or zones. At least one section of the one or more sections can comprise one or more subsections, and the same or separate controllers independently or cooperatively can be configured to independently control each of the one or more subsets.

The controller can comprise a user interface comprising a GUI and one or more controls. The controller can be configured to allow a user to enter one or more input parameters via one or more input components. The one or more input components can be touch screens, keyboards, joysticks, electronic mice, audio devices (e.g., audio recorders), remote devices such as a hand-held wired or non-wired device, a phone, and/or a mobile phone. Other input components are possible.

The device can further comprise one or more output components such as, for example, video displays (e.g., liquid crystal displays), alphanumeric displays, audio devices (e.g., speakers), lights (e.g., light emitting diodes), tactile alerts (e.g., assemblies including a vibrating mechanism), or combinations of these.

The controller can be configured to generate one or more output signals configured to be received by one or more external electronic modules. The one or more output signals can comprise, for example, an electric current, an electric signal, a telephonic data stream, a Bluetooth or other wireless signal, or combinations of these. The one or more external electronics modules can comprise, for example, an off-site alarm, a computer processor, a memory, a video system, a software, or combinations of these.

The controller can be configured to allow a user to initiate, modify and/or cease one or more device functions and/or modes.

In some embodiments, the controller(s) and/or computer implemented control system(s) can send and receive reference signals to set and/or control operating parameters of the system. In some embodiments, controller(s) and/or computer implemented control system(s) may be physically integrated into, physically connected to, or hard-wired with other components of the extraction system. In embodiments, controller(s) and/or computer implemented control system(s) can be separate from and/or remotely located with respect to the other system components and may be configured to receive data from one or more remote support devices of the disclosure via indirect and/or portable means, such as via portable electronic data storage devices, such as magnetic disks, or via communication over a computer network, such as the Internet or a local intranet.

The controller(s) and/or computer implemented control system(s) may include several known components and circuitry, including a processing unit (i.e., one or more processors), a memory system, input and output devices and interfaces (e.g., an interconnection mechanism), as well as other components, such as transport circuitry (e.g., one or more busses), a video and audio data input/output (I/O) subsystem, special-purpose hardware, as well as other components and circuitry, as described below in more detail. Further, controller(s) and/or computer implemented control system(s) may be a multi-processor computer system or may include multiple computers connected over a computer network.

The controller(s) and/or computer implemented control system(s) may include one or more processors, for example, a commercially available processor such as one of the series x86, Celeron, Pentium, and Core processors, available from Intel; similar devices from AMD and Cyrix; the 680X0 series microprocessors available from Motorola; and the PowerPC microprocessor from IBM. Many other processors are available, and the controller(s) and/or computer implemented control system(s) is not limited to a particular processor.

A processor typically executes a program called an operating system, of which WindowsNT, Windows95 or 98, Windows XP, Windows Vista, Windows 7, Windows 10, UNIX, Linux, DOS, VMS, and MacOS and are examples, which controls the execution of other computer programs and provides scheduling, debugging, input/output control, accounting, compilation, storage assignment, data management and memory management, communication control and related services. The processor and operating system together define, in accordance with certain embodiments, a computer platform for which application programs in high-level programming languages are written. The controller(s) and/or computer implemented control system(s) is not limited to a particular computer platform.

The controller(s) and/or computer implemented control system(s) may include a memory system, which typically includes a computer readable and writeable non-volatile recording medium, of which a magnetic disk, optical disk, a flash memory and tape are examples. Such a recording medium may be removable, for example, a floppy disk, read/write CD or memory stick, or may be permanent, for example, a hard drive.

Such a recording medium stores signals, typically in binary form (i.e., a form interpreted as a sequence of one and zeros). A disk (e.g., magnetic or optical) has several tracks, on which such signals may be stored, typically in binary form, i.e., a form interpreted as a sequence of ones and zeros. Such signals may define a software program, e.g., an application program, to be executed by the microprocessor, or information to be processed by the application program.

The memory system of controller(s) and/or computer implemented control system(s) also may include an integrated circuit memory element, which typically is a volatile, random access memory such as a dynamic random access memory (DRAM) or static memory (SRAM). Typically, in operation, the processor causes programs and data to be read from the non-volatile recording medium into the integrated circuit memory element, which typically allows for faster access to the program instructions and data by the processor than does the non-volatile recording medium.

The processor generally manipulates the data within the integrated circuit memory element in accordance with the program instructions and then copies the manipulated data to the non-volatile recording medium after processing is completed. A variety of mechanisms are known for managing data movement between the non-volatile recording medium and the integrated circuit memory element, and the controller(s) and/or computer implemented control system(s) that implements the methods, steps, systems control and system elements control described above is not limited thereto. The controller(s) and/or computer implemented control system(s) is not limited to a particular memory system.

At least part of such a memory system described above may store one or more data structures (e.g., look-up tables) or equations such as calibration curve equations. For example, at least part of the non-volatile recording medium may store at least part of a database that includes one or more of such data structures. Such a database may be any of a variety of types of databases, for example, a file system including one or more flat-file data structures where data is organized into data units separated by delimiters, a relational database where data is organized into data units stored in tables, an object-oriented database where data is organized into data units stored as objects, another type of database, or any combination thereof.

The controller(s) and/or computer implemented control system(s) may include a video and audio data I/O subsystem. An audio portion of the subsystem may include an analog-to-digital (A/D) converter, which receives analog audio information and converts it to digital information. The digital information may be compressed using known compression systems for storage on the hard disk to use at another time. A typical video portion of the I/O subsystem may include a video image compressor/decompressor of which many are known in the art. Such compressor/decompressors convert analog video information into compressed digital information, and vice-versa. The compressed digital information may be stored on hard disk for use at a later time.

The controller(s) and/or computer implemented control system(s) may include one or more output devices. Example output devices include a cathode ray tube (CRT) display, liquid crystal displays (LCD), light-emitting diode (LED) displays, and other video output devices, printers, communication devices such as a modem or network interface, storage devices such as disk or tape, and audio output devices such as a speaker.

The controller(s) and/or computer implemented control system(s) also may include one or more input devices. Example input devices include a keyboard, keypad, track ball, mouse, pen and tablet, communication devices such as described above, and data input devices such as audio and video capture devices and sensors. The controller(s) and/or computer implemented control system(s) is not limited to the particular input or output devices described.

It should be appreciated that one or more of any type of controller(s) and/or computer implemented control system(s) may be used to implement various embodiments described. Functions of the controller(s) and/or computer implemented control system(s) may be implemented in software, hardware or firmware, or any combination thereof. The controller(s) and/or computer implemented control system(s) may include specially programmed, special purpose hardware, for example, an application-specific integrated circuit (ASIC). Such special-purpose hardware may be configured to implement one or more methods, steps, simulations, algorithms, systems control, and system elements control described above as part of the controller(s) and/or computer implemented control system(s) described above or as an independent component.

The methods, steps, simulations, algorithms, systems control, and system elements control may be implemented using any of a variety of suitable programming languages, including procedural programming languages, object-oriented programming languages, other languages and combinations thereof, which may be executed by such a computer system. Such methods, steps, simulations, algorithms, systems control, and system elements control can be implemented as separate modules of a computer program, or can be implemented individually as separate computer programs. Such modules and programs can be executed on separate computers.

Such methods, steps, simulations, algorithms, systems control, and system elements control, either individually or in combination, may be implemented as a computer program product tangibly embodied as computer-readable signals on a computer-readable medium, for example, a non-volatile recording medium, an integrated circuit memory element, or a combination thereof. For each such method, step, simulation, algorithm, system control, or system element control, such a computer program product may comprise computer-readable signals tangibly embodied on the computer-readable medium that define instructions, for example, as part of one or more programs, that, as a result of being executed by a computer, instruct the computer to perform the method, step, simulation, algorithm, system control, or system element control.

The controller(s) and/or computer implemented control system(s) and components thereof may be programmable using any of a variety of one or more suitable computer programming languages. Such languages may include procedural programming languages, for example, LabView, C, Pascal, Fortran and BASIC, object-oriented languages, for example, C++, Java and Eiffel and other languages, such as a scripting language or even assembly language.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An extraction system for producing liquid extract from an extractable solid raw material, comprising:
    a primary extraction pathway,
        wherein the primary extraction pathway comprises:
            a first fluidic pathway segment comprising an extraction column having a liquid feed device and configured to contain a bed of the solid raw material; and
            a second fluidic pathway segment adjacent to and in fluidic communication with the first fluidic pathway segment and comprising a liquid extract outlet, wherein
            the first fluidic pathway segment and the second fluidic pathway segment define the primary extraction pathway to permit an extraction liquid to flow into the extraction column from the liquid feed device, through the bed of the solid raw material, and out the liquid extract outlet, when the extraction system is performing a primary extraction step of an extraction process to produce a first liquid extract of the solid raw material; and
    a secondary extraction pathway joined to an end of the extraction column,
        wherein the secondary extraction pathway comprises:
            a movable solid body that is configured and positioned to be moved into and out of at least a portion of the secondary extraction pathway to:
                fluidically isolate the primary extraction pathway from the secondary extraction pathway when the movable solid body is in a first position during the primary extraction step of the extraction process,
                create fluidic communication between the extraction column and the secondary extraction pathway to receive a quantity of the solid raw material into the secondary extraction pathway when the movable solid body is in a second position after extraction of the solid raw material during the primary extraction step, and
                compress the quantity of the solid raw material received into the secondary extraction pathway when the movable solid body is in a third position during a secondary extraction step of the extraction process; and
        wherein the secondary extraction pathway comprises a third fluidic pathway, which is fluidically isolated from the primary extraction pathway when the movable solid body is in the third position during the secondary extraction step of the extraction process and is configured to convey a second liquid extract of the solid raw material produced upon compression of the quantity of the solid raw material contained in the secondary extraction pathway during the secondary extraction step to an outlet of the secondary extraction pathway.

2. The system of claim 1, wherein the secondary extraction comprises a conduit, and the extraction column is joined to the conduit secondary extraction pathway via a T-junction.

3. The system of claim 1, wherein the movable solid body comprises a hydraulic piston.

4. The system of claim 1, wherein the second fluidic pathway segment is disposed around at least a portion of the first fluidic pathway segment.

5. The system of claim 1, wherein the second fluidic pathway segment comprises a first separator configured to separate the first liquid extract from at least a portion of the extractable solid raw material contained within the extraction column.

6. The system of claim 5, wherein the first separator comprises one or more apertures in fluidic communication with the first fluidic pathway segment.

7. The system of claim 5, wherein the third fluidic pathway comprises a second separator removably coupled to an outlet opening of the third fluidic pathway.

8. The system of claim 7, wherein the second separator is configured such that:
   when the second separator is in a first position, the second separator is configured to seal the outlet opening of the third fluidic pathway; and
   when the second separator is displaced by a force applied by the movable solid body exceeding a force applied by a spring to a second position, the second separator becomes displaced from the outlet opening of the third fluidic pathway such that the third fluidic pathway is open to an external environment.

9. The system of claim 8, wherein the second separator is coupled to the outlet opening of the third fluidic pathway via a spring positioned externally of the third fluidic pathway.

10. The system of claim 7, wherein the second separator has a conical shape.

11. The system of claim 7, wherein the second separator comprises one or more apertures in fluidic communication with the third fluidic pathway.

12. The system of claim 1, wherein the movable solid body is configured to extend into and out of at least a portion of the third fluidic pathway.

13. The system of claim 1, wherein the extraction column of the primary extraction pathway is substantially vertical when in an operating configuration.

14. The system of claim 13, further comprising an ultrasonic mixer disposed in a feed funnel positioned above the extraction column.

15. The system of claim 13, further comprising an auger mixer positioned within at least a portion of the extraction column.

16. The system of claim 15, further comprising a vibrator positioned in the feed funnel and/or coupled to the auger mixer, and wherein the vibrator is configured to operate at a frequency of between 0 to 26,000 cycles per second.

17. The system of any claim 1, further comprising the extractable solid raw material within the extraction column.

18. The system of claim 17, wherein the solid raw material comprises coffee beans.

19. The system of claim 18, wherein the coffee beans comprise ground coffee beans.

* * * * *